(12) United States Patent
Chang et al.

(10) Patent No.: US 6,760,549 B2
(45) Date of Patent: *Jul. 6, 2004

(54) OPTICAL LAYER MULTICASTING USING A MULTIPLE SUB-CARRIER HEADER AND MULTICASTING SWITCH

(75) Inventors: Gee-Kung Chang, Holmdel, NJ (US); Arshad M. Chowdhury, Eatontown, NJ (US); Georgios Ellinas, Long Island City, NY (US)

(73) Assignee: The Regents of the University of California, Oakland, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 09/772,507

(22) Filed: Jan. 30, 2001

(65) Prior Publication Data

US 2002/0141014 A1 Oct. 3, 2002

(51) Int. Cl.[7] .......................... H04J 14/00; H04J 3/26; H04L 12/56
(52) U.S. Cl. .......................... 398/51; 398/54; 370/390; 370/432; 370/465
(58) Field of Search .................. 398/43, 45, 47–48, 398/51–52, 54, 58, 79, 66; 370/390, 432, 465

(56) References Cited

U.S. PATENT DOCUMENTS

| | | | |
|---|---|---|---|
| 5,361,256 A | * | 11/1994 | Doeringer et al. .......... 370/390 |
| 5,488,501 A | * | 1/1996 | Barnsley .................. 398/51 |
| 5,612,959 A | * | 3/1997 | Takase et al. .............. 370/390 |
| 6,111,673 A | | 8/2000 | Chang et al. .............. 359/123 |
| 6,160,651 A | | 12/2000 | Chang et al. .............. 359/124 |
| 6,567,851 B1 | * | 5/2003 | Kobayashi ................ 709/228 |
| 6,600,743 B1 | * | 7/2003 | Lee et al. ................. 370/390 |

OTHER PUBLICATIONS

D. J. Blumenthal et al., "WDM Optical IP Tag Switching with Packet–Rate Wavelength Conversion and Subcarrier Multiplexed Addressing," OFC 1999, Conference Digest, pp. 162–164, 1999.
J. Lee et al., "Secure Communication Using Chaos," Globecom 1995, pp. 1183–1187, Singapore, Nov. 14–16, 1995.
C. Bennett et al., "Experimental Quantum Cryptography," Journal of Cryptology, vol. 5, No. 3, pp. 3–28, 1992.

* cited by examiner

*Primary Examiner*—Kinfe-Michael Negash
(74) *Attorney, Agent, or Firm*—John P. O'Banion; Joseph Giordano

(57) ABSTRACT

An optical signaling header technique applicable to optical networks wherein packet routing information is embedded in the same channel or wavelength as the data payload so that both the header and data payload propagate through network elements with the same path and the associated delays. The technique effects survivability and security of the optical networks by encompassing conventional electronic security with an optical security layer by generating replicated versions of the input data payload at the input node, and the transmission of each of the replicated versions over a corresponding one of the plurality of links. Moreover, each of the links is composed of multiple wavelengths to propagate optical signals or optical packets, and each of the replicated versions of the data payload may be propagated over a selected one of the wavelengths in each corresponding one of the plurality of links.

22 Claims, 42 Drawing Sheets

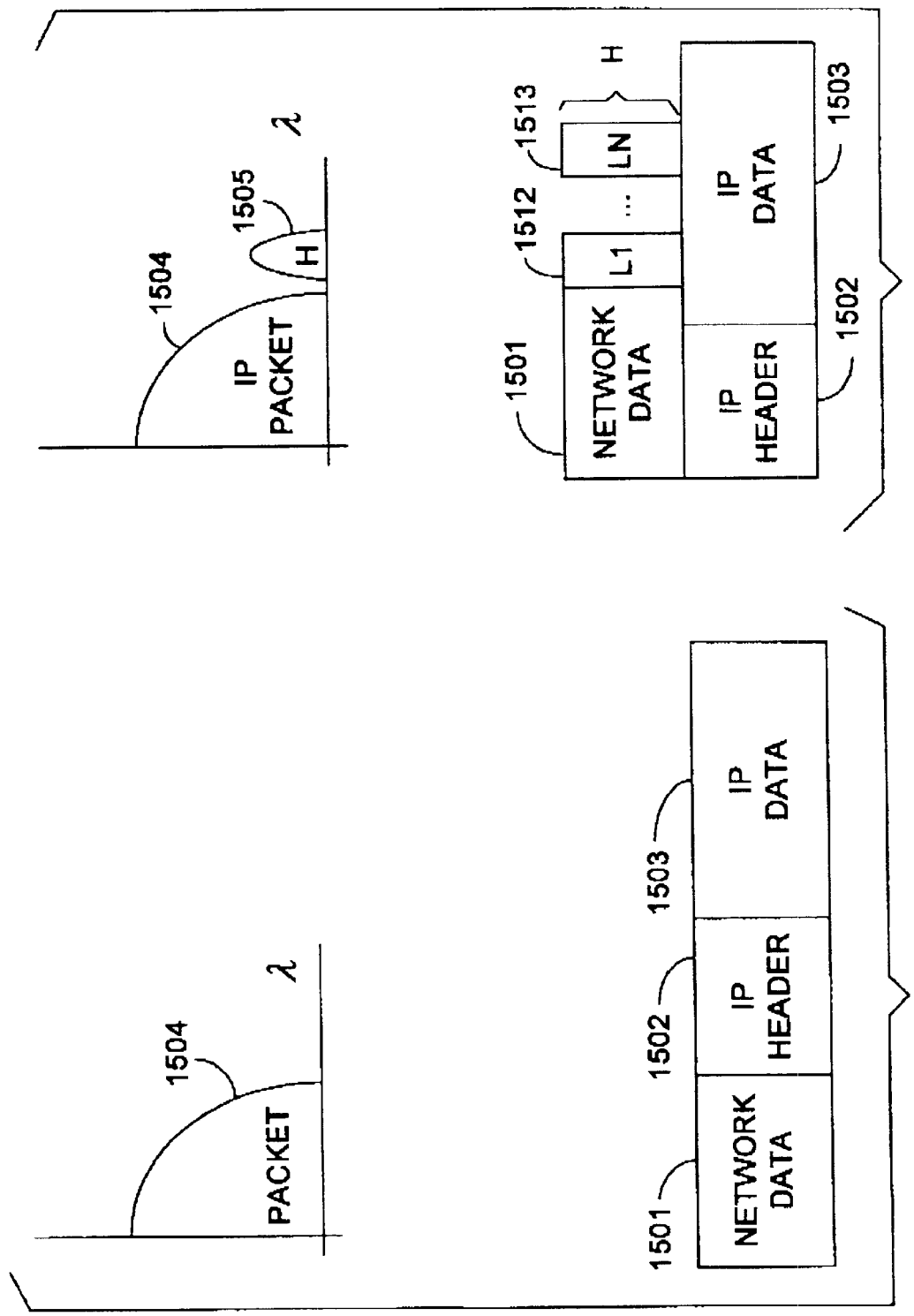

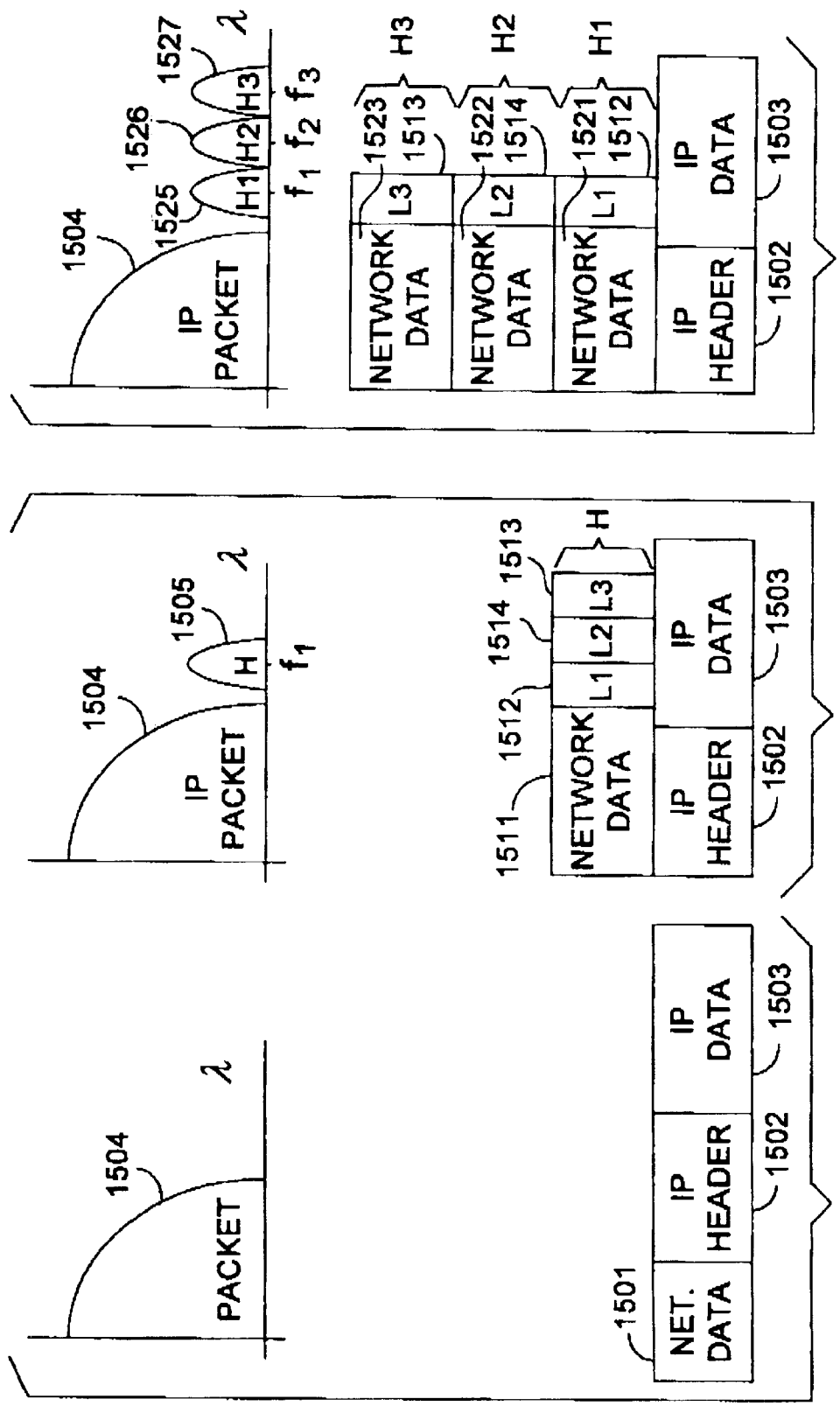

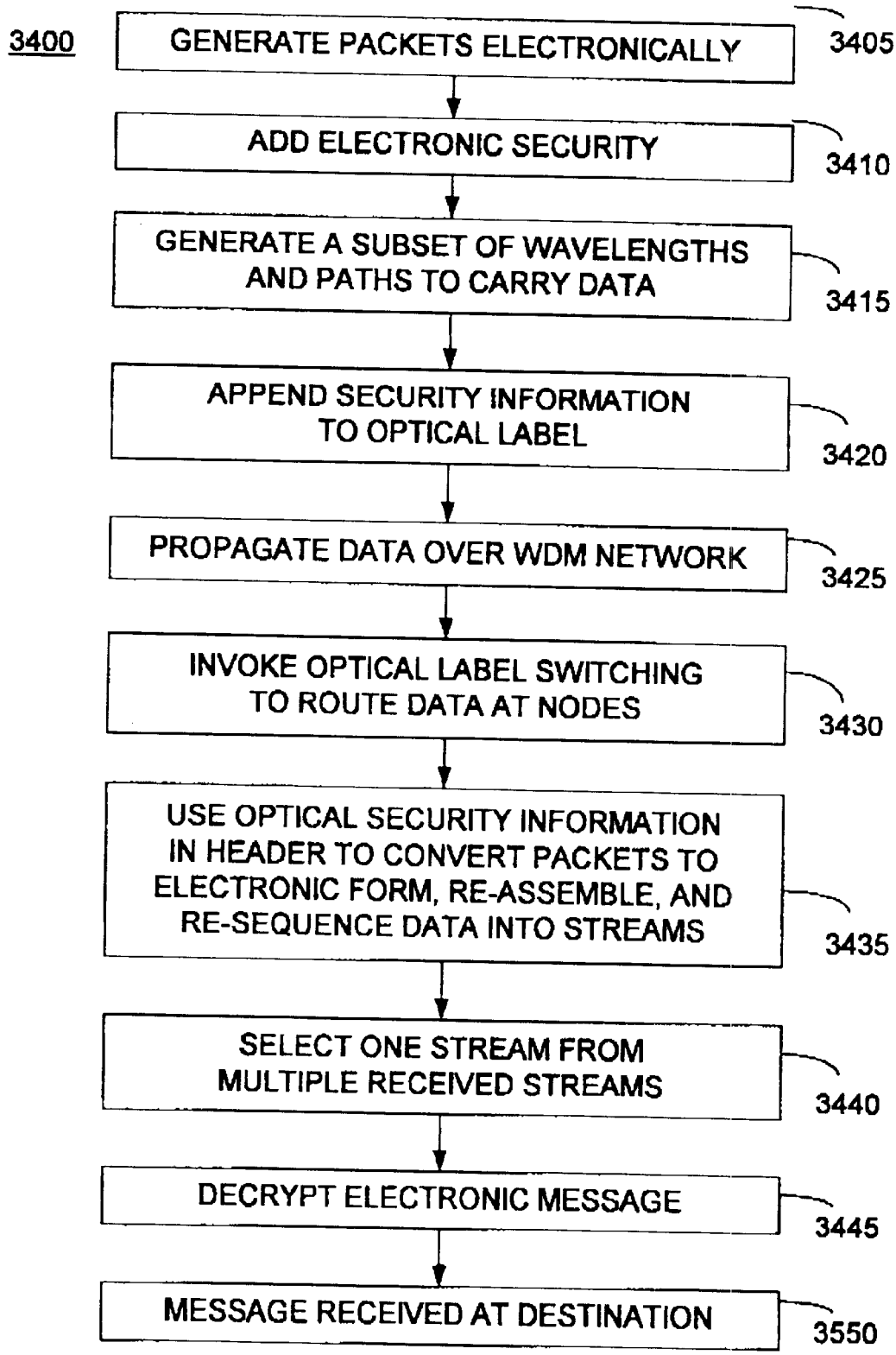

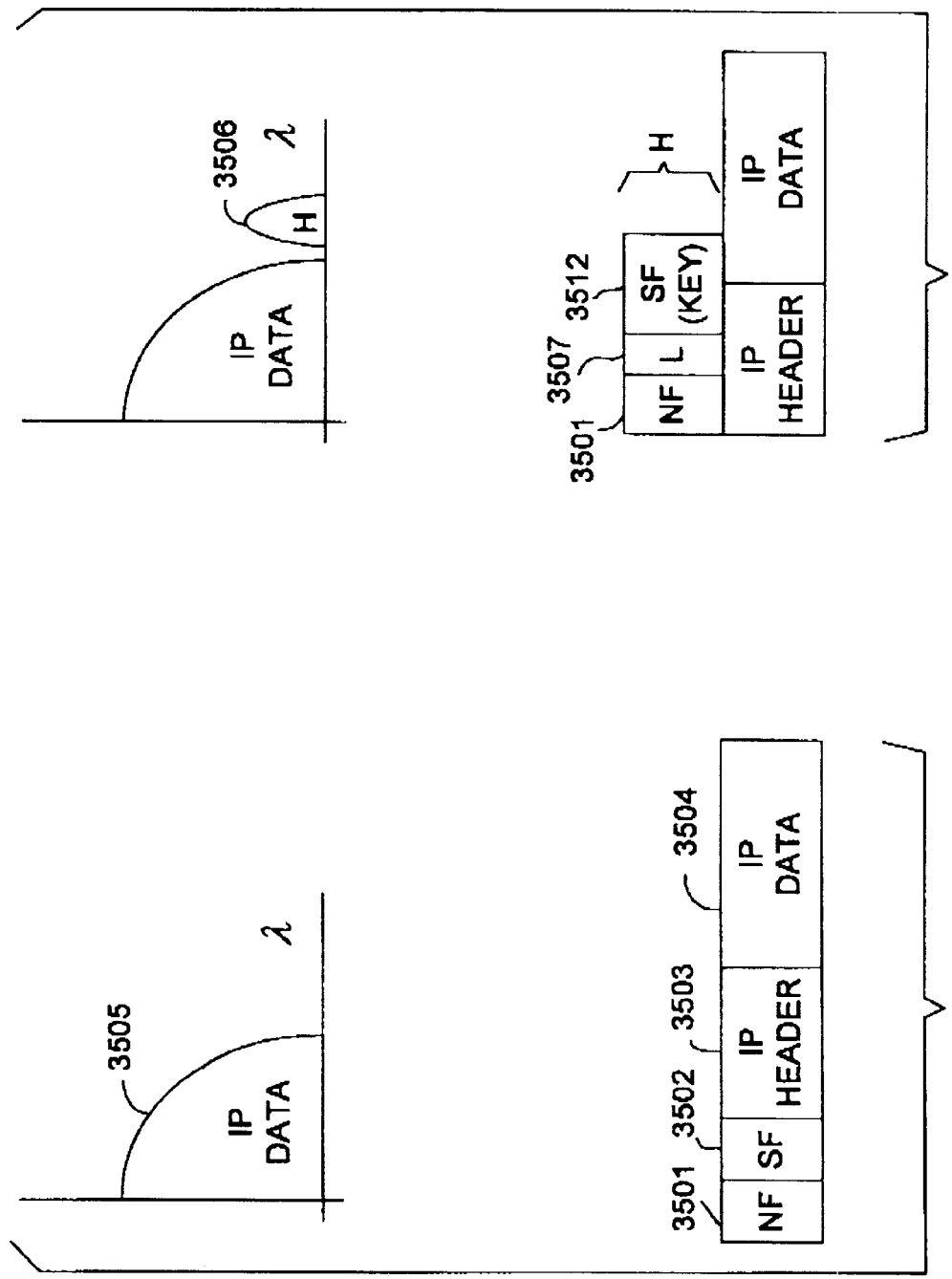

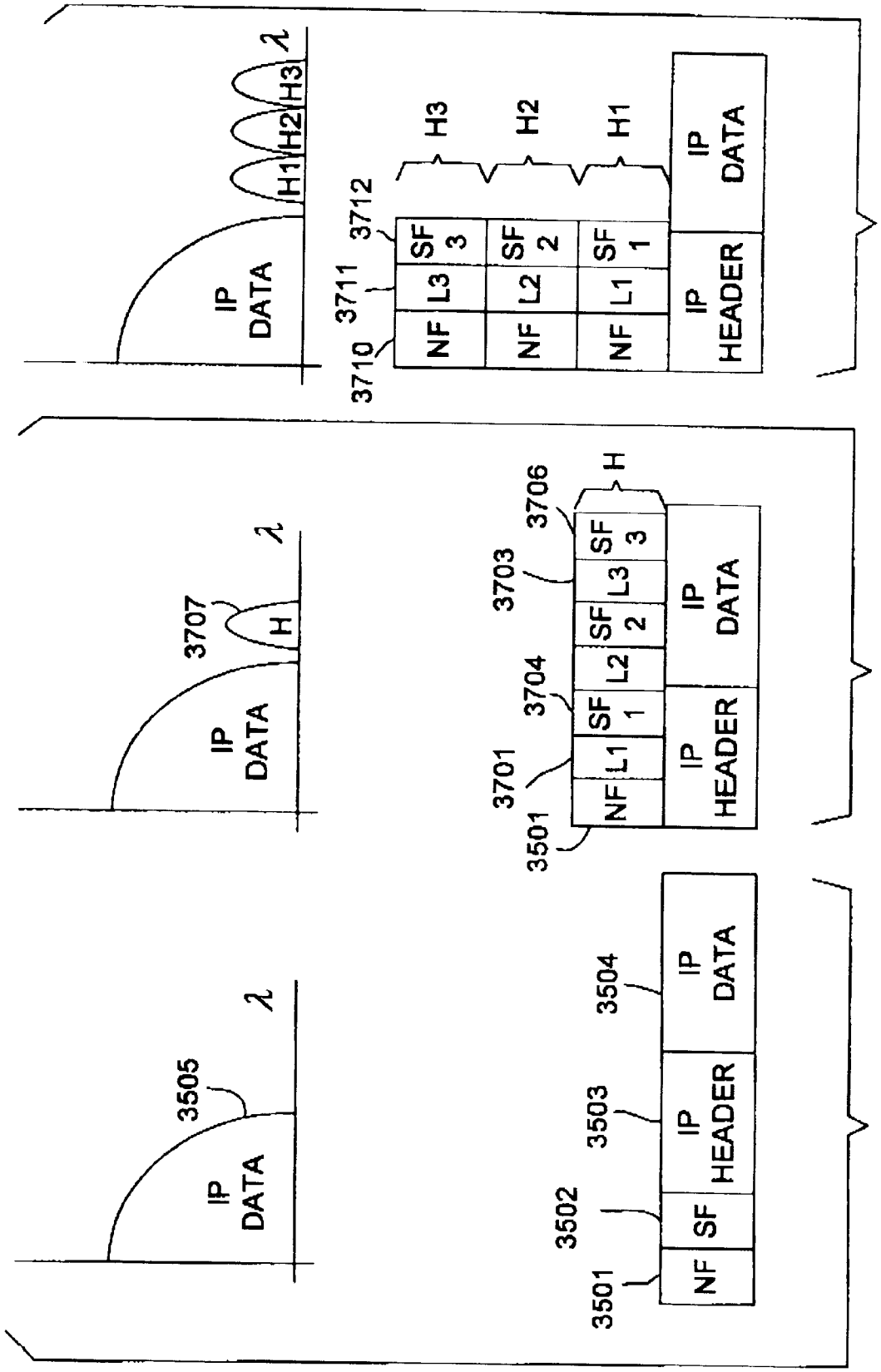

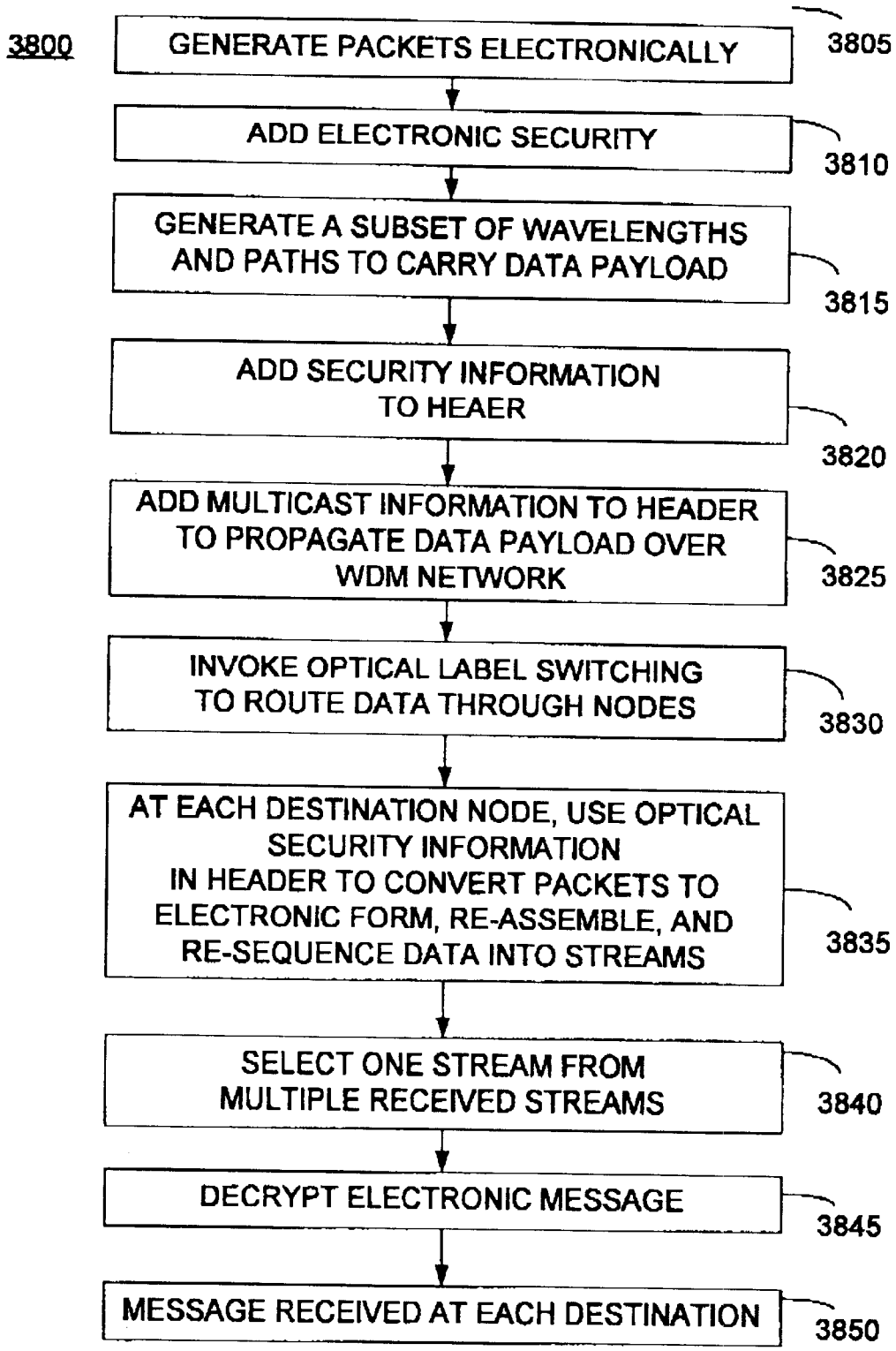

OPTICAL LAYER MULTICASTING USING A MULTIPLE SUB-CARRIER HEADER AND MULTICASTING SWITCH

GOVERNMENT LICENSE RIGHTS

This invention was made with Government support under F30602-98-C-0216 awarded by the United States Air Force. The Government has certain fights in this invention.

BACKGROUND OF THE DISCLOSURE

1. Field of the Invention

This invention relates generally to optical communication systems and, more particularly, to a multicasting optical system, characterized by high throughput and low latency network traffic, which deploys an optical signaling header propagating with the data payload to convey multicast, security and survival information, as well as information to configure a virtual optical private network.

2. Description of the Background 2.1 Overview of the Background

Recent research advances in optical Wavelength Division Multiplexing (WDM) technology have fostered the development of networks that are orders of magnitude higher in transmission bandwidth and lower in latency than existing commercial networks. While the increase in throughput and the decrease in latency are impressive, it is also necessary to provide multicasting capability combined with secure and survivable propagation as well as the capability to configure virtual optical private networks in order to realize the Next Generation Internet (NGI) vision of providing the next generation of ultra-high speed networks that can meet the requirements for supporting new applications, including national initiatives. Towards this end, current research efforts have focused on developing an ultra-low latency Internet Protocol (IP) over WDM optical packet switching technology that promises to deliver the four-fold goal of high throughput, low latency, secure and survivable networks, and optical virtual private networks. Such efforts, while promising, have yet to fully realize this four-fold goal.

The most relevant reference relating to achieving this four-fold goal is U.S. Pat. No. 6,111,673 issued to Chang and Yoo (hereinafter Chang) on Aug. 29, 2000, entitled "High-Throughput, Low-Latency Next Generation Internet Networks Using Optical-Tag Switching", and assigned to the same assignee as the present invention. As discussed in Chang, there are a number of challenging requirements in realizing IP/WDM networks of the type required for the NGI initiative. First, the NGI network must inter-operate with the existing Internet and avoid protocol conflicts. Second, the NGI network must provide not only ultra low-latency, but must take advantage of both packet-switched (that is, bursty) IP traffic and circuit-switched WDM networks. Third, the NGI network requires no synchronization between signaling and data payload. Finally, the NGI network must accommodate data traffic of various protocols and formats so that it is possible to transmit and receive IP as well as non-IP signals without the need for complicated synchronization or format conversion.

Chang devised a methodology and concomitant network that satisfy the above requirements. As discussed in Chang, the optical packet header is carried over the same wavelength as the packet payload data. This approach eliminates the issue of header and payload synchronization. Furthermore, with a suitable use of optical delay at each intermediate optical switch, the approach also eliminates the need to estimate the initial burst delay by incorporating the optical delay directly at the switches. This approach is strikingly difference with "just-in-time" signaling in which the delay at each switch along the path needs to be known ahead of time and must be entered in the calculation for the total delay. Lastly, there is little time wasted in requesting a connection time and actually achieving a connection. In comparison to a few second delays over techniques prior to Chang, the delay is minimal, only limited by the actual hardware switching delays at each switch. The current switching technology realizes delays of only several microseconds, and shorter delays will be possible in the future. This short delay can be compensated for by using an optical fiber delay line at each network element (or, equivalently, a network node or, in short, a node) utilizing switches.

Chang utilizes a unique optical signaling header technique applicable to optical networks. Packet routing information is embedded in the same wavelength as the data payload so that both the header and data information propagate through the network with the same path and the associated delays. However, the header routing information has sufficiently different characteristics from the data payload so that the signaling header can be detected without being affected by the data payload and that the signaling header can also be stripped off without affecting the data payload. Such a unique signal routing method is overlaid onto the conventional network elements, in a modular manner, by adding two types of 'Plug-and-Play' modules.

As explicitly disclosed by Chang, a method for propagating a data payload from an input network element to an output network element in a wavelength division multiplexing system composed of a plurality of network elements, given that the data payload has a given format and protocol, includes the following steps: (a) generating and storing a local routing table in each of the network elements, each local routing table determining a local route through the associated one of the network elements; (b) adding an optical header to the data payload and embedded in the same wavelength as the data payload prior to inputting the data payload to the input network element, the header having a format and protocol and being indicative of the local route through each of the network elements for the data payload and the header, the format and protocol of the data payload being independent of the format and protocol of the header; (c) optically determining the header at each of the network elements as the data payload and header propagate through the WDM network; (d) selecting the local route for the data payload and the header through each of the network elements as determined by looking up the header in the corresponding local routing table; and (e) routing the data payload and the header through each of the network elements in correspondence to the selected route.

As further explicitly disclosed by Chang, the overall system is arranged in combination with (a) an electrical layer; and (b) an optical layer composed of a wavelength division multiplexing (WDM) network including a plurality of network elements, for propagating a data payload generated by a source in the electrical layer and destined for a destination in the electrical layer, the data payload having a given format and protocol. The system includes: (i) a first type of optical header module, coupling the source in the optical layer and the WDM network, for adding an optical header ahead of the data payload and embedded in the same wavelength as the data payload prior to inputting the data payload to the WDM network, the header being indicative of a local route through the network elements for the data payload and the header, the format and protocol of the data payload being independent of those of the header; and (ii) a second type of optical header module, appended to each of the network elements, for storing a local routing table in a corresponding one of the network elements, each local routing table determining a routing path through the corresponding one of the network elements, for optically determining the header at the corresponding one of the network elements as the data payload and header propagate over the WDM network, for selecting the local route for the data payload and the header through the corresponding one of the network elements as determined by looking up the header in the corresponding local routing table, and for routing the data payload and the header through the corresponding one of the network elements in correspondence to the selected route.

Chang offers numerous features and benefits including: (1) extremely low latency limited only by hardware delays; (2) high throughput and bandwidth-on-demand offered by combining multi-wavelength networking and optical label switching; (3) priority based routing which allows higher throughput for higher priority datagrams or packets; (4) scalable and modular upgrades of the network from the conventional WDM to the inventive optical label-switched WDM; (5) effective routing of long datagrams, consecutive packets, and even non-consecutive packets; (6) cost-effective utilization of optical components such as multiplexers and fibers; (7) interoperability in a multi-vendor environment; (8) graceful and step-by-step upgrades of network elements; (9) transparent support of data of any format and any protocol; and (10) high quality-of-service communications.

While Chang has contributed a significant advance to the optical communications art, there are no teachings or suggestions pertaining to techniques for optically multicasting information through the disclosed NGI network. This limitation is inherent because the optical switch disclosed in Chang is conventional in the general sense that each optical signal arriving at an input port of the optical switch is switched to a single output port. This is evident by referring to FIG. 6 of Chang (also shown as FIG. 6 herein, but with the terminology "tag-switch state" (reference numeral 611) replaced by "label-switch state" which will also be used in the sequel), wherein optical switch 601 is shown as being 1:1, that is, each input signal composed of both the header and the payload (e.g., the optical signal propagating on input path 6022 and arriving at port 510) is switched to a single output port (e.g., port 511) to deliver the input optical signal as an output signal (e.g., the output signal propagating on path 604).

Moreover, Chang teaches that a header is added to each packet incoming to the NGI network at an input node, and that this header is parsed to determine the route through each intermediate node of the network. This is evident with reference, initially, to FIG. 9 (also shown as FIG. 9 herein) of Chang which depicts circuitry for detecting the header, shown as appearing on lead 902—the signal on lead 902 conveys routing information. An example of routing information contained in the header is bit stream '11101011000' shown by reference numeral 615 of FIG. 6. This bit stream is compared to the "label-switch state" entry in table 610 of FIG. 6 to determine the local route through optical switch 601 of FIG. 6 (namely, the route from input port 01 to output port 11). It is clear from a detailed review of Chang that each header can convey only a single label-switch state, that is, each header is incapable of providing multiple label-switch states as part of the header information. Moreover, the sole header is never overwritten or swapped, that is, deleted and replaced, nor is there any teaching relevant to appending a new header to the original header, such new header being used further downstream to provide routing information. Thus Chang is devoid of teachings that are generally necessary for multicasting, or for responding to dynamic changes occurring within the network, such as an outage of a network node.

In addition, there are no teachings or suggestions in Chang to render an optical multicast network both secure and survivable. There is a growing need within the NGI to attain fast, secure, and simultaneous communications among communities of interest (e.g., a group of nations) or with different security requirements. Thus, Chang has not provided the techniques nor circuitry necessary to engender a secure optical multicast network for high capacity, resilient optical backbone transport networks where information, in units of per flow, per burst, or per packet, can be distributed securely according to assigned security levels and multicast addresses in the optical domain independent of data payload and protocols. With such a network, in accordance with the present invention, there is the opportunity for a quantum leap in cutting edge communications technologies into an environment of ever changing coalitions among nations or communities of interest armed with different policies, priorities, ethnic interest, and procedures. The subject matter in accordance with the present invention significantly enhances the capabilities of optical multicast networks well beyond what is available with current approaches. A secure optical layer multicast (SOLM) mechanisms fosters a secure resilient optical multicast network (SROMN). Accordingly, a coalition, composed of members with multiple security levels, can be established quickly, within seconds or minutes, and can distribute information simultaneously, according to multicast addresses, to each member in the coalition with different security levels —in effect, engendering the dynamic set-up of a virtual private network with a hierarchy of security levels.

2.2 Background Specific to Header Processing

As alluded to above, there is an issue of how to effectively provide multiple headers or, equivalently, a header composed of multiple sub-headers conveying multicasting information. Moreover, there is an additional issue of how to detect and/or re-insert a header which is combined with a data payload for propagation over the network using the same optical wavelength.

The primary focus in the literature has been on a technique for combining sub-carrier headers together with a baseband data payload. Initially, this was accomplished in the electrical domain where sub-carriers where combined with the data payload. One version of this technique combined a 2.56 Gb/s data payload with a 40 Mb/s header on 3 GHz carrier, and another version of this technique combined a 2.488 Gb/s data payload with a tunable microwave pilot tone (tuned between 2.520 and 2.690 GHz) to route SONET packet in a WDM ring network via acousto-optical tunable. Both techniques used a single laser diode to carry the data payload and sub-carrier header. A variation of this technique has also been studied for use in a local-area DWDM optical packet-switched network, and several other all-optical networks.

Instead of combing a sub-carrier headers with the data payload in the electrical domain, they have also been combined in the optical domain by using two laser diodes at different wavelengths. However, using two wavelengths to transport data payload and header separately may not be practical in the following sense: in an all-optical DWDM network, it is preferred that the header, which may contain network operations information, travels along the same routes as data payload so that it can truthfully report the updated status of the data payload. If the header and the data payload were carried by different wavelengths, they could be routed in the network with entirely different paths, and the header may not report what the data payload has really experienced. Therefore, although it is preferred that the sub-carrier header and the data payload be carried by the same wavelength, the art is devoid of such teachings and suggestions.

The sub-carrier pilot-tone concept was later extended to multiple pilot tones, mainly for the purpose of increasing the number of network addresses.

Recently, consideration has been given to 'header replacement' for the high-throughput operation in a packet-switched network in which data paths change due to link outages, output-port contention, and variable traffic patterns. Moreover, header replacement could be useful for maintaining protocol compatibility at gateways between different networks. However, the only method which has been reported is for time-division-multiplexed header and data payload requires an extremely high accuracy of timing synchronization among network nodes.

Most recently, Blumenthal et al., in an article entitled "WDM Optical Label Switching with Packet-Rate Wavelength Conversion and Subcarrier Multiplexed Addressing", OFC 1999, Conference Digest, pages 162–164, report experimental results of all-optical IP label switching for WDM switched networks. However, the experimental system is a non-burst system and, moreover, no propagation of the resultant signal over actual fiber is discussed. It is anticipated that the propagation distance will be substantially limited whenever the system is deployed with optical fiber because of phase dispersion effects in the optical fiber.

From this foregoing discussion of the art pertaining to details of header generation and detection, it is readily understood that the art is devoid of teachings and suggestions wherein sub-carrier multiplexed packet data payload and multiple sub-carrier headers (including old and new ones) are deployed so that a >2.5 Gbps IP packet can be routed through a national all-optical multicast WDM network by the (successive) guidance of these sub-carrier headers, with the total number of sub-carrier headers that can be written is in the range of forty or more. Moreover, there are no teachings or suggestions of how to utilize the multiple sub-carriers to convey multicasting information.

2.3 Background Specific to Security and Survivability

A. Possible "Attack" Methods

New forms of Optical Layer Survivability and Security (OLSAS) are essential to counter signal misdirection, eavesdropping (signal interception), and denial of service (including jamming) attacks that can be applied to currently deployed and future optical networks. The signal misdirection scenario can be thought of as a consequence of an enemy taking control of a network element or a signaling (control) channel. Possible optical eavesdropping (signal interception) methods can include (i) non-destructive fiber tapping, (ii) client layer tapping, and (iii) non-linear mixing. (Destructive fiber tapping is also a possibility, but this scheme is readily detectable by monitoring power on individual channels.) A description of each of these methods is now summarized:

(i) Non-destructive fiber tapping can be the result of: (a) fiber bending resulting in 1–10% of the optical signal (all wavelengths if a WDM system are used) being emitted out of the fiber cladding and being gathered and amplified by an eavesdropper; (b) fiber-side fusion involving stripping the fiber cladding and fusing two fiber cores together as another way to perform signal interception (note that this is an extremely difficult technique to implement); (c) acousto-optic diffraction involving placing acousto-optic devices on the fiber, which results in the leakage of 1–10% of the optical signal (all wavelengths) outside the fiber cladding. There are three examples of non-destructive fiber tapping, as follows:

(ii) Client layer tapping is the result of measuring the non-zero residuals of other channels by the switches of the multiplexers/demultiplexers. When the signal goes through the optical switches, part of the optical signal that is not dropped at the client layer will appear at the client interface. Even though this signal will have very low power levels, in many instances it can result in recognizable information.

(iii) Non-linear mixing involves sending a high-power pump wave to achieve, for example, four-wave-mixing and in turn map all channels to different wavelengths that are monitored by a malicious user. This technique requires phase matching at dispersion zero wavelength on the fiber.

Finally, denial of service can be the result of a variety of attacks. Some of these attacks include using a high-intensity saturating source, a UV bleach, or a frequency chirped source to jam the optical signal.

B. Comparison with Other Approaches

The three approaches that are currently used to perform encryption of the electronic data in the optical layer are the following: (i) chaotic optical encryption; (ii) quantum optical encryption; and (iii) optical spread spectrum encryption. All three schemes can be used underneath the electronic encryption layer to protect the information from possible attacks.

(i) Chaotic Optical Encryption

The chaotic optical encryption technique uses what is called "chaotic systems" as the optical encryption method. These are single wavelength chaotic synchronous fiber lasing systems that use amplitude or frequency modulation to introduce a "chaotic state" in the network. The information transmitted through the network is encoded onto chaos at the transmitter side and decoded at the receiver side. This is accomplished by using a synchronized "chaotic state" at the receiving end in order to "de-encrypt" the original optical signal. Communication methods using chaotic lasers have been demonstrated, with a representative reference being C. Lee, J. Lee, D. Williams, "Secure Communications Using Chaos", Globecom 1995. These schemes utilize a relatively small message embedded in the larger chaotic carrier that is transmitted to a receiver system where the message is recovered from the chaos. The chaotic optical source and receiver are nearly identical, so that the two chaotic behaviors can synchronize. There are a number of shortcomings for this method, which the technique in accordance with the present invention overcomes.

First, the chaotic behaviors are highly susceptible to changes in the initial conditions. The probability for the receiving end chaotic laser to synchronize its chaotic behavior gets much smaller as the initial conditions wander. For instance, if the two chaotic lasers drift in their relative cavity length due to changes in the ambient, the probability of synchronization drops very rapidly. Hence, multiple receiving users must all synchronize the path length of their lasers. The situation becomes more complex for WDM networks deployed in the field, since cross-modulations in polarization, phase, and amplitude between multiple channels are bound to alter the initial conditions seen by the receiving users. In fact, nonlinear optical effects such as self-phase-modulation will even alter the spectrum of the chaotic carrier. It is difficult to expect such synchronization to be successful for every packet in multiwavelength optical networks. Previously it has been shown with optical network elements equipped with clamped erbium-doped fiber amplifiers (EDFAs) and Channel Power Equalizers (CPEs), lasing in the closed cycles does affect transport characteristics of other wavelength channels, even if it does not saturate the EDFAs. Chaotic oscillations in a transparent optical network due to lasing effect in a closed cycle have been observed. They are attributed to the operation of multiple channel power equalizers within the optical ring. The presence of unstable ring lasers can cause power penalties to other wavelength channels through EDFA gain fluctuation, even though these EDFAs are gain clamped. It has also been found that the closed cycle lasing does not saturate the gain clamped EDFAs in the cycle because the lasing power is regulated by the CPEs. This observation and analysis have significant impacts on the design and operation of network elements in transparent WDM networks.

Second, the noise and the chaotic behaviors are highly frequency dependent. Such a chaotic method, even if it works well for one particular data format, cannot work well for a wide range of data formats.

Third, the accommodation of chaotic optical carrier is made at the expense of useful signal bandwidth, network coverage, and network capacity. To enhance the probability of synchronization, the chaotic optical carrier must possess reasonably high optical power and consequently sacrifices the power available for the data. A simple signal-to-noise argument leads us to the conclusion that the network capacity and network reach will significantly drop due to excessive power in the chaotic carrier.

Fourth, the network must agree on a fixed configuration of the chaotic lasers for both transmitters and receivers. Once the eavesdropper acquires or learns this information, the entire network will be open to this eavesdropper. The method in accordance with the present invention, on the other hand, can vary the security coding from packet to packet for every wavelength channel.

(ii) Quantum Optical Encryption

The second method applies optical encryption at the quantum level by using the state of photons (e.g., polarization of the photons) to detect a security breach. The main idea behind this approach is the encoding of the information in a string of randomly chosen states of single photons. Anyone trying to eavesdrop by tapping part of the light must perform a measurement on the quantum state, thus modifying the state of the light. This modification of the state of the photons can then be used to detect a security breach. A representative reference pertaining to this subject matter is C. Bennett et al., "Experimental Quantum Cryptography", Journal of Cryptology, Vol. 5, No. 3, 1992. One of the fundamental problems of this technique is that it is slow (data rates of only a few Mb/sec can be accommodated) and it can only be applied to communications that span short distances (a few Km). Furthermore, when the optical signal travels relatively long distances, the polarization of the photons may change (even if polarization dispersion fiber is used). This will generate a false alarm. Finally, another problem that arises is whether an attack (security breach) may be carried out that will be undetectable to the parties involved in the secure communication (i.e., the polarization of the photons does not change when an eavesdropper taps part of the light).

(iii) Spread Spectrum Techniques in Optical Domain

The third approach uses the spread spectrum technique to distribute the information packets to a number of different wavelengths. The section that follows tries to identify how this new technique compares to the classical spread spectrum techniques that are currently being used to provide security in mobile systems.

Spread spectrum communication was originated 60 years ago; the main purpose then was to protect military communication signals against jamming. In that scheme, frequency hopping and frequency agile multiple access (FDMA) techniques were employed. Later on, CDMA (code-division multiple access) and SDMA (space-division multiple access) were developed to enhance the communication channel capacity and performance.

The CDMA method can increase the channel capacity by almost 10-fold over other access methods, but it is sensitive to both terrestrial signal interference and the noise added in-band by the simultaneous presence of multiple users. Thus, transmitter power control and forward error control (FEC) adjustment is very crucial to the performance of CDMA systems. These systems operate with low bit error rate (BER) ($10^{-3}$ is a typical number) and low data rates (on the order of Kbps).

The inventive OLSAS multicast mechanism combines all three approaches employed in the RF domain, namely, frequency hopping and frequency division multiple access (FDMA), CDMA, and SDMA. Rather than increasing the system access capacity at the expense of adding noise in the signal band, a different view of the performance and bandwidth/capacity management in dense WDM optical networks is taken. The abundant bandwidth provided by the WDM optical cross-connects with more wavelengths (e.g., 128) at higher bit rates (10 Gb/s) is traded for each fiber port.

From this foregoing discussion of the art pertaining to details of secure and survivable communications, it is readily understood that the art is devoid of teachings and suggestions wherein sub-carrier multiplexed packet data payload and multiple sub-carrier headers (including old and new ones) are deployed so that a >2.5 Gbps IP packet can be routed through a national all-optical multicast WDM network by the (successive) guidance of these sub-carrier headers, with the total number of sub-carrier headers that can be written is in the range of forty or more, to therefore foster a secure and survivable network.

SUMMARY OF THE INVENTION

These and other shortcomings and limitations of the prior art are obviated, in accordance with the present invention, by a methodology and concomitant circuitry for multicasting an input data payload received from a source over an optical network to a plurality of destinations by supplying appropriate multicasting information as part of the header information.

In accordance with a broad system aspect of the present invention, a system for multicasting a data payload through an optical network composed of a plurality of nodes interconnected by links wherein a given one of the nodes multicasts over two outgoing links, the data payload having a given format and protocol, the system includes; (a) a route generator for generating and storing a local routing look-up table in each of the nodes, each local look-up table listing local addresses for determining alternative local routes through each of the nodes; (b) an adder for adding two headers to the data payload with each of the headers being embedded in the same wavelength as the data payload prior to inputting the data payload at an input one of the nodes to produce an optical signal, each of the headers having a format and protocol and conveying multicast information indicative a local route through the given node for the data payload and the headers, the format and protocol of the data payload being independent of the format and protocol of the headers; (c) a detector for detecting the multicast information at the given one of the nodes to determine two switch control signals with reference to the multicast information as the data payload and the headers propagate through the optical network; (d) an optical splitter for splitting the optical signal into two split optical signals; (e) a selector for selecting two local routes through the given one of the nodes in correspondence to the two switch control signals; (f) an optical switch having input ports and output ports wherein one of the split optical signals couples to a first input port and the second of the split optical signals couples to a second input port, and wherein one of the outgoing links couples to a first output port and the second of the outgoing links couples to a second output port; and (g) a switch controller, coupled to the optical switch and responsive to the two switch control signals, for switching the optical switch in response to the multicast information to optically couple the first input port with the first output port and the second input port with the second output port.

BRIEF DESCRIPTION OF THE DRAWINGS

The teachings of the present invention can be readily understood by considering the following detailed description in conjunction with the accompanying drawings, in which:

FIG. 15A depicts a layout of a conventional header/data payload combination and accompanying spectrum;

FIG. 15B depicts a layout of a header/data payload of the presented invention, along with the frequency spectrum, for multicasting;

FIG. 15C repeats FIG. 15A for ease of comparison to FIGS. 15D and 15E;

FIG. 15D depicts the location of multicast information in accordance with the present invention wherein the multicast information is conveyed by a single sub-carrier;

FIG. 15E depicts the location of multicast information in accordance with the present invention wherein the multicast information is conveyed by a plurality of sub-carriers;

FIG. 34 is a high-level block diagram flow chart for the operation of the OLSAS system;

FIG. 35A and FIG. 35B depict the arrangement of the security features information in a traditional use and as deployed in the WDM sub-carrier label-switching arrangement;

FIG. 37A repeats FIG. 35A for ease of comparison to FIGS. 37B and 37C;

FIG. 37B depicts arrangement of the security features information and optical labels as deployed in the WDM sub-carrier label-switching arrangements in accordance with the present invention for a single sub-carrier;

FIG. 37C depicts arrangement of the security features information and optical labels as deployed in the WDM sub-carrier label-switching arrangements in accordance with the present invention for multiple sub-carriers;

FIG. 38 is a high-level block diagram flow chart for the operation of the OLSAS system with multicasting;

To facilitate understanding, identical reference numerals have been used, where possible, to designate identical elements that are common to the figures.

DETAILED DESCRIPTION

In order to gain an insight into the fundamental principles in accordance with the present invention as well as to introduce terminology useful in the sequel, an overview of the optical network of Chang is first presented, followed by an elucidation of an illustrative embodiment of the present inventive subject matter overlaid on the network of Chang.

1.) Overview

The present invention relates, in its most general aspect, to a multicasting network for realizing low latency, high throughput, and cost-effective bandwidth-on-demand for large blocks of data for NGI applications. A cost-effective and interoperable upgrade to the network described in Chang (U.S. Pat. No. 6,111,673) is realized by interposing a newly devised optical switch on the existing WDM network elements to effect so-called "WDM multicast optical label-switching" or, synonymously, "multicast optical label-switching" (referred to as "optical tag-switching" in Chang). The invention impacts both the hardware and software for the conventional NGI network from all perspectives, including architecture, protocol, network management, network element design, and enabling technologies. As suggested, the methodology carried out by the network and concomitant circuitry for implementing the network are engendered by a technique called WDM multicast optical label-switching —defined as the dynamic generation of routing paths for a burst duration by an in-band optical signaling header(s).

To understand the principles of the present invention, as well as introduce terminology for the present invention, it is most expeditious to understand the teachings and suggestions of Chang as the basis upon which to elucidate the points of departure of the present invention.

1.1) Overview of Chang

As described in Chang, data packets are routed through the WDM network using an in-band WDM signaling header for each packet. At a switching node, the signaling header is processed and the header and the data payload (1) may be immediately forwarded through an already existing flow state connection, or (2) a path can be setup for a burst duration to handle the header and the data payload. WDM label-switching enables highly efficient routing and throughput, and reduces the number of IP-level hops required by keeping the packets routing at the optical level to one hop as managed by the NC&M (Network Control & Management) which creates and maintains routing information.

Figure 1:
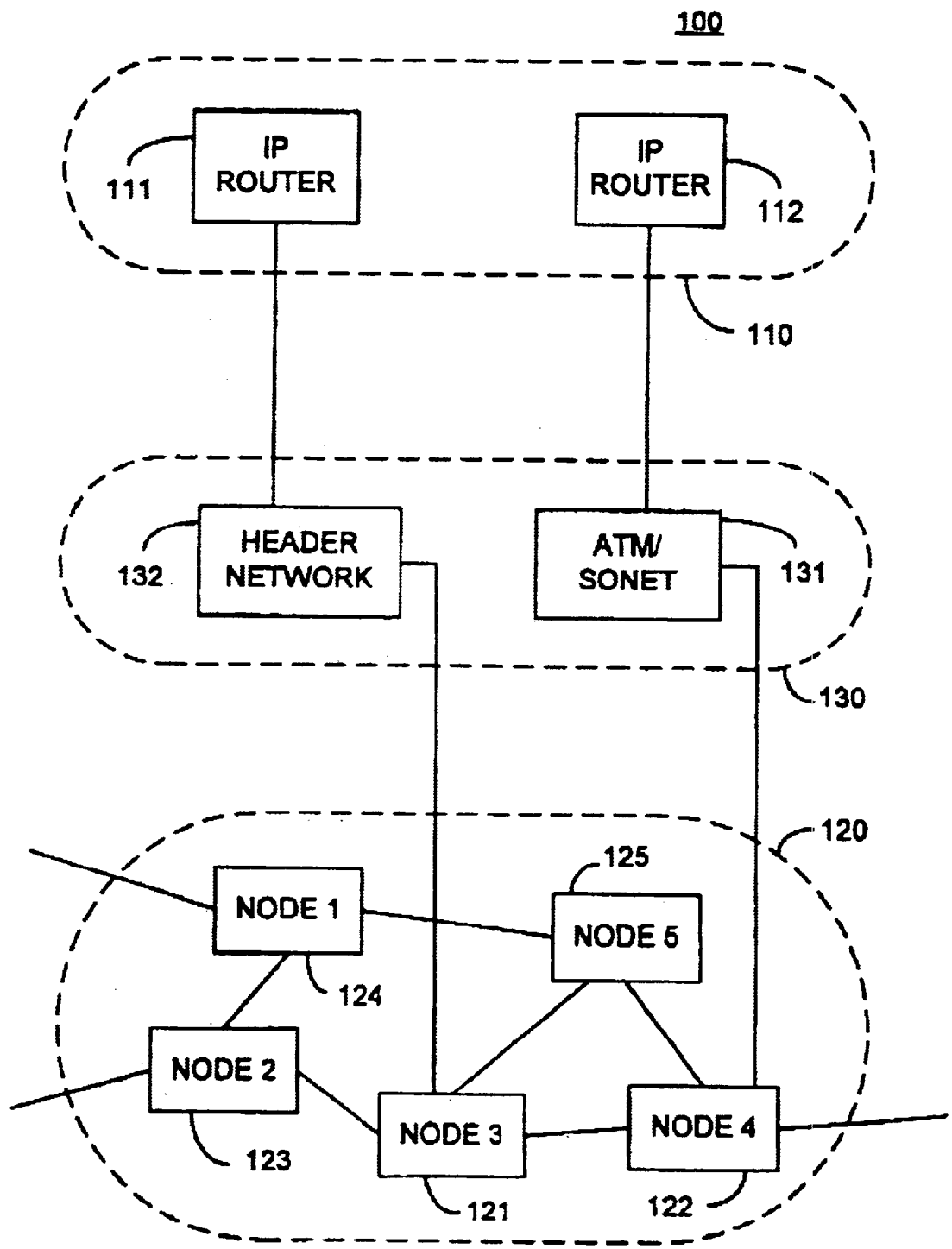
FIG. 1 is a prior-art pictorial representation of a general network illustrating the coupling between the optical and electrical layers of the network affected by the present invention.

The depiction of FIG. 1, which is the same as FIG. 1 of Chang, shows the inter-relation between optical layer 120 and electrical layer 110 of generic network 100 as provided by intermediate layer 130 coupling the optical layer and the electrical layer. Electrical layer 110 is shown, for simplicity, as being composed of two conventional IP routers 111 and 112. Optical layer 120 is shown as being composed of network elements or nodes 121–125 (Node 1-Node 5). Intermediate layer 130 depicts conventional ATM/SONET system 131 coupling IP router 112 to network element 122. Also shown as part of layer 130 is header network 132 which couples IP router 111 to network element 121. FIG. 1 pictorially illustrates the location of network 132 on a national-Scale, transparent WDM-based backbone network with full interoperability and reconfigurability. It is important to emphasize at this point that the focus in accordance with the present invention is on network element 132. Moreover, the elements of FIG. 1 are illustrative of one embodiment in accordance with the present invention. Thus, for example, element 111 may, in another embodiment, be an ATM router or even a switch.

Figure 2:
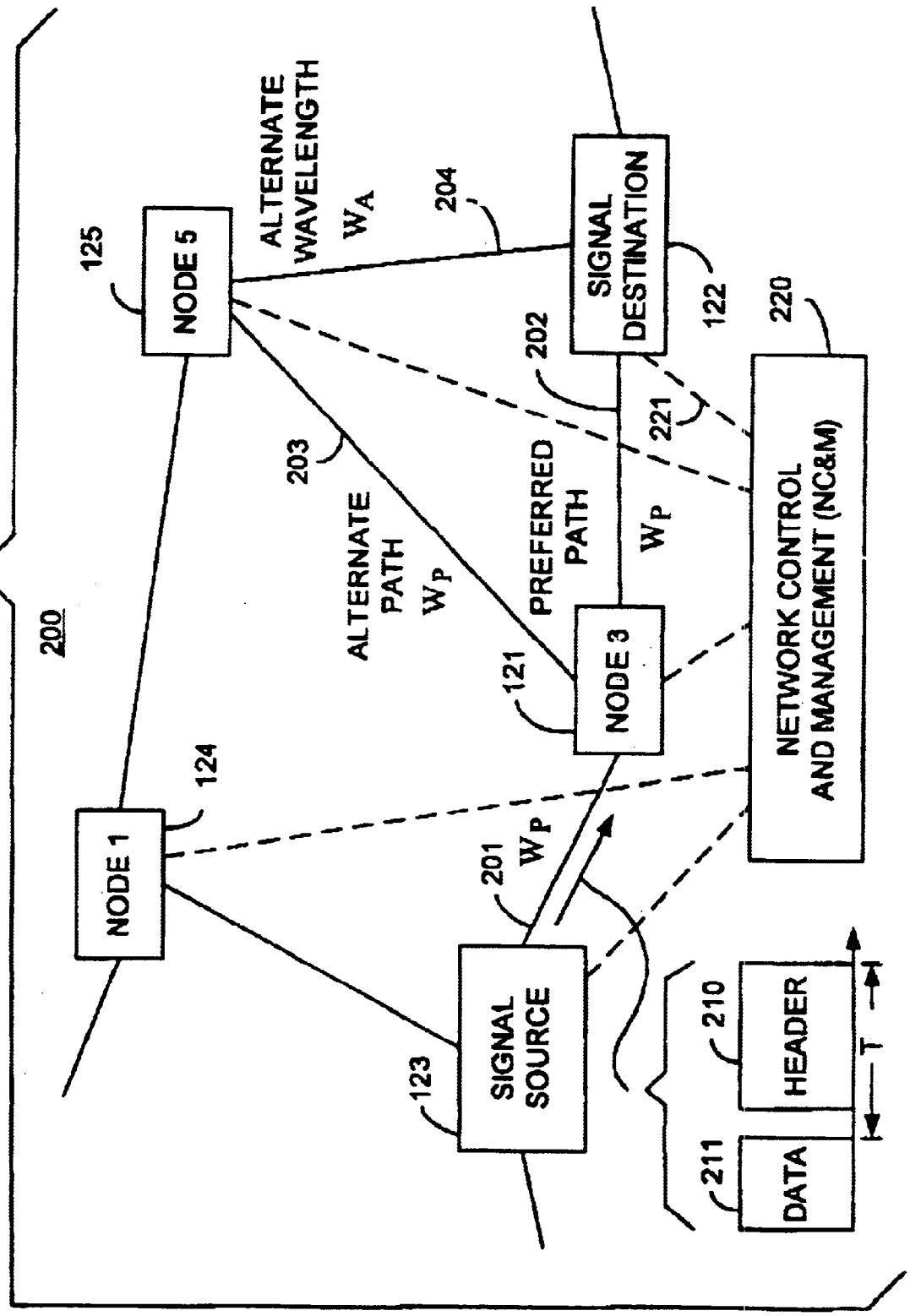
FIG. 2 illustrates the prior-art optical layer of the network of FIG. 1 showing the relationship between the optical signal header and data payload, and the use of the header/payload in network setup.

Now with reference to FIG. 2, which is the same as FIG. 2 of Chang, optical layer 120 of FIG. 1 is shown in more detail including the basic technique for setting up a fast connection in optical network 200, composed of network elements 121–125 (Node 1-Node 5); the setup uses optical signaling header 210 for the accompanying data payload 211. This technique combines the advantages of circuit-switched based WDM and packet-switched based IP technologies. Signaling information is added in the form of an optical signal header 210 which is carried in-band within each wavelength in the multi-wavelength transport environment. Optical signaling header 210, composed of a label containing routing and control information such as the source, destination, priority, and the length of the packet, propagates through optical network 200 preceding data payload 211. Each WDM network element 121–125 senses optical signaling header 210, looks-up a connection table (discussed later), and takes necessary steps such as crossconnections, add, drop, or drop-and-continue. The connection table is constantly updated by continuous communication between NC&M 220 and WDM network elements 121–125. Data payload 211, which follows optical signaling header 210, is routed through a path in each network element (discussed later) as established by the connection. With the arrangement of FIG. 2, there is no need to manage the time delay between optical signaling header 210 and data payload 211, shown by T in FIG. 2, because each network element provides the optical delay needed for the short time required for connection set-up within each network element via delay of an interposed fiber. Moreover, the format and protocol of the data payload is independent of that of the header, that is, for a given network whereas the format and protocol of the header are pre-determined, the format and the protocol of the data payload can be the same as or different from those of the header.

Each destination is associated with a preferred path which would minimize 'the cost'—in FIG. 2, the overall path from source 123 to destination 122 includes paths 201 and 202 in cascade, both utilizing wavelength WP. This cost is computed based on the total propagation distance, the number of hops, and the traffic load. The preferred wavelength is defaulted to the original wavelength. For example, the preferred wavelength on path 202 is WP. If this preferred path at the default wavelength is already occupied by another packet, then network element 121 quickly decides if there is an available alternate wavelength WA through the same preferred path. This alternate wavelength must be one of the choices offered by the limited wavelength conversion in network element 121. If there is no choice of wavelengths which allows transport of the packet through the most preferred path, the next preferred path is selected (path deflection). For example, in FIG. 2, paths 203 and 204 in cascade may represent the alternative path. At this point, the preferred wavelength will default back to the original wavelength WP. The identical process of looking for an alternate wavelength can proceed if this default wavelength is again already occupied. In FIG. 2, path 203 is an alternative path with the same wavelength WP, and path 204 is an alternate path using alternate wavelength WA. In an unlikely case where there is no combination of path and wavelength deflection can offer transport of the packet, network element 121 will decide to drop the packet of lower priority. In other words, the new packet transport through the preferred path at the originating wavelength takes place by dropping the other packet of the lower priority which is already occupying the preferred path.

Network elements 121–125 are augmented with two types of so-called 'Plug-and-Play' modules to efficiently handle bursty traffic by providing packet switching capabilities to conventional circuit-switched WDM network elements 121–125 whereby signaling headers are encoded onto IP packets and are removed when necessary.

Figure 3:
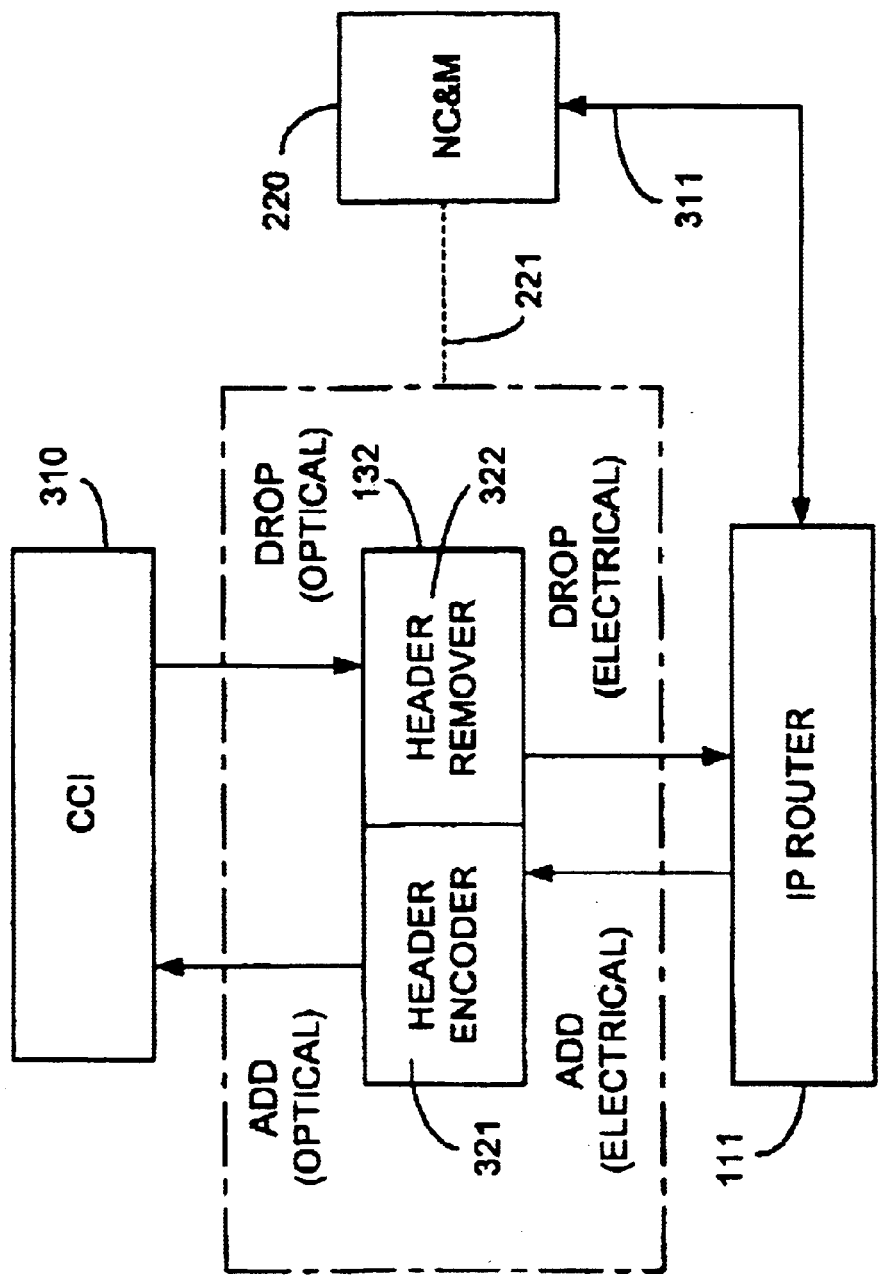
FIG. 3 is a high-level block diagram of one prior-art Plug & Play module affected by the present invention for header encoding and header removal.

The first type of 'Plug-and-Play' module, represented by electro-optical element 132 of FIG. 1, is now shown in block diagram form in FIG. 3, which is the same as FIG. 3 of Chang. Whereas conceptually module 132 is a stand-alone element, in practice, module 132 is integrated with network element 121 as is shown in FIG. 3; module 132 is interposed between compliant client interface (CCI) 310 of network element 121 and IP router 111 to encode optical signaling header 210 onto the packets added into the network via header encoder 321, and to remove optical signaling header 210 from the packets dropping out of the network via header remover 322.

Generally, encoding/removing module 132 is placed where the IP traffic is interfaced into and out of the VDM network, which is between the client interface of the network element and the IP routers. The client interfaces can be either a CCI-type or a non-compliant client interfaces (NCI)-type. At these interfaces, header encoder 321 puts optical header 210 carrying the destination and other information in front of data payload 211 as the IP signal is transported into network 200. Optical header 210 is encoded in the optical domain by an optical modulator (discussed later). Signaling header remover 322 deletes header 210 from the optical signal dropped via a client interface, and provides an electrical IP packet to IP router 111.

More specifically, module 132 accepts the electrical signal from IP router 111, converts the electrical signal to a desired compliant wavelength optical signal, and places optical header 210 in front of the entire packet. Module 132 communicates with NC&M 220 and buffers the data before optically converting the data if requested by NC&M 220. Module 132 employs an optical transmitter (discussed later) with the wavelength matched to the client interface wavelength. (As indicated later but instructive to mention here, module 132 is also compatible with NCI 404 of FIG. 4 since the wavelength adaptation occurs in the NCI; however, the bit-rate-compatibility of NCI wavelength adaption and the IP signal with optical headers must be established in advance.)

Figure 4:
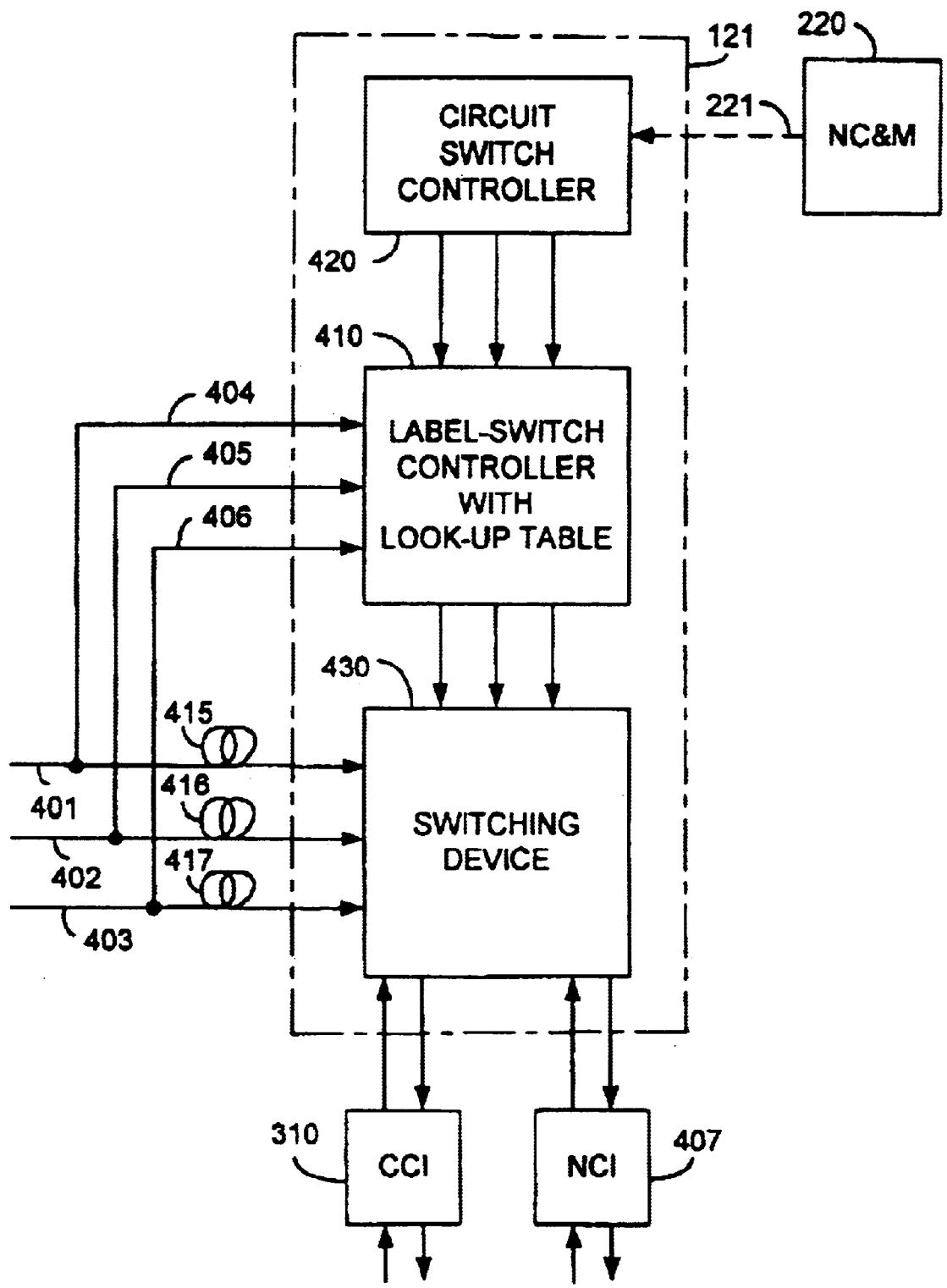
FIG. 4 is a high-level block diagram of another prior-art Plug & Play module affected by the present invention for routing a packet through a WDM network element.

FIG. 4, which is the same as FIG. 4 of Chang, depicts a second type of 'Plug-and-Play' module, optical element 410, which is associated with each WDM network element 121–125, say element 121 for discussion purposes. Module 410 is interposed between conventional network element circuit switch controller 420 and conventional switching device 430. Module 410 detects information from each signaling header 210 propagating over any fiber 401–403, as provided to module 410 by tapped fiber paths 404–406. Module 410 functions to achieve very rapid table look-up and fast signaling to switching device 430. Switch controller 420 is functionally equivalent to the conventional "craft interface" used for controlling the network elements; however, in this case, the purpose of this switch controller 420 is to accept the circuit-switched signaling from NC&M 220 and determine which control commands are to be sent to label switch controller 410 based on the priority. Thus, label switch controller 410 receives circuit-switched control signals from network element circuit switch controller 420, as well as information as derived from each signaling each header 210, and intelligently choose between the circuit-switched and the label-switched control schemes. The switches (discussed later) comprising switching device 430 also achieve rapid switching. The delay imposed by fibers 415, 416, or 416, which are placed in input paths 401–403 to switching device 430, are such that the delay is larger than the total time it takes to read signaling header 210, to complete a table look-up, and to effect switching. Approximately, a 2 km fiber provides 10 microsecond processing time. The types of WDM network elements represented by elements 121–125 and which encompass switching device 430 include: Wavelength Add-Drop Multiplexers (WADMs); Wavelength Selective Crossconnects (WSXCs); and Wavelength Interchanging Crossconnects (WIXCs) with limited wavelength conversion capabilities.

In operation, module 410 taps a small fraction of the optical signals appearing on paths 401–403 in order to detect information in each signaling header 210, and determine the appropriate commands for switching device 430 after looking up the connection table stored in module 410. The fiber delay is placed in paths 401–403 so that the packet having header 210 and payload 211 reaches switching device 430 only after the actual switching occurs. This fiber delay is specific to the delay associated with header detection, table look-up, and switching, and can typically be accomplished in about 10 microseconds with about 2 km fiber delay in fibers 415–417.

Since there is no optical-to-electrical, or electrical-to-optical conversion of data payload 211 at network elements 121–125, the connections are completely transparent. Contrary to IP routing, where a multiplicity of bit-rates and lower-level protocols increases the number of different interfaces required and consequently the cost of the router, routing by WDM label switching is transparent to bit-rates. By way of illustration, optical routing by network elements 121–125 is able to achieve 1.28 Tb/sec throughput (16×16 cross-connect switching device 430 with 32 wavelengths/fiber at 2.5 Gb/sec per wavelength) which is much larger than any of the current gigabit routers.

Each network element 121–125 in combination with NC&M 220 effects a routing protocol which is adaptive; the routing protocol performs the following functions: (a) measures network parameters, such as state of communication lines, estimated traffic, delays, capacity utilization, pertinent to the routing strategy; (b) forwards the measured information to NC&M 220 for routing computations; (c) computes of the routing tables at NC&M 220; (d) disseminates the routing tables to each network element 121–125 to have packet routing decisions at each network element. NC&M 220 receives the network parameter information from each network element, and updates the routing tables periodically, then (e) forwards a connection request from an IP router such as element 111 to NC&M 220, and (f) forwards routing information from the NC&M 220 to each network element 121–125 to be inputted in optical signaling header 210.

Packets are routed through network 200 using the information in signaling header 210 of each packet. When a packet arrives at a network element, signaling header 210 is read and either the packet (a) is routed to a new appropriate outbound port chosen according to the label routing look-up table, or (b) is immediately forwarded through an already existing label-switching originated connection within the network element. The latter case is referred to as "flow switching" and is supported as part of optical label-switching; flow switching is used for large volume bursty mode traffic.

Label-switched routing look-up tables are included in network elements 121–125 in order to rapidly route the optical packet through the network element whenever a flow switching state is not set-up. The connection set-up request conveyed by optical signaling header 210 is rapidly compared against the label-switch routing look-up table within each network element. In some cases, the optimal connections for the most efficient signal routing may already be occupied. The possible connection look up table is also configured to already provide an alternate wavelength assignment or an alternate path to route the signal. Providing a limited number of (at least one) alternative wavelength significantly reduces the blocking probability. The alternative wavelength routing also achieves the same propagation delay and number of hops as the optimal case, and eliminates the difficulties in sequencing multiple packets. The alternate path routing can potentially increase the delay and the number of hops, and the signal-to noise-ratio of the packets are optically monitored to eliminate any possibility of packets being routed through a large number of hops. In the case where a second path or wavelength is not available, contention at an outbound link can be settled on a first-come, first-serve basis or on a priority basis. The information is presented to a regular IP router and then is reviewed by higher layer protocols, using retransmission when necessary.

1.2) Routing Example

Figure 5:
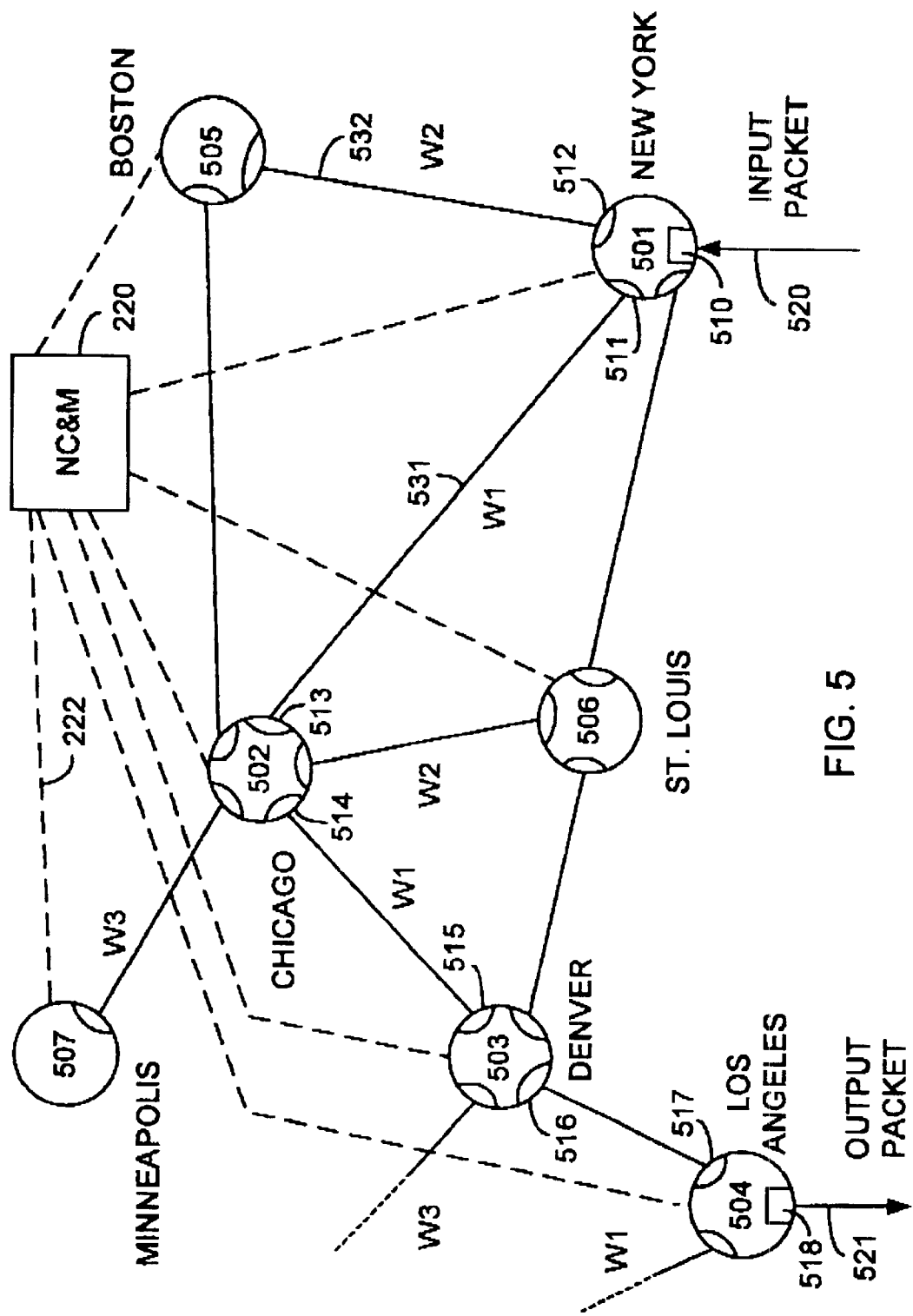
FIG. 5 is illustrative of a WDM circuit-switched backbone network.

An illustrative WDM circuit-switched backbone network 500 for communicating packets among end-users in certain large cities in the United States is shown in pictorial form in FIG. 5 (the same as FIG. 5 in Chang)—network 500 is first discussed in terms of its conventional operation, that is, before the overlay of WDM multicast optical label switching in accordance with the present invention is presented.

With reference to FIG. 5, it is supposed that New York City is served by network element 501, Chicago is served by network element 502, . . . , Los Angeles is served by network element 504, . . . , and Minneapolis by network element 507. (Network elements may also be referred to a nodes in the sequel.) Moreover, NC&M 220 has logical connections (shown by dashed lines, such as channel 221 to network element 501 and channel 222 to network element 507) to all network elements 501–507 via physical layer optical supervisory channels; there is continuous communication among NC&M 220 and network elements 501–507. NC&M 220 periodically requests and receives information about: (a) the general state of each network element (e.g., whether it is operational or shut down for an emergency); (b) the optical wavelengths provided by each network element (e.g., network element 501 is shown as being served by optical fiber medium 531 having wavelength W1 and optical fiber medium 532 having wavelength W2 which connect to network elements 502 (Chicago) and 505 (Boston), respectively); and (c) the ports which are served by the wavelengths (e.g., port 510 of element 501 is associated with an incoming client interface conveying packet 520, port 511 is associated with W1 and port 512 is associated with W2, whereas port 513 of element 502 is associated with W1).

Thus, NC&M 220 has stored at any instant the global information necessary to formulate routes to carry the incoming packet traffic by the network elements. Accordingly, periodically NC&M 220 determines the routing information in the form of, for example, global routing tables, and downloads the global routing tables to each of the elements using supervisory channels 221, 222, . . . . The global routing tables configure the ports of the network elements to create certain communication links. For example, NC&M 220 may determine, based upon traffic demand and statistics, that a fiber optic link from New York City to Los Angeles (network elements 501 and 504, respectively) is presently required, and the link will be composed, in series, of: WI coupling port 511 of element 501 to port 513 in network element 502; W1 coupling port 514 of element 502 to port 515 of element 503; and W2 coupling port 516 of element 503 to port 517 of element 504. Then, input packet 520 incoming to network element 501 (New York City) and having a destination of network element 504 (Los Angeles) is immediately routed over this established link. At network element 504, the propagated packet is delivered as output packet 521 via client interface port 518.

In a similar manner, a dedicated path between elements 506 and 507 (St. Louis and Minneapolis, respectively) is shown as established using W2 between network elements 506 and 502, and W3 between elements 502 and 507.

Links generated in this manner—as based upon the global routing tables—are characterized by their rigidity, that is, it takes several seconds for NC&M 220 to determine the connections to establish the links, to download the connectivity information for the links, and establish the input and output ports for each network element. Each link has characteristics of a circuit-switched connection, that is, it is basically a permanent connection or a dedicated path or "pipe" for long intervals, and only NC&M 220 can tear down and re-establish a link in normal operation. The benefit of such a dedicated path is that traffic having an origin and a destination which maps into an already-established dedicated path can be immediately routed without the need for any set-up. On the other hand, the dedicated path can be, and most often is, inefficient in the sense that the dedicated path may be only used a small percentage of the time (e.g., 20%–50% over the set-up period). Moreover, switching device 430 (see FIG. 4) embedded in each network element which interconnects input and output ports has only a finite number of input/output ports. If the above scenario is changed so that link from St. Louis to Minneapolis is required and a port already assigned to the New York to Los Angeles link is to be used (e.g., port 514 of network element 502), then there is a time delay until NC&M 220 can respond and alter the global routing tables accordingly.

1.3) Label-switching of Chang

Figure 6:
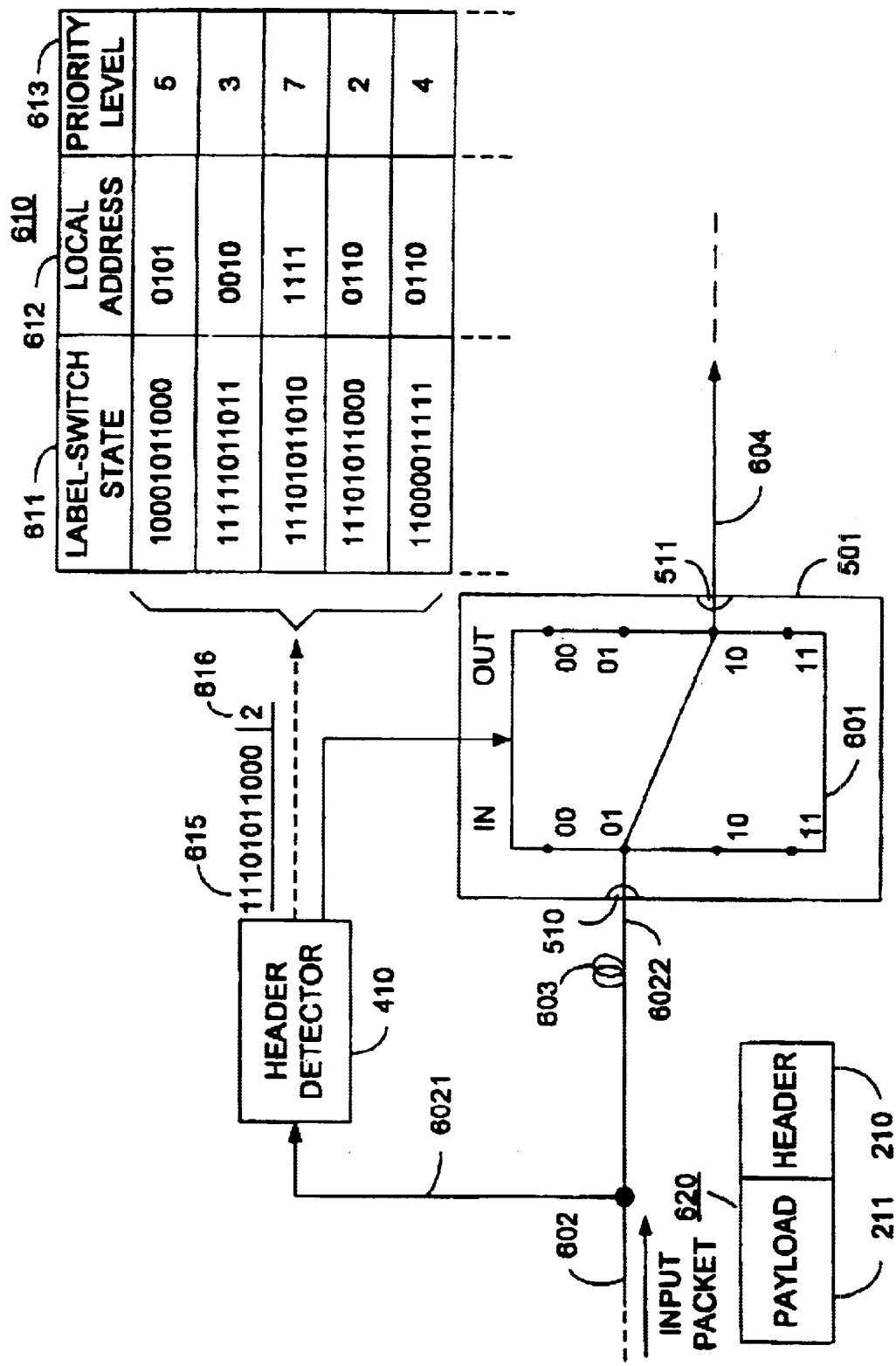
FIG. 6 illustrates a network element of FIG. 1 with an embedded prior-art switch and the use of a prior-art local routing table.

Now the example of FIG. 5 is expanded to overlay the details of label-switching, as taught by Chang, on the above description. NC&M 220 is further arranged so that it may assign the label-switch state to each packet incoming to a network element from a client interface—the label-switch state is appended by Plug & Play module 132 and, for the purposes of the present discussion, the label-switch state is commensurate with header 210 (see FIG. 2). The label-switch state is computed by NC&M 220 and downloaded to each network element 501–507 in the form of a local routing table. With reference to FIG. 6, there is shown network element 501 and its embedded switch 601 in pictorial form. Also shown is incoming optical fiber 602, with delay loop 603, carrying packet 620 composed of header 210 and payload 211—payload 211 in this case is packet 520 from FIG. 5. Fiber 6022 delivers a delayed version of packet 620 to network element 501. Also, a portion of the light energy appearing on fiber 602 is tapped via fiber 6021 and inputted to optical module 410 which processes the incoming packet 620 to detect header 210—header 210 for packet 620 is shown as being composed of the label-switch state '11101011000', identified by reference numeral 615. Also shown in FIG. 6 is local look-up table 610, being composed of two columns, namely, "Label-Switch State" (column 611), and "Local Address" (column 612). The particular label-switch state for packet 620 is cross-referenced in look-up table 610 to determine the routing of the incoming packet. In this case, the label-switch state for packet 620 is the entry in the fourth row of look-up table 610. The local switch address corresponding to this label-switch state is "0110", which is interpreted as follows: the first two binary digits indicate the incoming port, and the second two binary digits indicate the output port. In this case, for the exemplary four-input, four-output switch, the incoming packet is to be routed from input port "01" to output port "10", so switch 601 is switched accordingly (as shown). After the delay provided by fiber delay 603, the incoming packet on fiber 6022 is propagated onto fiber 604 via switch 601.

The foregoing description of label-switch state indicates how it is used. The manner of generating the label-switch state is now considered. NC&M 220, again on a periodic basis, compiles a set of local look-up tables for routing/switching the packet through each corresponding network element (such as table 610 for network element 501), and each look-up table is then downloaded to the corresponding network element. The generation of each look-up table takes into account NC&M 220's global knowledge of the network 500. For instance, if incoming packet 620 to network 501 is destined for network 504 (again, New York to Los Angeles), if port 510 is associated with incoming port "01" and serves fiber 602, and if outgoing port 511 is associated with outgoing port "10" and serves fiber 604, then NC&M 220 is able to generate the appropriate entry in look-up table 610 (namely, the fourth row) and download table 610 to network element 510. Now, when packet 520 is processed by electro-optical module 132 so as to add header 210 to packet 520 to create augmented packet 620, NC&M 220's knowledge of the downloaded local routing tables as well as the knowledge of the destination address embedded in packet 520 as obtained via module 132 enables NC&M 220 to instruct module 132 to add the appropriate label-switch state as header 210—in this case '11101011000'.

It can be readily appreciated that processing a packet using the label-switch state parameter is bursty in nature, that is, after switch 601 is set-up to handle the incoming label-switch state, switch 601 may be returned to its state prior to processing the flow state. For example, switch 601 may have interconnected input port '01' to output port '10' prior to the arrival of packet 620, and it may be returned to the '0110' state after processing (as determined, for example, by a packet trailer). Of course, it may be that the circuit-switched path is identical to the label-switch state path, in which case there is no need to even modify the local route through switch 601 for processing the label-switch state. However, if it is necessary to temporarily alter switch 601, the underlying circuit-switched traffic, if any, can be re-routed or re-sent.

As discussed so far, label switching allows destination oriented routing of packets without a need for the network elements to examine the entire data packets. New signaling information—the label—is added in the form of optical signal header 210 which is carried in-band within each wavelength in the multi-wavelength transport environment. This label switching normally occurs on a packet-by-packet basis. Typically, however, a large number of packets will be sequentially transported towards the same destination. This is especially true for bursty data where a large block of data is segmented in many packets for transport. In such cases, it is inefficient for each particular network element to carefully examine each label and decide on the routing path. Rather, it is more effective to set up a "virtual circuit" from the source to the destination. Header 210 of each packet will only inform continuation or ending of the virtual circuit, referred to as a flow state connection. Such an end-to-end flow state path is established, and the plug-and-play modules in the network elements will not disrupt such flow state connections until disconnection is needed. The disconnection will take place if such a sequence of packets has come to an end or another packet of much higher priority requests disruption of this flow state connection.

The priority aspect of optical label-switching is also shown with respect to FIG. 6. The local look-up table has a "priority level" (column 613) which sets forth the priority assigned to the label-switching state. Also, header 210 has appended priority data shown as the number '2' (reference numeral 616). Both the fourth and fifth row in the "label-switch state" column 611 of table 610 have a local address of '0110.' If an earlier data packet used the entry in the fifth row to establish, for example, a virtual circuit or flow switching state, and the now another packet is processed as per the fourth row of column 611, the higher priority data ('2' versus '4', with '1' being the highest) has precedent, and the virtual circuit would be terminated.

1.4) Optical Multicasting In Accordance with the Present Invention

Figure 7:
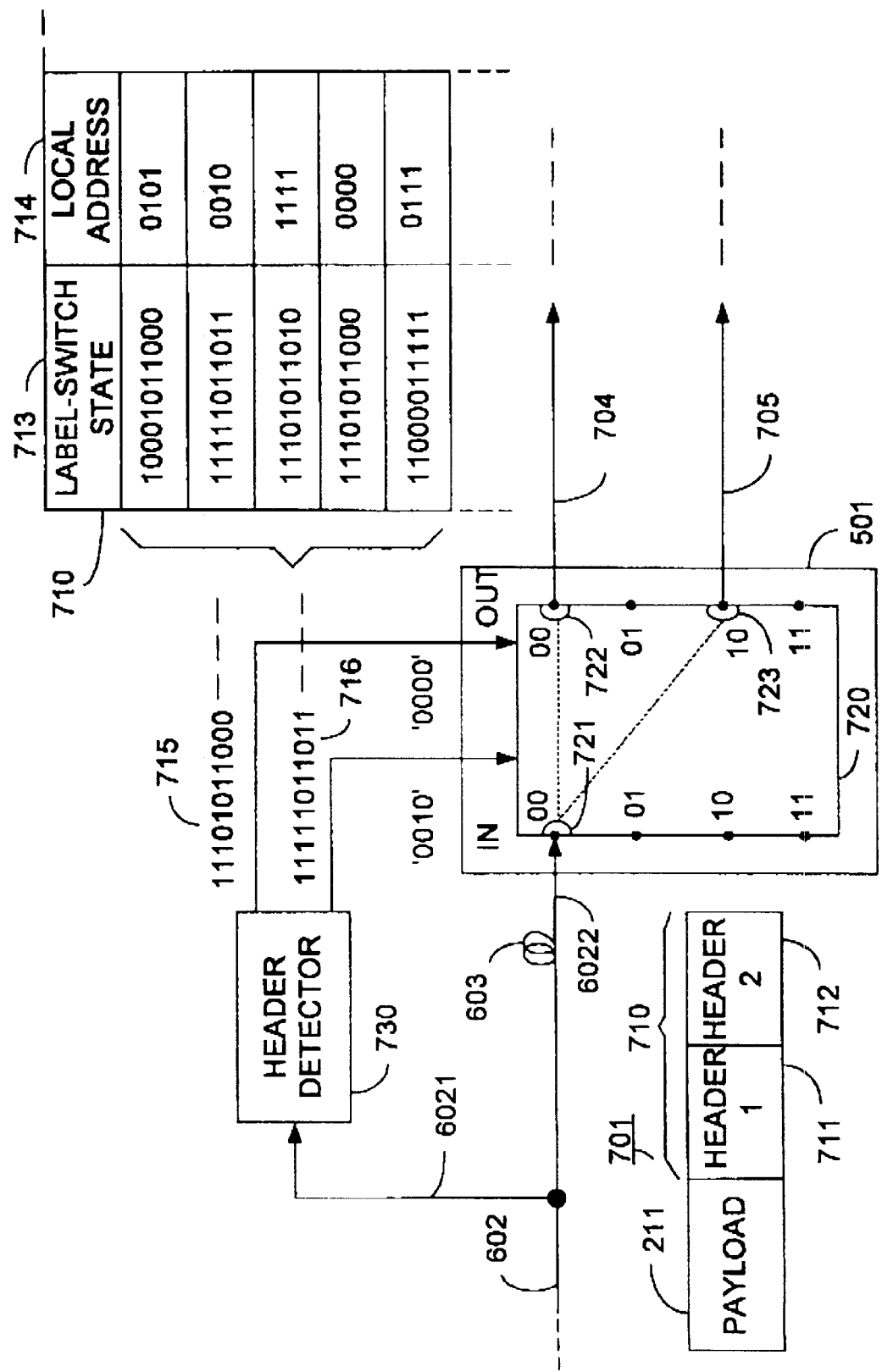
FIG. 7 illustrates a conceptual view of substantive changes to the arrangement of FIG. 6 to effect multicasting in accordance with the present invention.

One point of departure over the prior art in accordance with the present invention is initially best described with reference to FIG. 7, which depicts the substantive changes to FIG. 6 to effect optical multicasting for one embodiment of the present invention. In FIG. 7, packet 701 is composed of payload 211 and header 710; header 710 is further composed of two sub-headers 711 and 712. Header detector 730, arranged to receive a portion of the light energy appearing on fiber 602 tapped via fiber 6021, processes the incoming packet 701 to detect sub-headers 711 and 712. Sub-header 711, for illustrative purposes, contains the label-switch state '11101011000', identified by reference numeral 715. In addition, sub-header 712 conveys, illustratively, '11111011011', identified by reference numeral 716. A pertinent portion of local look-up table 710, which is the counterpart to table 610 of FIG. 6, is shown in FIG. 7; FIG. 7 depicts label switch states 713 and local addresses 714. The particular label-switch states conveyed by packet 701 are cross-referenced in look-up table 710 to determine the routing of the incoming packet. In this example, the label-switch states for packet 701 correspond to the entries in the fourth and second rows of the label switch column 713 of look-up table 710, respectively, for sub-headers 711 and 712. Using these rows as a cross-reference to local address column 714 then, conceptually, packet 701 arriving at input port 721 (IN-'00') of multicast optical switch 720 via optical path 6022 is to be concurrently switched to both output ports 722 (OUT-'00') and 723 (OUT-'10') to effect multicasting, with the split packets then being propagated concurrently over output paths 704 and 705, respectively. (It should be noted in the disclosure of Chang, a packet appearance at an input port is precluded from being concurrently switched to two output ports because of the structural limitations inherent in optical switch 601 of FIG. 6.)

The essence of optical multicasting is the arrangement of optical switch 720 to physically implement what has just been described conceptually, namely, effecting the multiple switching of a packet arriving at an input port to deliver representative versions of the packet to a plurality of output ports and, in turn, to a plurality of optical paths coupled to these ports. One embodiment of such an optical switch arrangement is now discussed, commencing with reference to FIG. 8.

Figure 8:
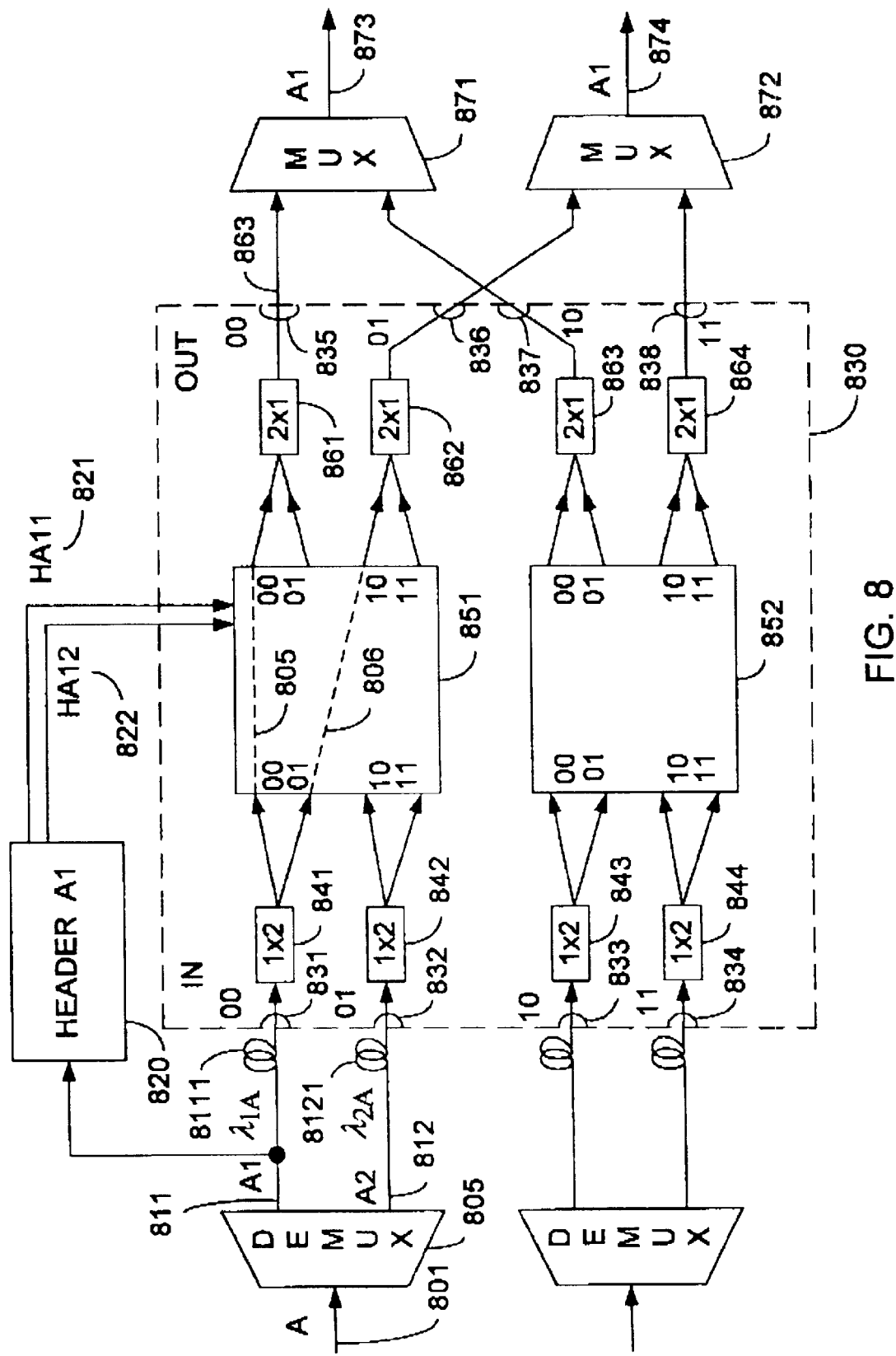
FIG. 8 depicts an illustrative embodiment of an optical switching arrangement to multicast a single incoming optical signal over two output paths.

In FIG. 8, composite optical signal A, appearing on optical path 801, serves as an input to optical demultiplexer 805. Demultiplexer 805 produces at its output the individual optical wavelengths which compose optical signal A, namely in this illustrative embodiment, two wavelengths $\lambda_{1A}$ and $\lambda_{2A}$ appearing on leads 811 and 812, respectively; the individual optical signals being conveyed by these wavelengths are denoted by signals A1 and A2, respectively. Delayed versions of the signals appearing on paths 811 and 812 serve as inputs to composite optical switch 830; delay is accomplished, for example, by optical delay lines 8111 and 8121, respectively.

The focus of FIG. 8 is on the processing of optical signal A1 conveyed by $\lambda_{1A}$ on optical path 811 as A1 arrives at the input to composite optical switch 830 via delay line 8111. (Switch 830 is shown as dashed because it is being used as a conceptual aid to link FIGS. 7 and 8; it will be removed in the sequel once the link between FIGS. 7 and 8 is explained). Switch 830 can be visualized as a 4×4 switch having input ports 831, ..., 834 and output ports 835, ..., 838. Optical signal A1 is split into two counterparts via 1×2 optical splitter 841. One of the two split signals serves as an input to 4×4 optical switch 851, via input port '00', and the other split signal appears at input port '01' of switch 851. Switch 851, along with similar 4×4 switch 852, compose conceptual composite optical switch 830. Optical signal A1 also serves as an input to header detector 820, which is depicted as stripping the header from signal A1 to produce 'HEADER A1'. For this example, it is presumed that the header of signal A1 has two sub-headers, namely, header 821 ('HA11') and header 822 ('HA12'). Moreover, if these sub-headers convey information commensurate with headers 715 and 716, respectively, of FIG. 7, then A1 is to be switched concurrently from port 831 (IN-'00') to output ports 835 (OUT-'00') and 837 (OUT-'10') of composite conceptual switch 830. In turn, this requires that optical switch 851 operates to switch the signal appearing at its '00' input port (the first split version of A1) to its '00' output port, and concurrently, switch 851 operates to switch the signal appearing at its '01' input port (the second split version of A1) to its '10' output port —via dashed connections 805 and 806, respectively, through switch 851. To effect this operation of switch 851, header HA11 points to local address '0000' and header HA12 points to local address '0110'.

Signal A1 appearing at output port '00' of switch 851 is coupled to one input port of 2×1 optical combiner 861, with the other input port of combiner 861 being coupled to output port '01' of switch 851. Similarly, signal A1 appearing at output port '10' serves as a first input to optical combiner 862, with the other input to combiner 862 being provided by output port '11' of switch 851. In turn, combiner 861 serves as one input to wideband multiplexer 871 (e.g., a coupler), whereas combiner 862 provides one input to wideband multiplexer 872. It is now apparent that input optical signal A1 appearing at the output of demultiplexer 805 is thereby propagated from each multiplexer 871 and 872 over output optical paths 873 and 874, respectively, whenever multicasting of optical signal A1 is required.

By way of terminology, a "local route" through a node or network element can now be understood with reference to FIG. 8. For example, one local route of optical signal A1 as it travels from input demultiplexer 805 to output link 873 is via the following sequence of optical elements and optical paths: (a) optical path 811; (b) optical delay line 8111; (c) optical splitter 841; (d) optical switch 851 via internal cross-connect path 805; (e) optical combiner 861; (f) optical path 863 from combiner 861 to multiplexer 871; and (g) output optical link 873 from multiplexer 871. Generally, then, a "local route" or ("route" for short) is the overall cascade of elements and paths traversed by an input optical signal to propagate from an input port of a node/network element to an output port of the node/network element.

Figure 9:
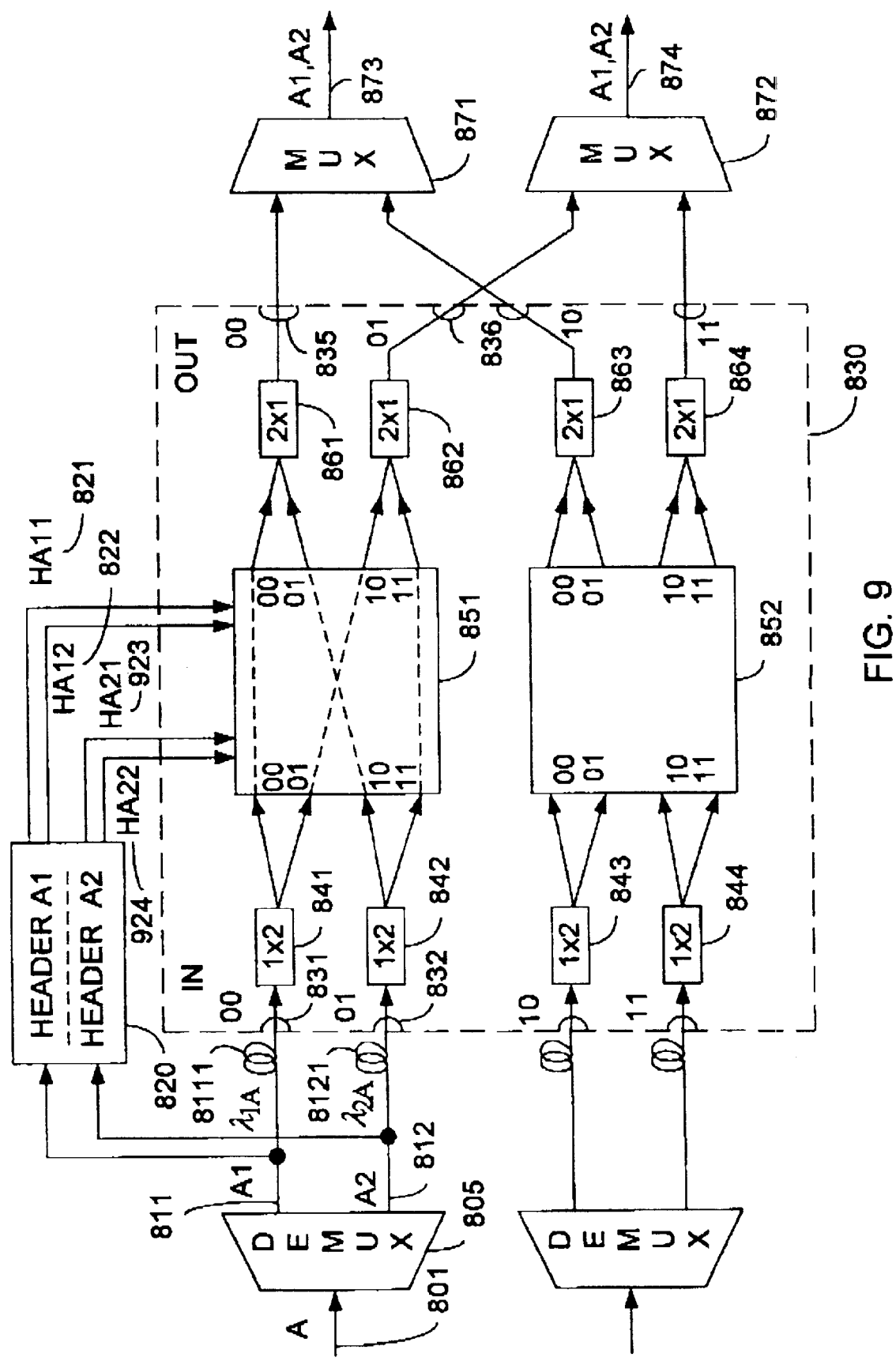
FIG. 9 depicts an illustrative embodiment of the optical switching arrangement of FIG. 8 to multicast two incoming optical signals over two output paths.

With reference to FIG. 9, as is readily contemplated, switch 851 also operates to switch the optical signal A2 appearing on optical path 812 to effect multicasting. Splitter 842 and input ports '10' and '11' along with output ports '01' and '11' are the functional counterparts to splitter 841 and the '00' and '01' input ports and the '00' and '10' output ports, respectively. In FIG. 9, the internal switched paths for switch 851 to achieve multicasting of both A1 nd A2 are shown. Moreover, optical signal A2 propagates a header; this header ('HEADER A2') is detected by header processor 820 to yield two sub-headers 'HA21' and 'HA22' denoted by reference numerals 923 and 924, respectively. These sub-headers conveyed by signal A2 are used to look-up local addresses for switching optical switch 851 to couple, as shown, input port '10' to output port '01', and input port '11' to output port '11'. Optical 4×4 switch 851 is now fully utilized, that is, four active inputs couple to four active outputs.

Figure 10:
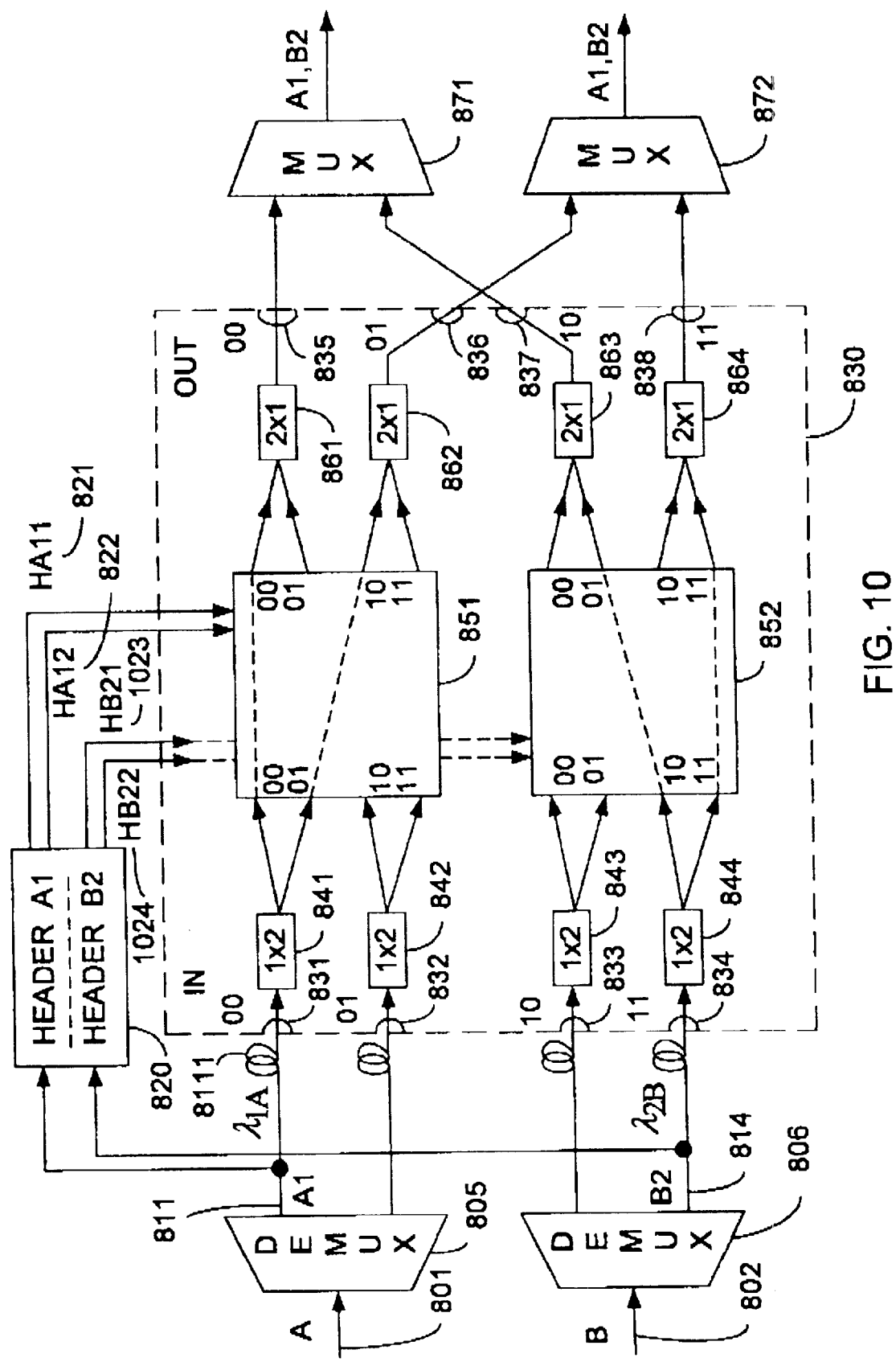
FIG. 10 depicts an illustrative embodiment of the optical switching arrangement of FIG. 8 to multicast two incoming optical signals, each delivered by a separate composite signal, over two output paths.

With reference to FIG. 10, as is further readily contemplated, switch 852 operates in a manner substantially identical to switch 851 to accomplish multicasting of the optical signals composing optical signal B appearing on optical path 802. In FIG. 10, two optical signals are multicast, namely, signal A1 appearing on input optical path 801 and signal B2 appearing on input optical path 802. Optical signal B2 is split in two by optical splitter 844. Optical switch 852 couples the '10' input to the '01' output, and the '11' input to the '11' output. This switching is accomplished by information in local look-up table 710 upon the processing of the header of optical signal B2 in header detector 820 ('HEADER B2'). Local addresses provided by sub-headers 'HB21' and 'HB22', derived from 'HEADER B2', serve as inputs to optical switch 852. In turn, the '01' output of switch 852 serves as one input to 2×1 combiner 863, and the '11' output provides one input to 2×1 combiner 864. The output of combiner 863 is coupled to multiplexer 871, and the output of combiner 864 couples to multiplexer 872. The optical signal A1 switched by switch 851 is as described with respect to FIG. 8. Thus, the output of multiplexer 871 is a composite signal having components A1, B2; likewise, the output of multiplexer 872 is the same composite signal A1,B2. The multicast properties of the outputs are evident.

Figure 11:
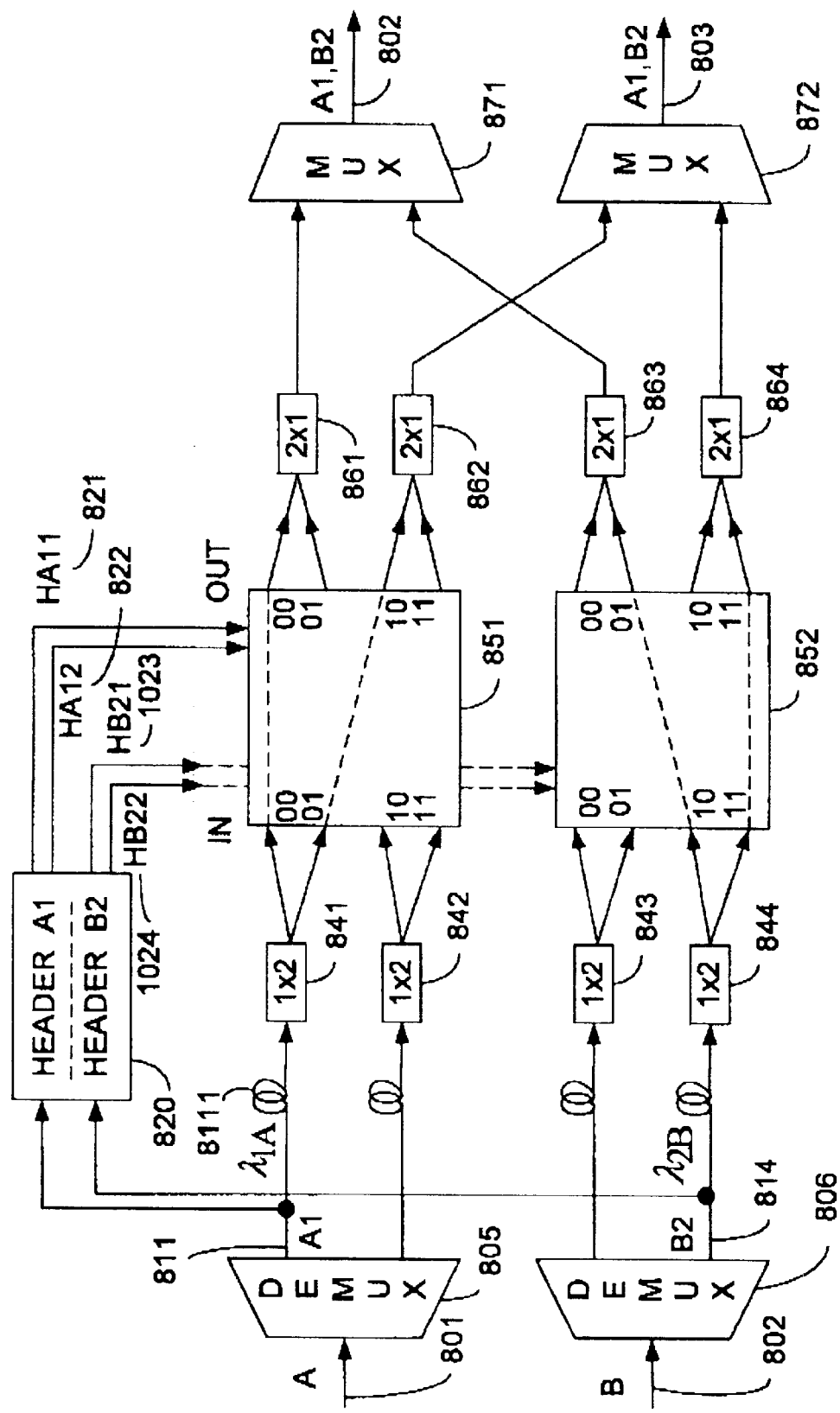
FIG. 11 depicts the arrangement of FIG. 10 wherein the conceptual optical switch used to explain multicasting is removed to reveal the physical realization of an exemplary multicasting switching arrangement.

As alluded to earlier, conceptual switch 830, used as a pictorial aid to elucidate the principles of the present invention, can now be removed to yield the actual physical representation of one embodiment of the optical switching system in accordance with the present invention. The actual physical representation is shown in FIG. 11, which depicts the same multicasting switching example as in FIG. 10, but with conceptual switch 830 removed.

In order to operate each switch 851 or 852 in the manner described with reference to FIGS. 8–11, each header must contain information not previously conveyed by Chang. For instance, in the example, two sub-headers for each optical signal must now be processed to obtain two local addresses. NC&M 220 is arranged with node interconnection and node structure information, so the arrangement of optical switches such as in FIG. 11 is given information. Moreover, each input node, that is, the node that appends header information, is provided sufficient information by NC&M 220 to formulate the header so as to effect the required switching at remaining network nodes. For example, header information may be appended to the payload at the input node with reference to Table 1 presuming the structure of optical switches 851 and 852 of FIG. 11:

TABLE 1

|  | Switch | LOCAL ADDRESS |
|---|---|---|
| Deliver optical signal A1 to multiplexer 871 | 851 | 0000 |
| Deliver optical signal A1 to multiplexer 872 | 851 | 0110 |
| Deliver optical signal A2 to multiplexer 871 | 851 | 1001 |
| Deliver optical signal A2 to multiplexer 872 | 851 | 1111 |
| Deliver optical signal B1 to multiplexer 871 | 852 | 0000 |
| Deliver optical signal B1 to multiplexer 872 | 852 | 0110 |
| Deliver optical signal B2 to multiplexer 871 | 852 | 1001 |
| Deliver optical signal B2 to multiplexer 872 | 852 | 1111 |

A portion of an actual look-up table, as distinct from the conceptual information of table 710 in FIG. 7, used to switch optical signal A1, based upon the information of Table 1 as well as the exemplary headers shown in discussing FIG. 7, is as follows in Table 2:

TABLE 2

| LABEL-SWITCHING STATE | LOCAL ADDRESS |
|---|---|
| — | — |
| 11111011011 | 0110 |
| — | — |
| 11101011000 | 0000 |
| — | — |

The illustrative embodiment of FIGS. 7–11 depicted an arrangement of optical switches 851 and 852 for a specific example of two composite optical signals each conveying two individual optical signals; furthermore, each individual optical signal is being propagated utilizing a given wavelength. It is readily understood by one skilled in the art that the example can be generalized for more than two composite signals, two individual optical signals, and two wavelengths.

Figure 12:
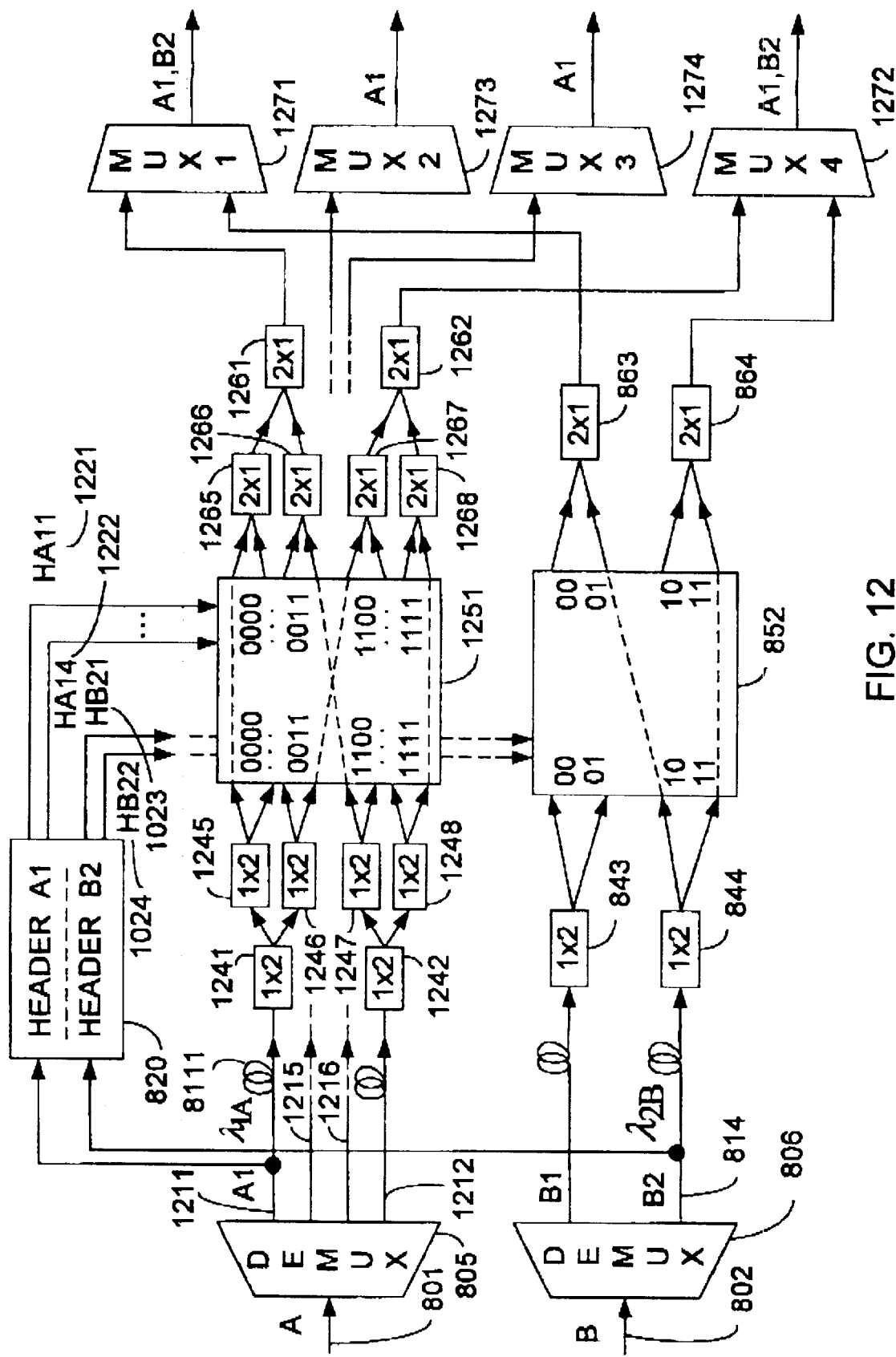
FIG. 12 depicts yet another illustrative embodiment of a switching arrangement to multicast more than two incoming signals composing an incoming composite optical signal.

By way of generalization, reference is made to FIG. 12, which is an augmented version of FIG. 11 depicting that signal A is now composed of four wavelengths appearing on optical paths 1211, 1215, 1216, and 1212. Optical path 1211 serves as an input to 1×2 splitter 1241; in turn, optical splitter 1241 provides inputs to 1×2 optical splitters 1245 and 1246—this cascade of splitters is referred to as two-stage splitting. Optical splitters 1245 and 1246 provide four split versions of the original optical signal appearing on optical path 1211 to four input ports of 16×16 optical switch 1251, namely, to input ports '0000'. . . , '0011'. Similarly, optical path 1215 serves as an input to a cascade of optical 1×2 splitters (not shown, but similar to splitters 1241, 1245, and 1246) and, in turn, the split optical signals representative of the optical signal appearing on optical path 1215 serve as inputs to optical switch 1251 at input ports '0100', . . . , '0111'. In addition, optical path 1216 serves as an input to another cascade of optical 1×2 splitters (again not shown) and this splitter cascade is coupled to switch 1251 via input ports '1000', . . . , '1011'. Finally, optical path 1212 is coupled to 1×2 splitter 1242 which, in turn, couples to 1×2 splitters 1247 and 1248. Splitters 1247 and 1248 provide four split versions of the optical signal on path 1212 to inputs to ports '1100', . . . '1111'. Optical switch 1251 is now a 16×16 optical switch having input ports '0000', '0001', . . . , 1111', and corresponding output ports '0000', '0001', . . . , 1111'.

Output ports '0000' and '0001' of switch 1251 couple to 2×1 combiner 1265, output ports '0010' and '0011' couple to 2×1 combiner 1266, . . . , output ports '1100' and '1101' couple to 2×1 optical combiner 1267 and, finally, output ports '1110' and '1111' couple to 2×1 combiner 1268. In turn, combiners 1265 and 1266 provide inputs to second-stage 2×1 combiner 1261 and combiners 1267 and 1268 serve as inputs to second stage 2×1 combiner 1262. Combiner 1261 provides one input to multiplexer 1271 ('MUX 1') and combiner 1262 provides one input to multiplexer 1272 ('MUX 4'). Other second stage combiners (not shown) provide inputs to multiplexers 1273 and 1274, respectively ('MUX 2' and 'MUX3'). The cascade of, for example, combiners 1265, 1266, and 1261 is referred to as two-stage combining.

Four illustrative switched paths through optical switch 1251 are shown for expository purposes, namely, the paths from (a) input port '0000' to output port '0000', (b) input port '0011' to output port '1100', (c) input port '1100' to output port '0011', and (d) input port '1111'to output port '1111' The first path delivers optical signal A1 to multiplexer 1271, the second path delivers A1 to multiplexer 1272, the third path delivers the optical signal on path 1212 to multiplexer 1271, and the fourth path delivers the optical signal on path 1212 to multiplexer 1272. It is clear that A1 can appear at the output of any of the multiplexers, some of the multiplexers, or all of the multiplexers depending upon the number of sub-headers conveyed by optical signal A1. For expository purposes, 'HEADER A1' is presumed to be composed of four headers 'HA11', . . . , 'HA14' referred to by reference numerals 1221, . . . 1222, respectively.

Switch 852 is a 4×4 optical switch arrangement as previously discussed. In the block diagram of FIG. 12, B2 is only multicast to multiplexers 1271 and 1272, but not 'MUX 2' or 'MUX 3'. (If it is desired to multicast B2 to 'MUX 2' and 'MUX 3', then it would be necessary to interpose two-stage splitting and two-stage combining, as discussed with respect to switch 1251, as well replacing 4×4 optical switch 852 with an 16×16 optical switch.)

Table 3 below reflects a portion of the known information to append appropriate header information given the structure of optical switches 1251 and 852 of FIG. 12:

TABLE 3

|  | Switch | LOCAL ADDRESS |
|---|---|---|
| Deliver optical signal A1 to multiplexer 1271 | 1251 | 00000000 |
| Deliver optical signal A1 to multiplexer 1273 | 1251 | 00010100 |
| Deliver optical signal A1 to multiplexer 1274 | 1251 | 00101000 |
| Deliver optical signal A1 to multiplexer 1272 | 1251 | 00111100 |
| Deliver optical signal A2 to multiplexer 1271 | 1251 | 01000001 |
| Deliver optical signal A2 to multiplexer 1273 | 1251 | 01010101 |
| Deliver optical signal A2 to multiplexer 1274 | 1251 | 01101001 |
| Deliver optical signal A2 to multiplexer 1272 | 1251 | 01111101 |
| Deliver optical signal B1 to multiplexer 1271 | 852 | 0000 |
| Deliver optical signal B1 to multiplexer 1272 | 852 | 0110 |
| Deliver optical signal B2 to multiplexer 1271 | 852 | 1001 |
| Deliver optical signal B2 to multiplexer 1272 | 852 | 1111 |

Figure 13:
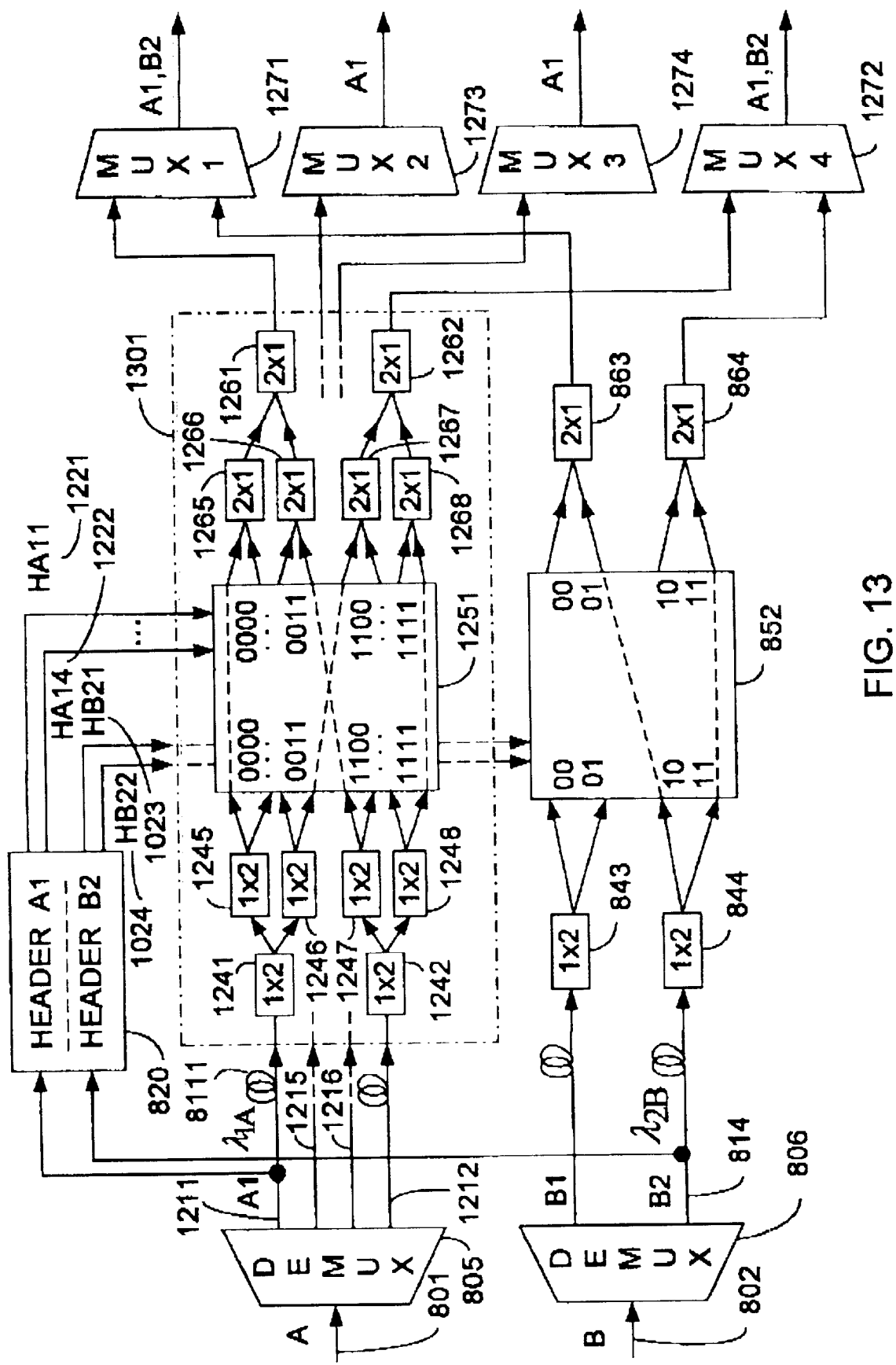
FIG. 13 is a grouping of elements from FIG. 12 used as a building-block optical system useful for scaling a multicast switching node.

To understand how a system composed of a cascade of elements that perform splitting-switching-combining functions, consider the elements encompassed by dashed box 1301 in FIG. 13—which is overlaid on components of FIG. 12. System 1301 may be considered a basic building block upon which to build other more complex optical switching systems to thereby provide an optical switching system of appropriate size for any given network node. System 1301, now referred to as a 16×16 optical system, includes: two-stage splitting (splitters 1241 feeding splitters 1245 and 1246, and so forth); 16×16 optical switch 1251; and two-stage combining (combiners 1265 and 1266 feeding combiner 1261, and so forth).

Figure 14:
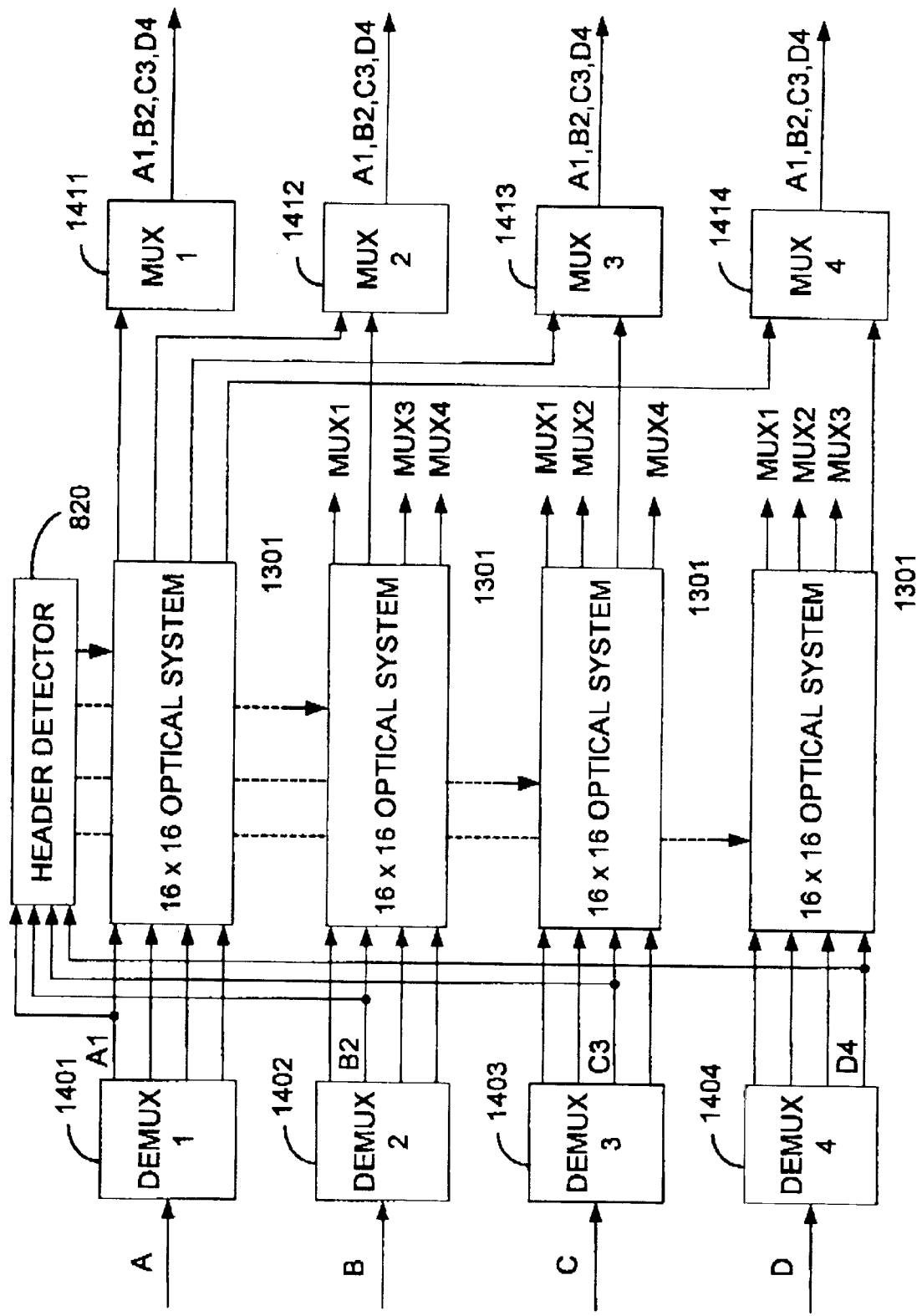
FIG. 14 depicts use of the building-block optical system in a more complex illustrative embodiment of a multicasting switching arrangement.

The use of system 1301 as a building block is demonstrated with reference to FIG. 14. In FIG. 14, four such systems are arranged to multicast optical signals appearing in composite optical signals A, B, C, and D. In particular, FIG. 14, for the sake of clarity and simplicity, depicts that four optical signals A1, B2, C3, and D4 are multicast over output paths emanating from multiplexers 1411, 1412, 1413, and 1414, respectively. Each composite signal (e.g., A) is composed of four optical signals (e.g., A1, . . . , A4), and each set of four optical signals serves as input to a corresponding one of the four systems labeled 1301. Also, the four optical signals in each set provide separate headers to header detector 820. In FIG. 14, only the optical paths A1, B2, C3, and D4 being inputted to header detector 820 are explicitly shown —the remaining optical paths also serve as inputs to detector 820. Since each optical path A1, B2, C3, and D4 is to be multicast to four output paths, each header must convey four sub-headers with table look-up information.

It is readily contemplated by one with ordinary skill in the art, given the teachings with respect to FIGS. 7–14, that an optical system such as 1301 can be a building block for more complex optical switching arrangements composing each network node. Thus, FIG. 14 is merely illustrative of one of the possible embodiments of such a switching arrangement.

1.5) Layout of Header(s)

The optical header that carries the label-switching data may be implemented in the sub-carrier domain, which is now described from an overview perspective. FIGS. 15A and 15B depict optical packet transmission, and contrast the traditional propagation approach (FIG. 15A) with a WDM sub-carrier optical-label approach using a single sub-carrier for multicasting (FIG. 15B). In the traditional approach, the network data (1501) is contiguous in time with the IP header (1502) and IP data payload (1503) as a single packet. From the frequency domain viewpoint, the upper half of FIG. 15A shows spectrum 1504 of the packet—as is discerned, the network data is embedded within the overall spectrum. With a "single sub-carrier optical labeling" approach, as depicted in FIB. 15B, network data 1501 along with, for example, optical-label switching information LI, . . . , LN (reference numerals 1512, . . . , 1513, respectively) for looking up local routes through a network element via its look-up table, are propagated contiguously in time. But, in terms of the frequency domain, IP header 1502 and IP data 1503 occupy one band of the spectrum (1504), whereas network data 1501 and labels 1512, . . . , 1513, which form the header (H), are displaced in frequency, as shown by band 1505 in the upper half of FIG. 15B. The IP information and the header information are conveyed by the same optical wavelength, shown as X in FIGS. 15A and 15B.

As an alternative, the WDM optical-label switching approach using a multiplicity of sub-carriers may also be used for multicasting. This alternative is shown pictorially in FIGS. 15C, 15D, and 15E, as now described. FIG. 15C is a repeat of FIG. 15A for comparison purposes. FIG. 15D is a specific example of the generalized depiction in FIG. 15B; in particular, three optical labels 1512, 1514, and 1513 (L1, L2, L3, respectively) are shown as composing header H. Again, as seen in the upper half of FIG. 15D, there is main spectrum 1504 conveying the data payload, and spectrum 1505 conveying the header. Now, spectrum 1505 is shown as being centered at a sub-carrier frequency of $f_1$. The multiplicity of sub-carriers approach is depicted in FIG. 15E, wherein each optical label L1, L2, or L3 is now carried by an associated unique sub-carrier, illustrated by frequencies $f_1$, $f_2$, and $f_3$, respectively, in frequency bands 1525, 1526, and 1527 (H1, H2, and H3) of the frequency domain. Also shown are network data 1521, 1522, and 1523 associated with each label L1, L2, and L3, respectively. Each network data may be a subset of the original data 1511, or may convey additional data as required. For instance, network data 1521 may convey network data 1511 as well as a field indicating the number of additional labels (in this example, two labels L2 and L3 in addition to L1), to be processed in each network element to effect multicasting. (It is worthwhile to note that H1, H2, or H3 are generic representations for HA11, HA12, HB21, and so forth of FIGS. 8–13.)

Figure 16:
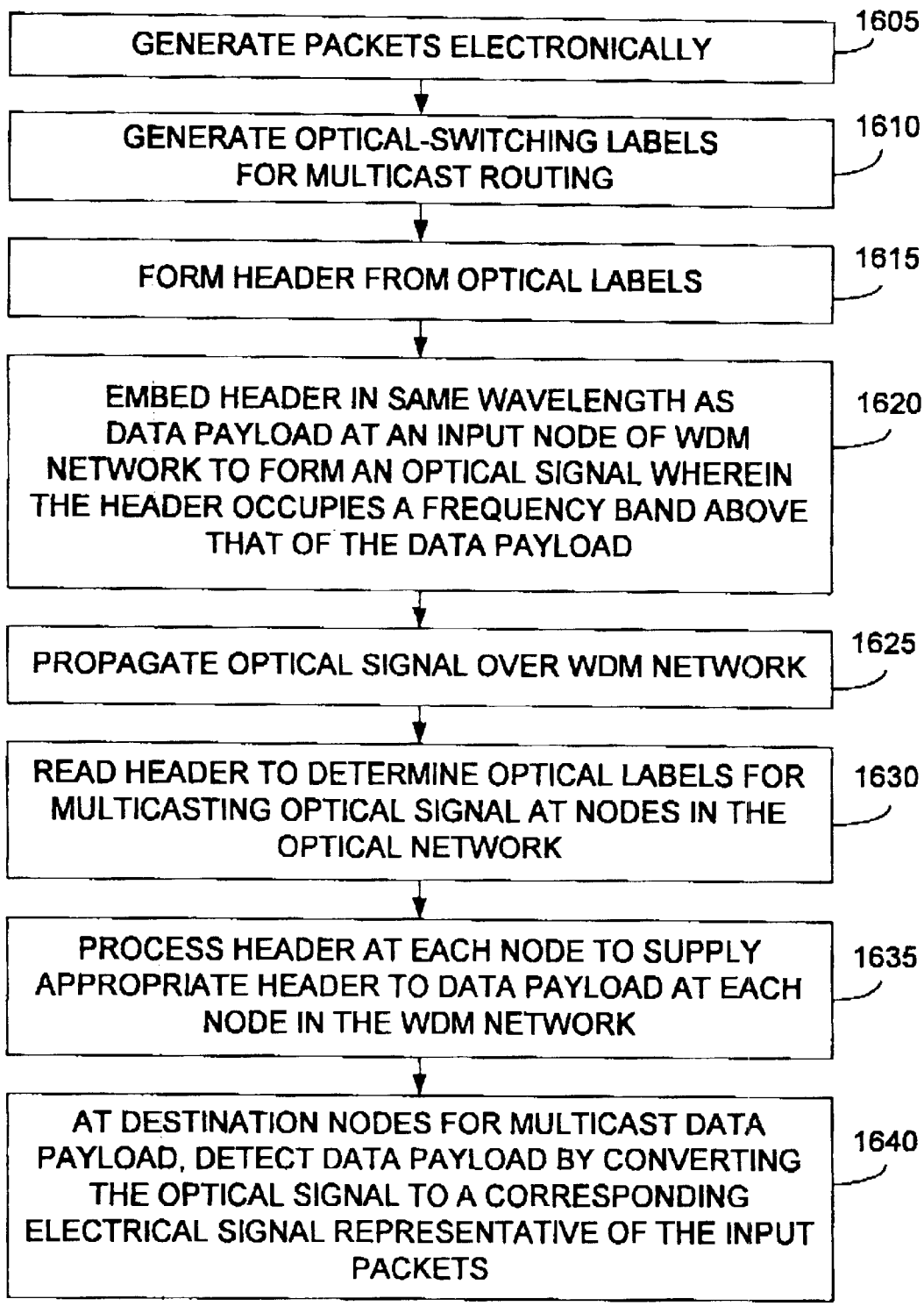
FIG. 16 is a high-level block flow diagram for multicasting in an optical network.

High-level flowchart 1600 of FIG. 16 summarizes the general principles of multicasting in a WDM network. Initially, processing block 1605 operates to produce electronic packets in an IP router. Next, via processing block 1610, the labels for optical switching are generated to multicast an associated payload through each of the nodes encountered as the data payload traverses the optical network. Then, a per processing block 1615, the header is formed from the labels. Processing by block 1620 is then invoked to embed the header, either in its single sub-carrier or multiple sub-carriers manifestation, in the same wavelength as the data payload at an input node to the network. The optical signal formed is such that the header or headers, as the case may be, occupy a frequency band above the band of the data payload. Processing block 1625 indicates that the optical signal is propagated over the WDM network from the given input node. Next, at each node encountered by the optical signal, the header or headers conveyed by the optical signal are read and processed to multicast the signal as required in processing block 1630. These headers are then processed, via block processing block 1635, to supply an appropriate header or headers to data payload for multicasting as the multicast optical signal continues to traverse the network. Finally, as invoked by processing block 1640, the data payload is detected at each destination node to produce a data payload representative of the input packets.

1.6) Description of Plug-and-Play Modules of Chang

The present invention is based upon the modification to the two types of Plug-and-Play modules to be attached to the WDM network elements as taught by Chang. Introduction of these Plug-and-Play modules added by Chang brought optical label switching capability to the then existing circuit-switched network elements.

Figure 17:
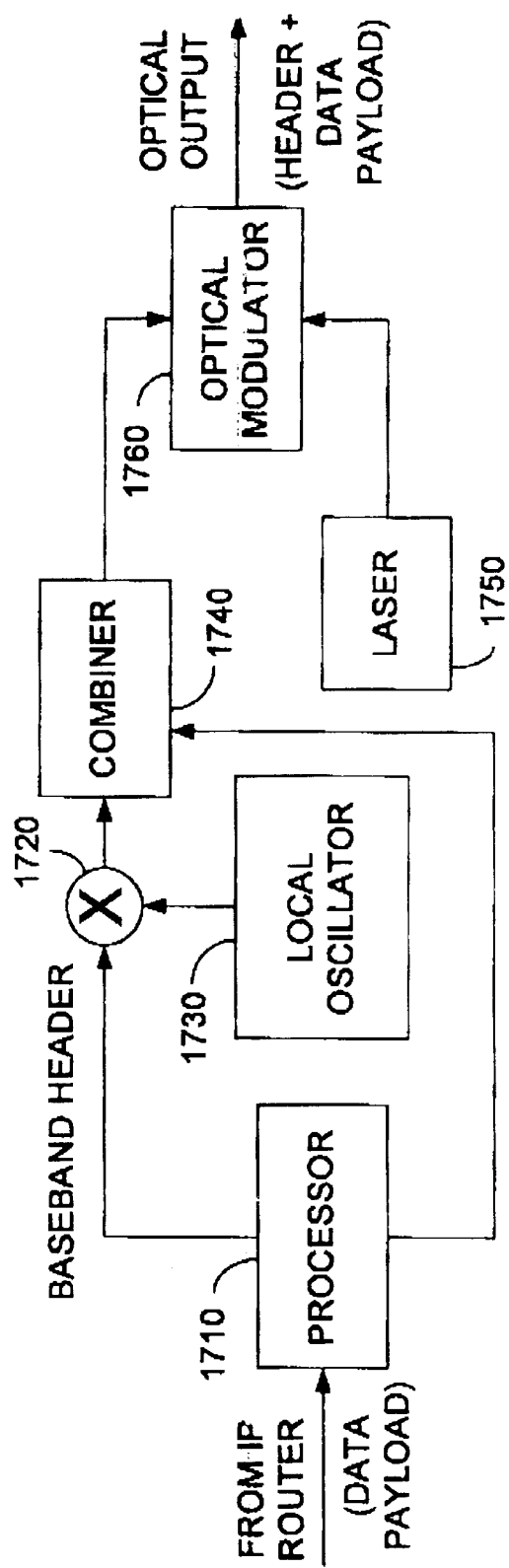
FIG. 17 depicts a block diagram of an illustrative embodiment of a header encoder circuit for the Plug-&-Play module of FIG. 3.
Figure 18:
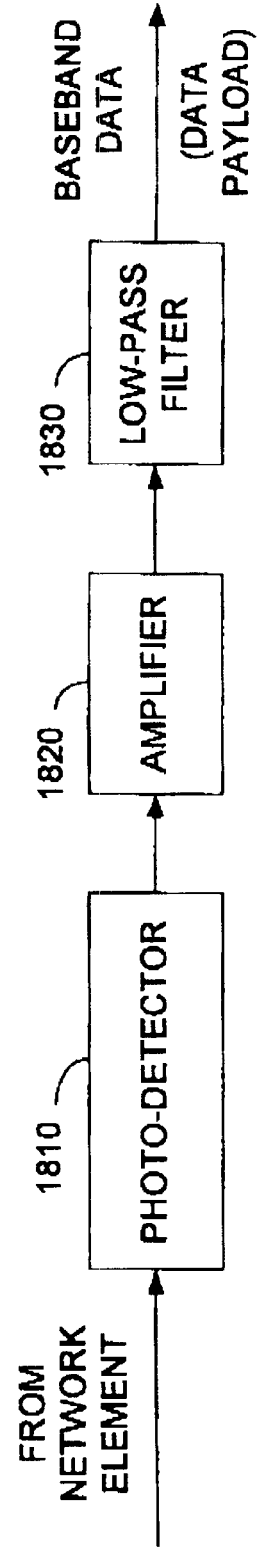
FIG. 18 depicts a block diagram of an illustrative embodiment of a header remover circuit for the Plug-&-Play module of FIG. 3.

In FIG. 3, both header encoder 321 and header remover 322 were shown in high-level block diagram form; FIGS. 17 and 18 show, respectively, a more detailed schematic for both encoder 321 and remover 322.

In FIG. 17 (FIG. 7 of Chang), IP packets or datagrams are processed in microprocessor 1710 which generates each optical signaling header 210 for label switching. Optical signaling header 210 and the original IP packet 211 are emitted from microprocessor 1710 at baseband. Signaling header 210 is mixed in RF mixer 1720 utilizing local oscillator 1730. Both the mixed header from mixer 1720 and the original packet 211 are combined in combiner 1740 and, in turn, the output of combiner 1740 is encoded to an optical wavelength channel via optical modulator 1760 having laser 1750 as a source of modulation.

In FIG. 18 (FIG. 8 of Chang), the optical channel dropping out of a network element is detected by photodetector 1810 and is electrically amplified by amplifier 1820. Normally, both photodetector 1810 and the amplifier 1820 have a frequency response covering only the data payload but not the optical signaling header RF carrier frequency provided by local oscillator 1730. Low-pass-filter 1830 further filters out any residual RF carriers. The output of filter 1830 is essentially the original IP packet sent out by the originating IP router from the originating network element which has been transported through the network and is received by another IP router at another network element.

Figure 19:
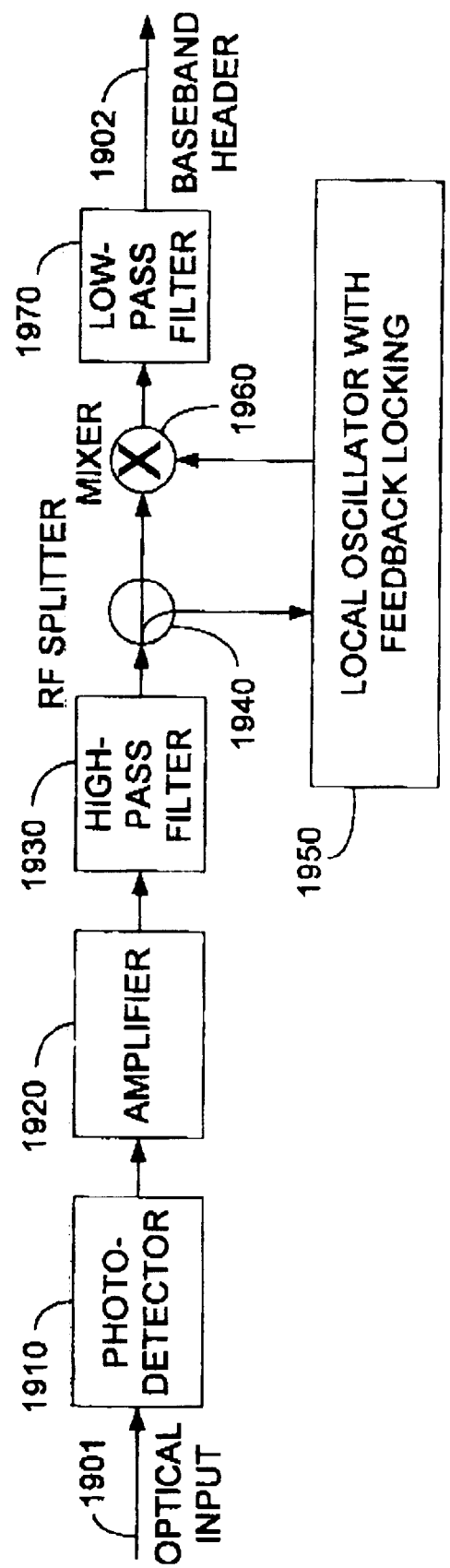
FIG. 19 depicts a block diagram of an illustrative embodiment of a header detector circuit for the Plug-&-Play module of FIG. 4.

Block diagram 1900 of FIG. 19 (FIG. 9 of Chang) depicts the elements for the detection process effected by Plug-and-Play module 410 of FIG. 4 to convert optical signal 1901, which carries both label-switching signaling header 210 and the data payload 211, into baseband electrical signaling header 1902. Initially, optical signal 1901 is detected by photodetector 1910; the output of photodetector 1910 is amplified by amplifier 1920 and filtered by high-pass filter 1930 to retain only the high frequency components which carry optical signaling header 210. RF splitter 1940 provides a signal to local oscillator 1950, which includes feedback locking. The signal from local oscillator 1950 and the signal from splitter 1940 are mixed in mixer 1960, that is, the high frequency carrier is subtracted from the output of filter 1920 to leave only the information on label-switching signaling header 210. In this process, local oscillator 1950 with feedback locking is utilized to produce the local oscillation with the exact frequency, phase, and amplitude, so that the high frequency component is nulled during the mixing of this local oscillator signal and the label-switching signaling header with a high-frequency carrier. Low-pass filter 1970, which is coupled to the output of mixer 1960, delivers baseband signaling header 210 as electrical output signal 1902.

Figure 20:
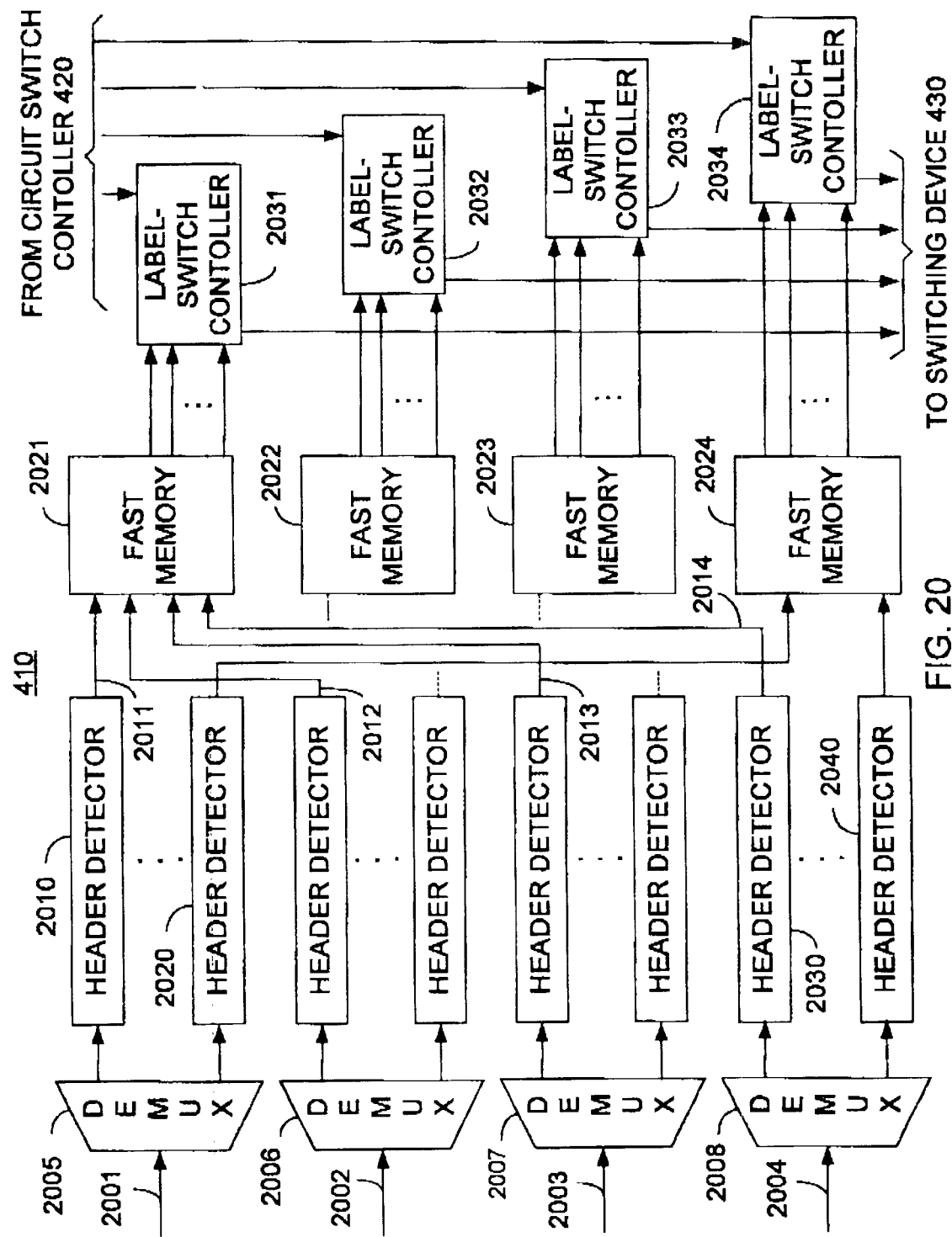
FIG. 20 depicts a block diagram for a more detailed embodiment of FIG. 4 wherein the label-switch controller includes interposed demultiplexers, header detectors, and fast memory.

The circuit diagram of FIG. 20 (FIG. 10 of Chang) shows an example of a more detailed embodiment of FIG. 4. In FIG. 20, each header detector 2010, 2020, . . . , 2030, . . . , or 2040 processes information from each wavelength composing the optical inputs arriving on paths 2001, 2002, 2003, and 2004 as processed by demultiplexers 2005, 2006, 2007, and 2008, respectively; each demultiplexer is exemplified by the circuit 1900 of FIG. 19. The processed information is grouped for each wavelength. Thus, for example, fast memory 2021 receives as inputs, for a given wavelength, the signals appearing on lead 2011 from header detector 2010, . . . , and lead 2034 from header detector 2030. Each fast memory 2021–2024, such as a content-addressable memory, serves as an input to a corresponding label switch controller 2031–2034. Each label switch controller 2031–2034 also receives circuit-switched control signals from network element switch controller 420 of FIG. 4. Each label switch controller intelligently chooses between the circuit switched control as provided by controller 420 and the label switched information supplied by its corresponding fast memory to provide appropriate control signals the switching device 430 of FIG. 4.

Figure 21:
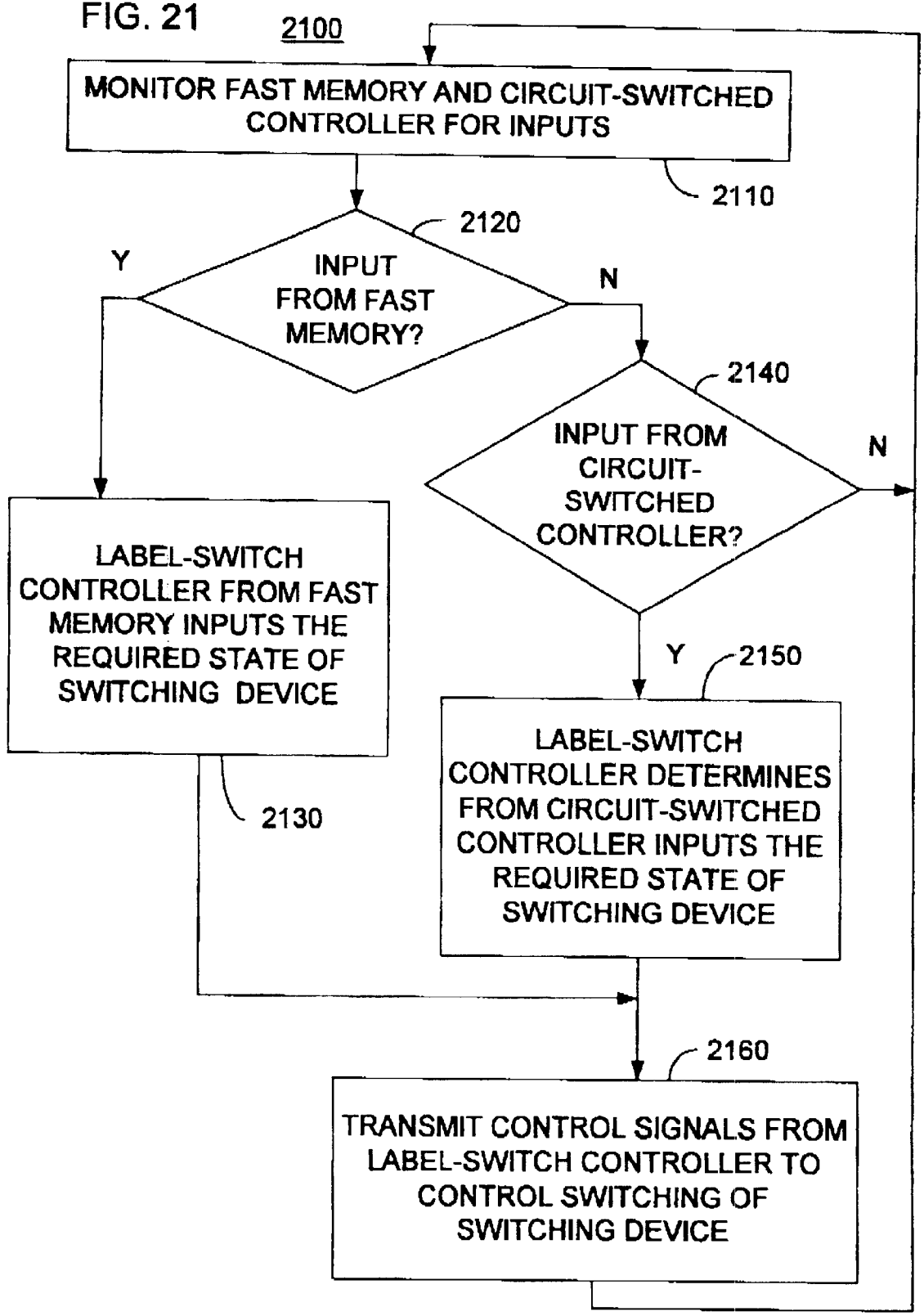
FIG. 21 is a flow diagram for the processing effected by each label-switch controller of FIG. 20.

Flow diagram 2100 of FIG. 21 (FIG. 11 of Chang) is representative of the processing effected by each label-switch controller 2031–2034. Using label-switch controller 2031 as exemplary, inputs from circuit-switched controller 420 and inputs from fast memory 2021 are monitored, as carried out by processing block 2110. If no inputs are received from fast memory 2021, then incoming packets are circuit-switched via circuit-switched controller 420. Decision block 2120 is used to determine if there are any inputs from fast memory 2021. If there are inputs, then processing block 2130 is invoked so that label-switch controller 2031 can determine from the fast memory inputs the required state of switching device 430. Then processing block 2160 is invoked to transmit control signals from label-switch controller 2031 to control switching device 430. If there are no fast memory inputs, then the decision block 2140 is invoked to determine if there are any inputs from circuit-switched controller 2140. If there are inputs from circuit-switched controller 420, then processing by block 2150 is carried out so that label-switch controller 2031 determines from the inputs of circuit-switched controller 420 the required state of switching device 430. Processing block 2160 is again invoked by the results of processing block 2150. If there are no present inputs from circuit-switched controller 2140 or upon completion of procession block 2160, control is returned to processing block 2110.

By way of reiteration, optical label-switching flexibly handles all types of traffic: high volume burst, low volume burst, and circuit switched traffic. This occurs by interworking of two-layer protocols of the label-switched network control. Thus, the distributed switching control rapidly senses signaling headers and routes packets to appropriate destinations. When a long stream of packets reach the network element with the same destination, the distributed switching control establishes a flow switching connection and the entire stream of the packets are forwarded through the newly established connections.

A label switching method scales graciously with the number of wavelengths and the number of nodes. This results from the fact that the distributed nodes process multi-wavelength signaling information in parallel and that these nodes incorporate predicted switching delay in the form of fiber delay line. Moreover, the label switching utilizes path deflection and wavelength conversion for contention resolution.

1.7) Optical Header Processing

The foregoing description focused on optical header processing for multicasting at a level commensurate with the description of the overall NGI system configured with the overlaid Plug-and-Play modules. Discussion of header for multicast processing at a more detailed level is now appropriate so as to exemplify how the combination of multicasting and low-latency can be achieved at the circuit-detail level.

Figure 22:
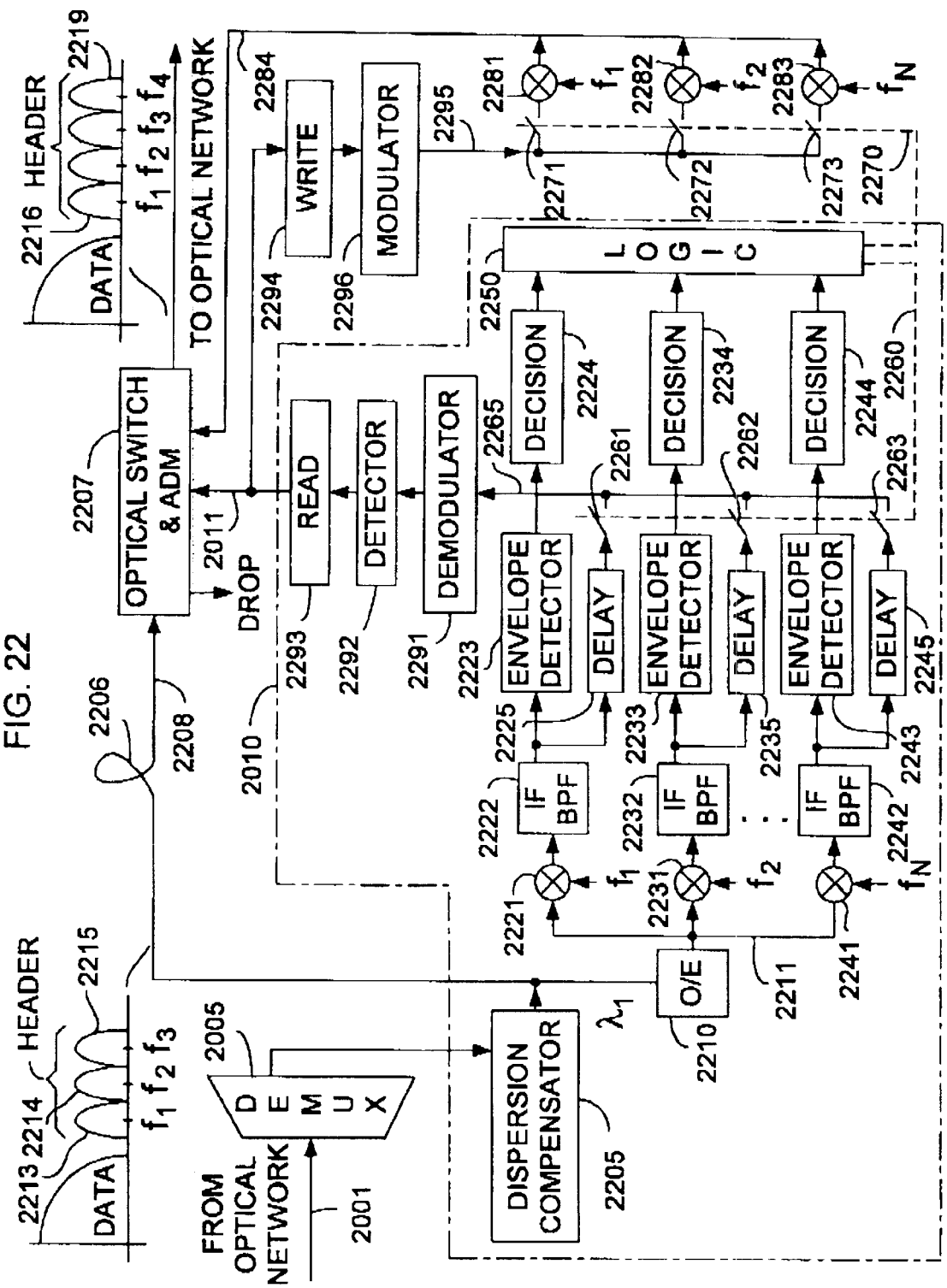
FIG. 22 is a block diagram of circuitry for detecting the active header signal and for inserting a new active header signal without local injection of light.

To this end, the arrangement of FIG. 22, which is a more detailed block diagram encompassed by the earlier descriptions of FIGS. 19 and 20 especially, is considered. As seen in FIG. 22, optical signal 2001 serves as an input to demux 2005, both of which are re-drawn from FIG. 20. Furthermore, a detailed illustrative embodiment of header detector 2010 of FIG. 20 is now shown in FIG. 22. In particular, header detector 2010 includes in this embodiment: (a) dispersion compensator 2205 for correcting dispersion in the optical signal at optical wavelength $\lambda_1$ emanating from demux 2005; (b) optical-electrical converter 2210 (e.g., a photodetector) for producing electrical output signal 2211 from the optical signal departing compensator 2205; (c) a bank of local oscillators having frequencies $f_1, f_2, \ldots, f_N$ feeding multipliers 2221, 2231, $\ldots$, 2241, respectively, for frequency-shifting the frequency components of electrical signal 2211 to intermediate frequencies (IFs); (d) a bank of IF band-pass-filters (IF-BPF) 2222, 2232, $\ldots$, 2242 responsive to multipliers 2221, 2231, $\ldots$, 2241, respectively, to filter the frequency domain energy in header signals 2213, $\ldots$, 2215 shown at the top left-hand of FIG. 22; (e) a cascade of envelope detector/decision circuit pairs 2223/2224, 2233/2234, $\ldots$, 2243/2244 wherein the presence of frequency domain energy in any of the frequency bands centered at $f_1, f_2, \ldots, f_N$ is denoted as a logic '1' at the output of the decision circuits 2224, 2234, $\ldots$, 2244, whereas the absence of frequency domain energy at $f_1, f_2, \ldots, f_N$ is denoted as a logic '0'; (f) logic circuit 2250 which provides a switch selection signal on selection lead 2260, the function of which being discussed in more detail in the operational description below; (g) delay circuits 2225, 2235, $\ldots$, 2245 coupled to the BPF filters 2222, $\ldots$, 2242; (h) switches 2261, 2262, $\ldots$, 2263, coupled to delay circuits 2225, $\ldots$, 2245 as inputs, and being controlled by the signal on lead 2260; (g) input lead 2265, connected to switches 2261, $\ldots$, 2263, which serves as an input to demodulator 2291; (h) detector 2292 responsive to demodulator 2291; and (i) read circuit 2293 which outputs signal 2011 of FIG. 20.

The operation of header detector 2010 of FIG. 22 is as follows. It is assumed that the second type of 'Plug-and-Play' module of FIG. 4 injects a 2.5 Gbps IP data packet (e.g., with QPSK/QAM modulation) which is sub-carrier multiplexed with a 155 Mbps header packet (e.g., with QAM modulation) at a center frequency $f_1$; as before, the header precedes the data payload in time and both are carried by the optical wavelength $\lambda_1$. In each network node which receives the combined header and payload at wavelength $\lambda_1$, the sub-carrier header at $f_1$ is detected by envelope detector 2223. Because there is energy present in the frequency band centered at $f_1$ due to the existence of the header signal, decision circuit 2224 detects a logic '1', whereas all other decision circuits detect a logic '0'. This combination of logic signals ('100 . . . 0') in parallel at the input to logic circuit 2250 generates the selection signal 2260 which effects the closure of only switch 2261. (It is important to emphasize that the input logic signals are generated concurrently and in parallel, rather than in series, thereby significantly speeding up the header detection process.) The actual header signal provided at the output of IF-BPF 2222 serves, after the delay imposed by delay circuit 2225, as the input to demodulator 2291 via lead 2265. The delay of circuit 2225 is not critical, other than the delay is greater than the time required to derive the logic signal via envelope detector 2223 and decision circuit 2224, plus the time required to compute the control signal on selection signal lead 2260 in logic circuit 2250 and to close switch 2261. (The delay can be implemented digitally, e.g., by replacing each analog delay in FIG. 22 by a cascade of a demodulator and a digital delay.) Therefore, the header signal at $f_1$ is the only header signal that will be demodulated by demodulator 2291 (e.g., a QAM demodulator), and the demodulated baseband data burst is then detected by detector 2292 (e.g., a 155 Mbps burst-mode receiver), and read by circuit 2293 (e.g., a microprocessor).

This foregoing operational description has focused only on the detection of the optical header to control the routing path through switching device 430 of FIG. 4. As alluded to in the Background Section, header replacement is now considered important to present-day NGI technology so as to accomplish high-throughput operation in a packet switched network in which data paths change due to, for example, link outages and variable traffic patterns. Moreover, header replacement is useful to maintain protocol compatibility. The components of FIG. 22 which have heretofore not been described play a central role in header replacement. Actually, the notion of header replacement has a broader connotation in that the header may be composed of various fields, such as a "label" field and a "time-to-leave" field. The description to this point has used the header and label interchangeably; however, it is now clear that the header may actually have a plurality of fields, and as such any or all may be replaced at any node.

Now continuing with the description of FIG. 22, it is shown that logic circuit 2250 also provides a second selection signal on selection lead 2270; this lead control switches 2271, 2272, $\ldots$, 2273 which are all connected to lead 2295. Interposed between lead 2295 and header output lead 2011 is write circuit 2294 in cascade with modulator 2296. Write circuit 2294 is responsible for providing a new header signal. The header signal that arrives at the input to demux 2005 is referred to as the active header signal—in the first node to process the header signal, the active header signal and the original header signal coalesce. The new header signal, rather than actually overwriting the active header signal, is placed in a frequency band above the frequency band of the active header signal, that is, the next highest available center frequency from the set $f_1, f_2, \ldots, f_N$ is utilized to propagate the new header signal. To select the next highest available center frequency, logic circuit 2250 is arranged so that if decision circuits 2224, 2234, . . . , 2244 yield an active center frequency $f_i$, then selection signal 2270 will close only the switch from the set 2271, 2272, . . . , 2273 which connects lead 2295 to center frequency $f_{i+1}$. That is, lead 2295 will be connected to the multiplier from the set 2281, 2282, . . . , 2283 which corresponds to frequency $f_{i+1}$. The outputs of multipliers 2281, 2282, . . . , 2283 are connected to lead 2284, which serves as a second input to optical switch/add-drop multiplexer 2207; the other input is provided by the header signal on lead 2011. Circuit 2207 now has a dual functionality, namely, it operates as switching device 430 of HG. 4, but is also arranged to convert an input electrical signal, such as on lead 2284, to an optical signal for propagation by the same optical wavelength present at the input to circuit 2207 (in this case, wavelength $\lambda_1$). Accordingly, the new header signal on lead 2284 is frequency shifted above the data payload as well as all other existing headers arriving on lead 2208; this is shown in frequency domain visualization in the top right-hand corner of FIG. 22, which is counterpart of the visualization in the top left-hand corner. So that the new header signal is placed ahead of the data payload in time, delay is introduced by fiber loop 2206.

The operation of the arrangement of FIG. 22 for header replacement is as follows. Again, the same example is used so that an optical header plus a data payload is incoming to the network node immediately following the node that injected the packet. It is desired to write a new header signal, and in the embodiment of FIG. 22, the output of read circuit 2293 serves as an input to write circuit 2294; in this manner, the active header signal may serve as an aid in computing the new header signal. The new header signal is conveyed by center frequency $f_2$ since the incoming active header signal is centered about $f_1$. In effect, the new header signal is written on the original light which contains both the data packet and the old sub-carrier header or active header signal at $f_1$. Therefore, the modulated light which leaves the given node contains the data packet and two sub-carrier header signals. (Two illustrative writing techniques, both of which use a high-speed (~10 GHz) LiNbO$_3$-based modulator/switch, will be explained later.) The carrier frequency $f_2$ is higher than $f_1$ by about 200 MHz for the 155 Mbps data, but the frequency difference between $f_1$ and $f_2$ can be smaller if a more spectral efficient modulation method such as M-QAM is adopted. Note that this node has the intelligence via logic circuit 2250 to know that the active header signal uses sub-carrier $f_1$ and the new header signal is written onto sub-carrier $f_2$.

In a similar manner, the third network node along the route will read the active header signal on sub-carrier $f_2$ and write new header information onto sub-carrier $f_3$, and the process continues until the modulation bandwidth of optical switch/ADM 2207 is exhausted. For example, a typical 10 GHz external LiNbO$_3$-based modulator/switch can write about 40 ((10–2)/0.2) new sub-carrier headers signals, where it has been assumed that the 2.5 Gbps data occupies a bandwidth of 2 Ghz.

FIG. 22 actually illustrates the implementation details of the fourth network node along the route over which a packet travels. The three sub-carrier headers on $\lambda_1$ are simultaneously down-converted to IF band, and due to their existence, decision circuits 2224, 2234, . . . , 2244 generate a logic '1' signal to logic circuit 2250 in the pattern '111000 . . . 000'. Note that if there are 40 down-converters in this example, 37 decision circuits will generate logic '0's because there are no sub-carriers on $f_4, f_5, \ldots f_{40}$. Logic circuit 2250 uses the output "1110000 . . . 0" (three ones and thirty-seven zeros) to control the 40 microwave switches 2261, 2262, . . . , 2263 such that only the third microwave switch is closed and all other 39 switches are open. Therefore, the header information on $f_3$ becomes the active header signal that is then demodulated by demodulator 2291. Immediately after the "read" process, the new header signal is generated by write circuit 2294 and then applied to modulator 2296 at IF. As depicted in FIG. 22, the new header signal is launched to the fourth microwave switch which is turned on by selection signal 2270. The new header signal is then up-converted by $f_4$, and is used to modulate the delayed main-path signal on optical path 2208 (which originally contains only three sub-carrier headers). The resultant modulated light therefore contains four sub-carrier headers as depicted.

It is noted that, in terms of presently available components, the processing time of the envelope detectors (2223, . . . ), the decision circuits (2224, . . . ), the logic circuit (2250), and the turning-on of a particular microwave switch (2261, . . . ) should take less than 30 ns. On the other hand, if it is assumed that there are 15 bits in each packet header signal, then the time to read 15 bits, write 15 bits, and add 10 preamble bits can take about 260 ns for a 155 Mbps burst. Therefore, allowing for some variations, each header signal is about 300 ns. This means that the length of delay line 2206 in main optical path 2208 should be around 60 meters.

Figure 23:
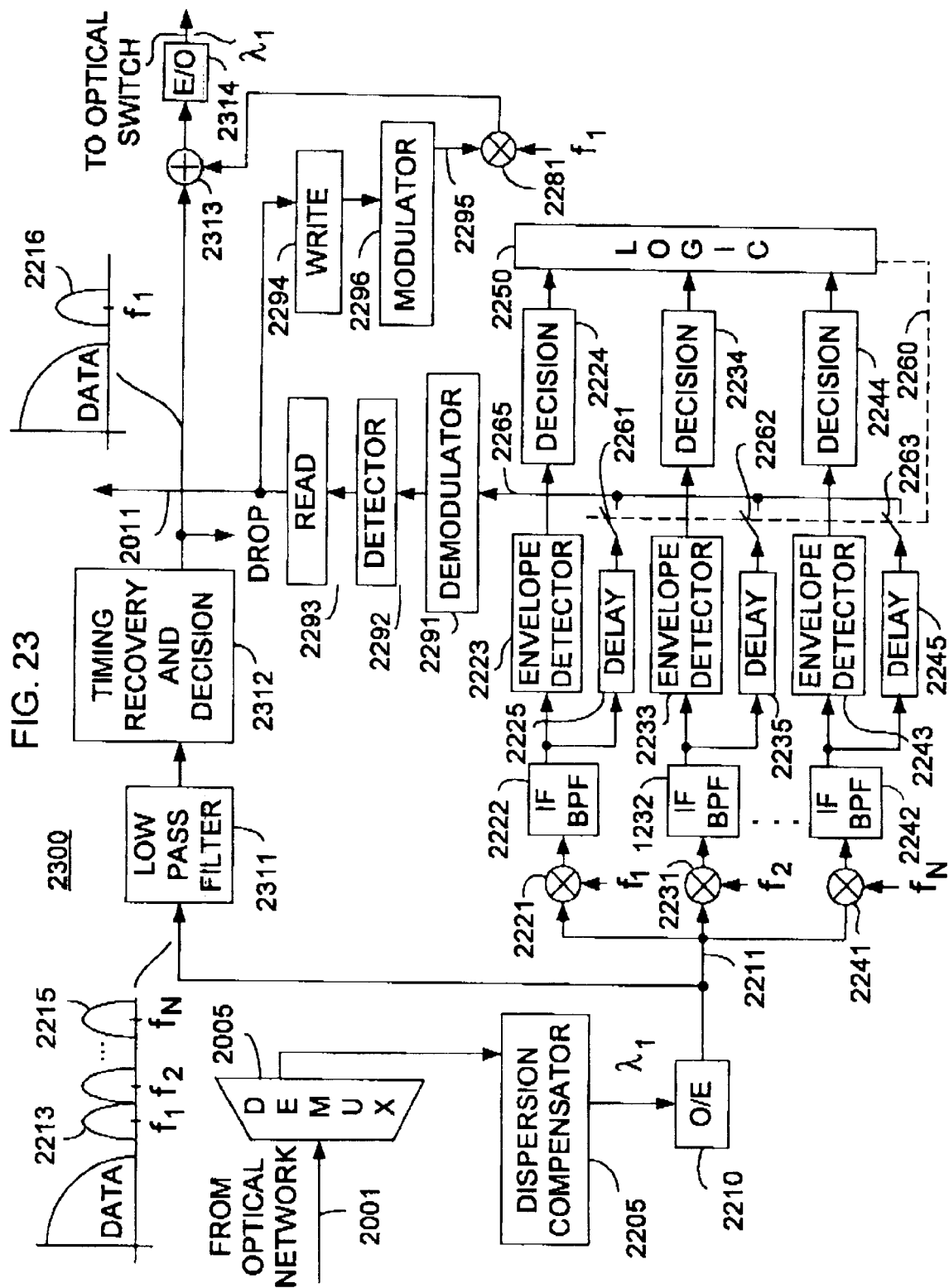
FIG. 23 is a block diagram of re-set circuitry for deleting all incoming header signals, and for inserting a new original header signal.

There exist some upper bounds on the proposed sub-carrier header insertion technique of FIG. 22: (a) the sub-carriers at carrier frequencies as high as 10 GHz can become severely attenuated due to fiber dispersion after a certain transmission distance (usually tens of kilometers). Fortunately, this problem can be solved by repeatedly using dispersion compensation fibers (such as compensator 2205) or chirped fiber gratings at every network node; (b) at each intermediate network node, its modulator 2296 (e.g., a LiNbO$_3$-based modulator) modulates the incoming "modulated" light by a new sub-carrier header signal, and this can cause new intermodulation distortion products. However, the present technology is such that the nonlinear distortion penalty after 40 times of writing consecutive sub-carrier header signals is not large enough to degrade the bit-error-ratio (BER) of both the data payload and the sub-carrier header signal up to a distance of 2000 km; and (c) since the maximum number of insertable sub-carrier header signals are about 40 using a 10 GHz modulator, at some point in the network the entire sub-carrier header signals will have to be erased so that a new set of sub-carrier header signals can be written onto the received light all over again. Being conservative, it is determined that the maximum transmission distance using the arrangement of FIG. 22 is about 2000 km. Therefore, it is feasible that several "reset" network nodes are implemented, configured as shown in FIG. 23 (to be discussed shortly), which are sparsely located across the nation, to guarantee that the 40 times-writing limit is never exceeded. It is noted, however, that not every node will insert a new header signal (recall the new header signal is typically inserted due to slowly varying network outages or for protocol compatibility). If this is indeed the case, then it is anticipated that 40 header signal insertions are more than enough to cover any cross-nation transport of an optical packet.

However, to be sure that a new header signal can be inserted when needed, preferably some or even all of the network nodes are arranged with the circuitry 2300 of FIG. 23. The primary difference between FIGS. 22 and 23 is in the upper path of FIG. 22 wherein the main-path optical signal appearing at the output of compensator 2205 is converted back to electrical domain via opto-electrical converter 2210, with all of its old sub-carrier header signals being erased by using low-pass filter (LPF) 2311. A new, single sub-carrier header signal centered at frequency $f_1$ is added to the regenerated data payload in electrical adder 2313; the data payload is regenerated in the conventional electrical manner by timing recovery-and-decision circuitry 2312. Together the data payload and new header signal modulate electrical-optical transmitter 2314 having the same wavelength $\lambda_1$. Therefore, from this reset node on, another 40 sub-carrier header signals can be written before there is the (unlikely) need to reset again.

1.7.1) Another Illustrative Embodiment of a Header Insertion Technique

Figure 24:
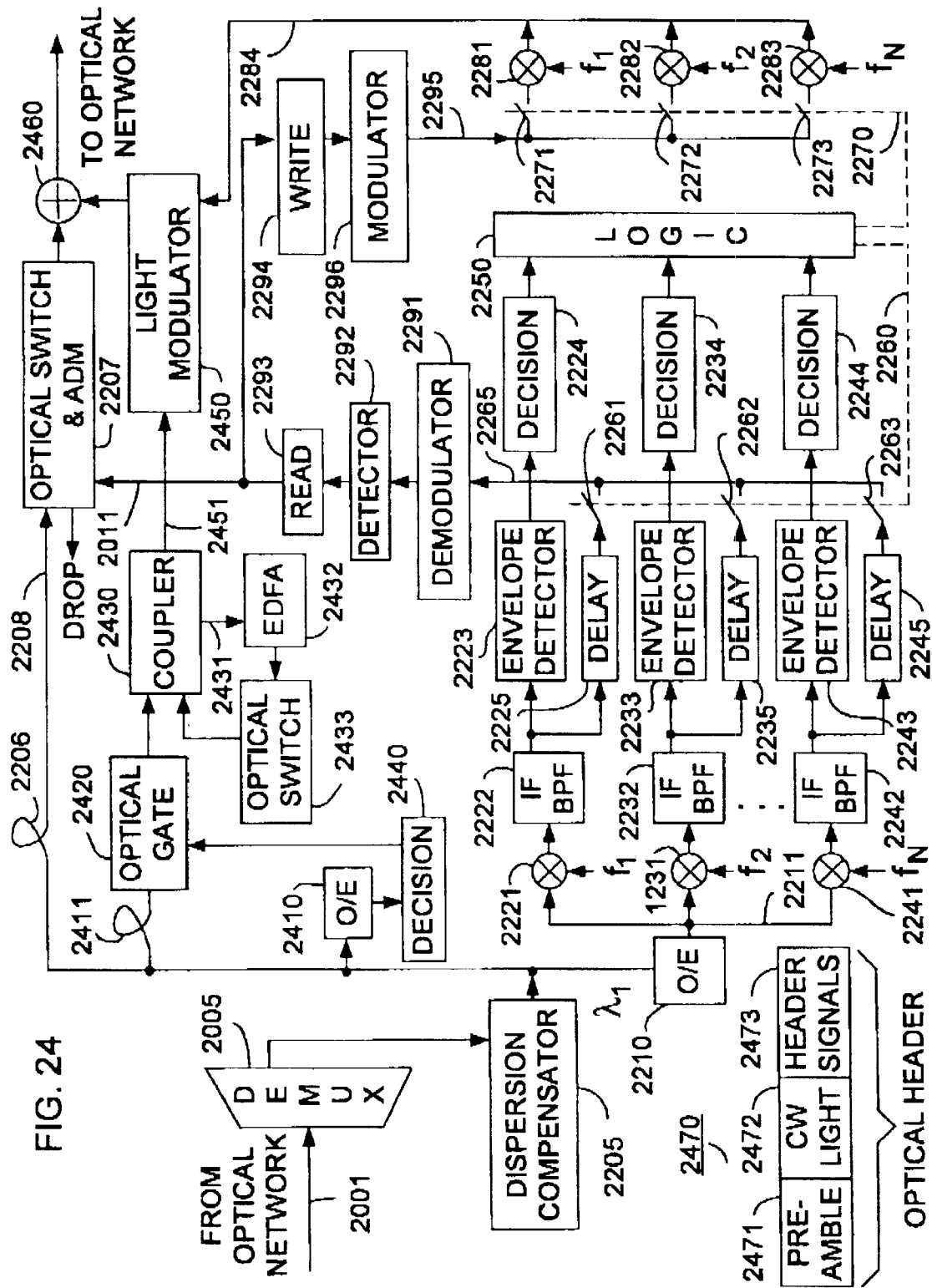
FIG. 24 is a block diagram of circuitry for detecting the active header signal and for inserting a new active header signal using the local injection of light.

The circuit arrangements of FIGS. 22 and 23 were realized without the need for local light injection. In order to increase the transmission distance beyond the anticipated 2000 km limit, another node header processing arrangement is required, as now depicted in FIG. 24; this arrangement deploys the injection of local light at wavelength $\lambda 1$. The main difference between FIG. 22 and FIG. 24 is shown in the processing path composed of the following components: (a) opto-electrical converter 2410; (b) decision circuit 2440 responsive to converter 2410; (c) the series arrangement of delay line 2411 and optical gate 2420, with delay line 2411 being responsive to the output of compensator 2205; (d) coupler 2430 responsive to gate 2420; (e) light feedback path 2431 for feeding output light from coupler 2430 to its input, path 2431 being composed of erbium-doped fiber amplifier (EDFA) 2432 and optical switch 2433; (f) light modulator 2450 responsive to the incoming signal appearing on path 2284, as before, and the incoming signal appearing on lead 2451 from coupler 2430; and (g) optical adder 2460 responsive to both light modulator 2450 and optical switch/ADM 2207. An augmented optical packet 2470, with the form shown in the lower left corner of FIG. 24, now arrives at the network node of FIG. 24 via optical path 2001. Preamble 2471 in optical packet header 2470, after optical-to-electrical conversion in opto-electrical converter 2410, directs detection circuit 2440 to turn on optical gate 2420 and let short CW light burst 2472 (about 30 ns in duration) at $\lambda_1$ pass through to coupler 2430. CW light burst 2472 then loops several times via feedback path 2431 to lengthen the CW light duration to about 300 ns; this extended duration CW burst serves as an input to light modulator 2450 via output path 2451 from coupler 2430. The new sub-carrier header signal appearing on lead 2284 then modulates this locally regenerated CW light burst on lead 2452 via light modulator 2450 (e.g., via a LiNbO$_3$ modulator). The modulated light which appears on output lead 2452 of light modulator 2450, containing only the new, active sub-carrier header signal, is then combined in optical adder 2460 along with the main-path light which contains the data payload and the old sub-carrier header signals as emitted by switch 2207. The time of occurrence of the new sub-carrier header signal arrives essentially concurrently with original optical packet 2470 at optical adder 2460. (In an intermediate network node, it is important for the node to re-modulate the new header onto the original wavelength in the same time frame as the payload data.) Thus the light pulse conveying the new active header signal occupies the same time interval as the incoming header signals 2473, with the difference being that the old header signals and the new active header signal are separated in the frequency domain by their corresponding sub-carrier frequencies. That is, each time a new header signal is added, the light conveying the new header signal at the given wavelength $\lambda 1$ is overlaid on the incoming light signal conveying the old header signals, but being such that the frequency domain characteristics are determined by the sub-carrier frequencies.

With this technique, no additional nonlinear distortions are generated due to the modulation of an already modulated light. As long as the optical power ratio between the main-path light from switch 2207 and the locally-injected light from light modulator 2450 is optimized, and the modulation depths of the sub-carrier headers and data payload are optimized, transmission can be beyond 2000 km is effected.

1.7.2) An Alternative Header Replacement Technique

Figure 25:
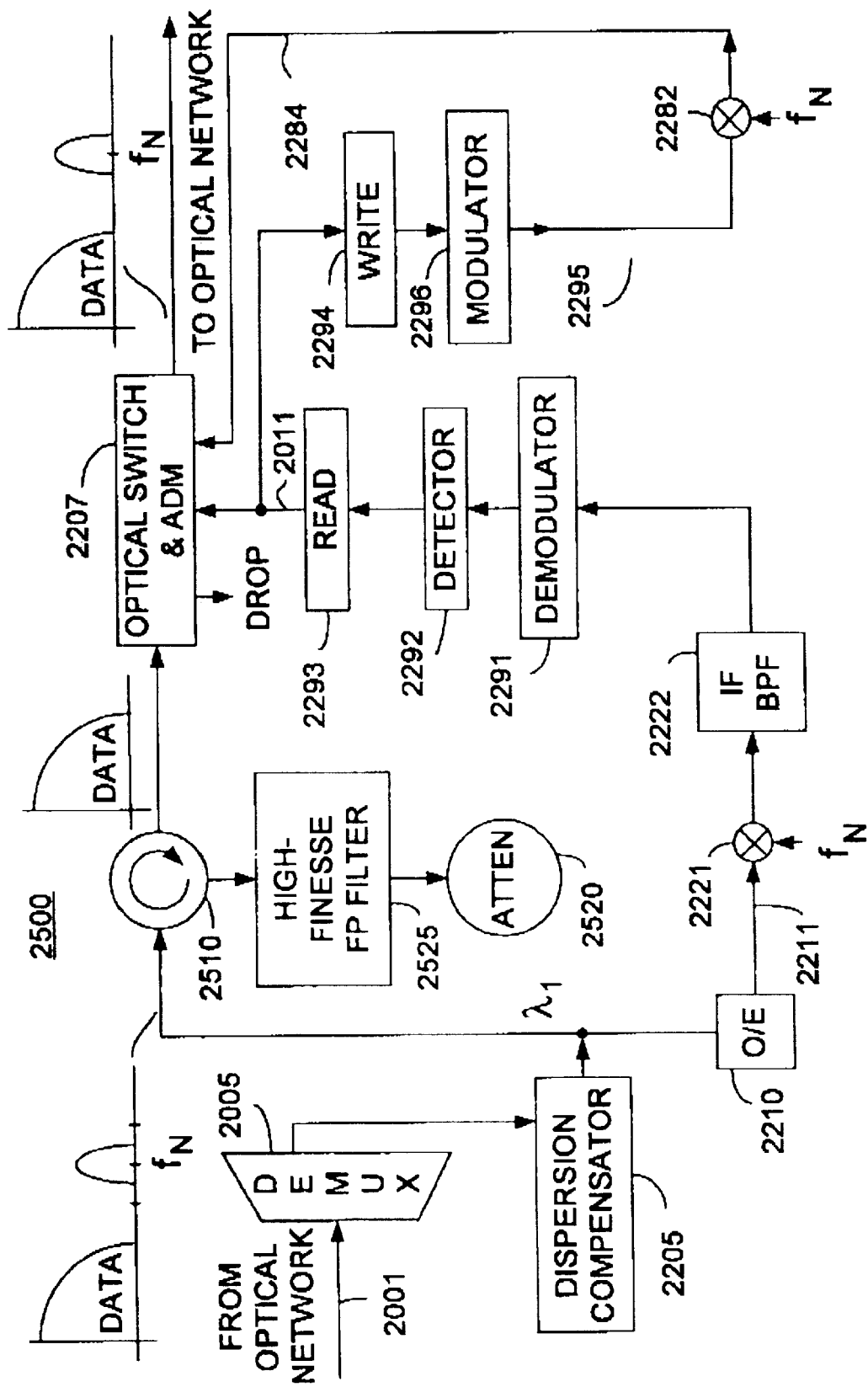
FIG. 25 is a block diagram of circuitry for removing a single header signal and replacing the removed header signal with a new header signal.

It is also possible to use an optical notch filter which has a very high finesse to notch out the old sub-carrier header signal. The network node configuration 2500 is shown in FIG. 25; it is readily appreciated that node configuration 2500 is greatly simplified relative to the implementation of FIG. 22. The sub-carrier header signal at centered at $f_N$ is purposely allocated at high-frequency carrier (e.g., 9 GHz) so that the header signal conveyed $f_N$ will not affect the data payload in the low frequency region. The output of compensator 2205 feeds optical circulator 2510, which is coupled to fiber Fabry-Perot (FFP) notch filter 2515 and attenuator 2520 in series. The combined effect of these components is to notch out the header signal centered at $f_N$; the spectrum of the input to optical circulator 2510 is shown in the top left corner, whereas the spectrum of the output of circulator 2510 is shown in the top center. The newly inserted header signal is provided by the series combination: write circuit 2294; modulator 2296; up-converter 2281 being driven by sub-carrier $f_N$, in a much simplified manner as that of FIG. 22.

Figure 26:
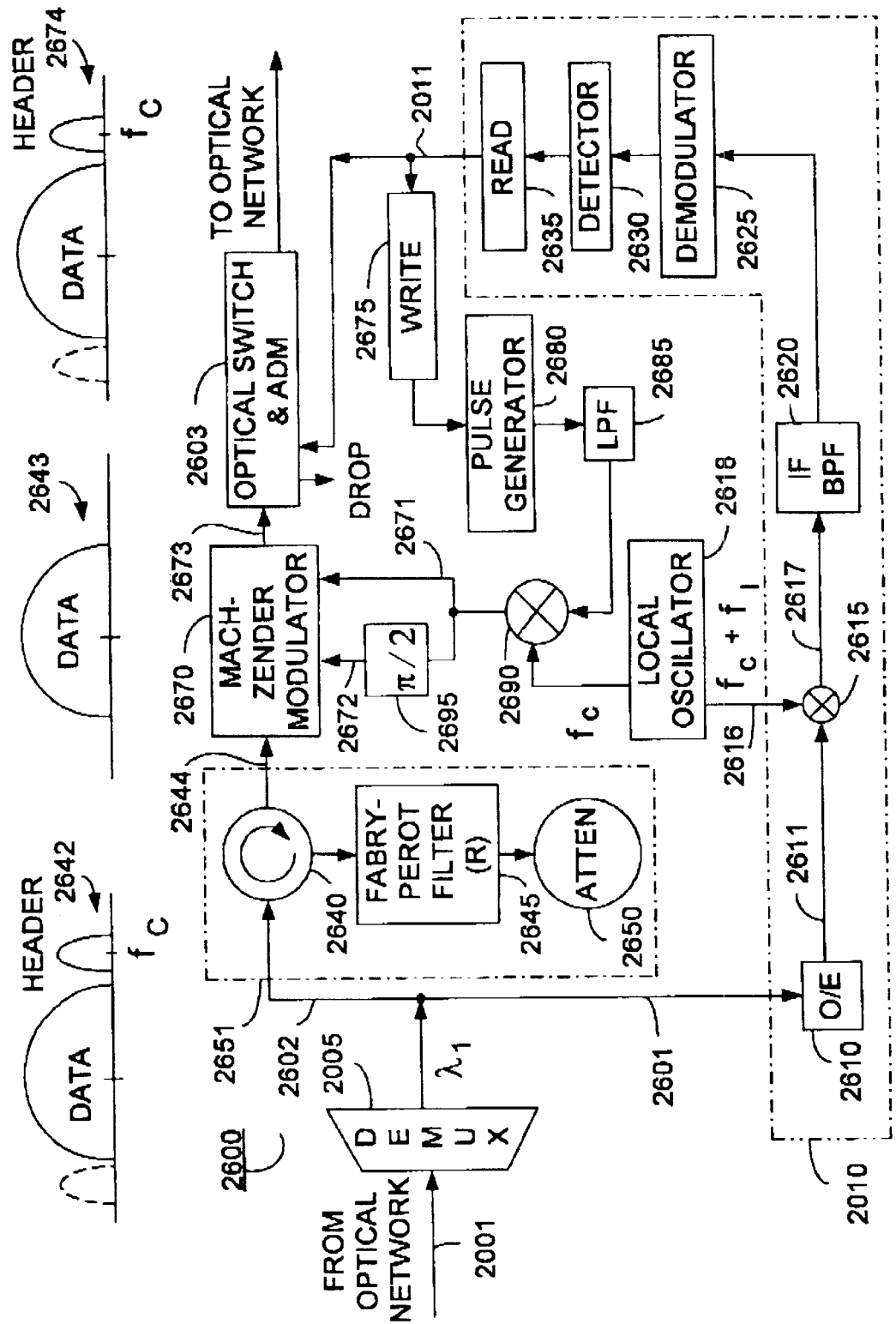
FIG. 26 is a block diagram of circuitry for removing the header with the reflective part of a notch filter and for inserting a new single-sideband modulated header.

1.7.3) Alternative Header Processing Using Single-Sideband Optical Header Techniques Opto-electrical circuitry 2600 of FIG. 26, which is a more detailed block diagram elucidating certain aspects of prior figures, especially FIGS. 19 and 20, is now considered. By way of a heuristic overview, the processing carried out by the opto-electrical circuitry 2600 is such that a header signal (e.g., 155 Mb/s on a microwave carrier) is frequency-division multiplexed with a baseband data payload (e.g., 2.5 Gb/s). The header signal is processed by a single-sideband (SSB) modulator, so only the upper sideband representation of the header signal is present in the frequency-division multiplexed signal. Moreover, the technique effected by circuitry 2600 is one of label replacement wherein the original header signal at the given carrier frequency is first removed in the optical domain, and then a new header signal is inserted at the same carrier frequency in the optical domain. A notch filter is used to remove the original header signal; the notch filter is realized, for example, by the reflective part of a Fabry-Perot filter.

In particular, circuitry 2600 has as its input the optical signal at optical wavelength $\lambda_1$ on path 2001 as received and processed by demux 2005, both of which are re-drawn from FIG. 10. Circuitry 2600 is composed of: a lower path to process optical signal 2601 emanating from demux 2005; and an upper path to process optical signal 1202 emanating from demux 2005. The lower path derives the label, conveyed by the incoming SSB header in optical signal 2001, to control optical switch 2603; switch 2603 is a multi-component element encompassing components already described, including fast memory 1021 and label switch controller 1031 of FIG. 10 as well as switching device 430 of FIG. 4. The upper path is used to delete the old header signal, including the label, at the sub-carrier frequency and then insert a new header label, in a manner to be described below after the lower path is first described.

The lower path is an illustrative embodiment of header detector 1010 originally shown in high-level block diagram form in FIG. 10. In particular, header detector 1010 includes, in cascade: (a) opto-electrical converter 2610 (e.g., a photodetector) for producing electrical output signal 2611; (b) multiplier 2615 to convert electrical signal 2611 to intermediate frequency signal 2617—to accomplish this, multiplier 2615 is coupled to local oscillator 2618 which provides a sinusoid 2616 at a frequency to down-convert the incoming sub-carrier conveying the header label, designated for discussion purposes as $f_c$, to an intermediate frequency $f_I$; (c) intermediate frequency bandpass filer 2620 having signal 2617 as its input; (e) demodulator 2625 to convert the intermediate frequency to baseband; (e) detector 2630 responsive to demodulator 2625; and (f) read circuit 2635 which outputs signal on lead 1011 of FIG. 10. Elements 2611, 2615, 2616, 2617, 2620, 2625, and 2630 can all be replaced by a simple envelope detector if the sub-carrier header was transmitted using an incoherent modulator such as ASK (amplitude-shift keying). It is not always required to use a coherent demodulator as shown in FIG. 26. (In fact, FIG. 27 will depict the case for an incoherent modulation).

The operation of header detector 2010 of FIG. 26 is as follows. It is assumed that the second type of 'Plug-and-Play' module of FIG. 4 injects a 2.5 Gbps IP data packet (e.g., with QPSK/QAM modulation) which is sub-carrier multiplexed with a 155 Mbps single-sideband header packet (e.g., with SSB modulation) at the modulation frequency $f_c$; as before, the header precedes the data payload in time and both are carried by the optical wavelength $\lambda_1$. In each network node which receives the combined header and payload at wavelength $\lambda_1$, the sub-carrier header at $f_c$ is multiplied by multiplier 2615, is band-pass filtered by intermediate filter 2620, and is demodulated to baseband by demodulator 2625. Then, the demodulated baseband data burst is detected by detector 2630 (e.g., a 155 Mbps burst-mode receiver), and read by circuit 2693 (e.g., a microprocessor).

This foregoing operational description has focused only on the detection of the optical header to control the routing path through switch 2603. As alluded to in the Background Section, header replacement is now considered important to present-day NGI technology so as to accomplish high-throughput operation in a packet switched network in which data paths change due to, for example, link outages and variable traffic patterns. Moreover, header replacement is useful to maintain protocol compatibility. The upper path components of FIG. 26 that have heretofore not been described play a central role in header replacement. Actually, the notion of header replacement has a broader connotation in that the header may be composed of various fields, such as a "label" field and a "time-to-leave" field. The description to this point has used the header and label interchangeably; however, it is now clear that the header may actually have a plurality of fields, and as such any or all may be replaced at any node.

Now continuing with the description of FIG. 26, the upper processing path which processes the optical signal on path 2602 includes: (a) circulator 2640; (b) Fabry-Perot (FFP) filter 2645, coupled to circulator 2640 via path 2641, with filter 2645 being arranged so that one notch in its free spectral range (FSR) falls at $f_c$; and (c) attenuator 2650 coupled to the reflective port (R) of FFP 2645. An exemplary FFP 2645 is available from The Micron Optics, Inc. as model No. FFP-TF ("Fiber Fabry-Perot Tunable Filter").

The combination of these latter three elements, shown by reference numeral 2651, produces a notch filter centered at $f_c$ which removes the SSB header signal propagating with $f_c$ as its center frequency, as shown pictorially by the spectra in the upper portion of FIG. 26. As illustrated, spectrum 2642 of signal 2602 includes both a baseband data spectrum and the header signal spectrum centered at $f_c$. After processing by notch filter 2651, spectrum 2643 obtains wherein only the baseband data spectrum remains.

The output of notch filer 2651, appearing on path 2644 of circulator 2640, serves as one input to Mach-Zender modulator (MZM) 2670. Two other inputs to MZM 2670 are provided, namely, via path 2671 emanating from multiplier 2690 and via path 2672 emanating from phase shift device 2695. As discussed in the next paragraph, the signal appearing on lead 2671 is the new header signal which is double-sideband in nature. The signal on path 2672 is phase-shifted by $\pi/2$ relative to the signal on path 2671. MZM 2670 produces at its output the upper-sideband version of the signal appearing on path 2671, that is, the new header signal. The single-sideband processing effected by MZM 2670 is described in detail in the paper entitled "Overcoming Chromatic-Dispersion Effects in Fiber-Wireless Systems Incorporating External Modulators", authored by Graham H. Smith et al., as published in the IEEE Transactions on Microwave Theory and Techniques, Vol. 45, No. 8, August 1997, pages 1410–1415, which is incorporated herein by reference. Moreover, besides converting the new header signal to an optical single-sideband signal (OSSB), MZM 2670 also adds this OSSB signal to the incoming optical baseband signal on path 2644 to produce the desired frequency-multiplexed signal of baseband plus SSB header on output path 2673 from MZM 2670.

The new header signal delivered by path 2671 is derived as follows. Write circuit 2675 is responsible for providing data representative of a new header signal, such as a new label represented in binary. The header signal that arrives at the input to demux 1005 is referred to as the active header signal. The replacement header signal is called the new header signal. Write circuit 2675 has as its input the output of read device 2635, so write circuit 2675 can reference or use information from the active header signal to derive the new header signal, if necessary. The new header signal, as provided at the output of write circuit 2675, is delivered to pulse generator 2680, which performs the operation of converting the new header signal data to, as exemplary, a 155 Mb/s signal on a microwave carrier. The signal from generator 2680 is filtered by low-pass filter 2685 to remove spurious high-frequency energy. Then the signal from filter 2685 is delivered to modulator 2690; modulator 2690 also has as a sinusoidal input at frequency f provided by local oscillator 2618. The output of modulator 2690, which appears on path 2671, is the new header signal centered at a frequency of the local oscillator, namely $f_c$; also, the output of modulator 2690 serves as the only input to phase-shift device 2695.

MZM 2670 produces a spectrum that includes both the original baseband data spectrum as well as the spectrum of the new header signal at $f_c$. This is shown in frequency domain visualization 2674 in the top right-hand corner of FIG. 26, which is counterpart of the visualization in the top left-hand corner.

The new optical signal on path 2673 is switched via optical switch 2603, as controlled by the active or original incoming header signal, under control of the label on lead 1011.

It is noted that, in terms of presently available components, the processing time of the header removal and insertion technique should take less than 30 ns. On the other hand, if it is assumed that there are 15 bits in each packet header signal, then the time to read 15 bits, write 15 bits, and add 10 preamble bits can take about 260 ns for a 155 Mbps burst. Therefore, allowing for some variations, each header signal is about 300 ns. This means that it may be necessary to insert a delay line in the main optical path between circulator 2640 and MZM 2670 of 300 ns, so the length of delay line would be around 60 meters. To save processing time, the data rate of the sub-carrier header can be increased to, for example, 622 Mb/s or higher, depending upon the future network environment.

1.7.4) Another SSB Embodiment of a Header Removal and Insertion Technique

Figure 27:
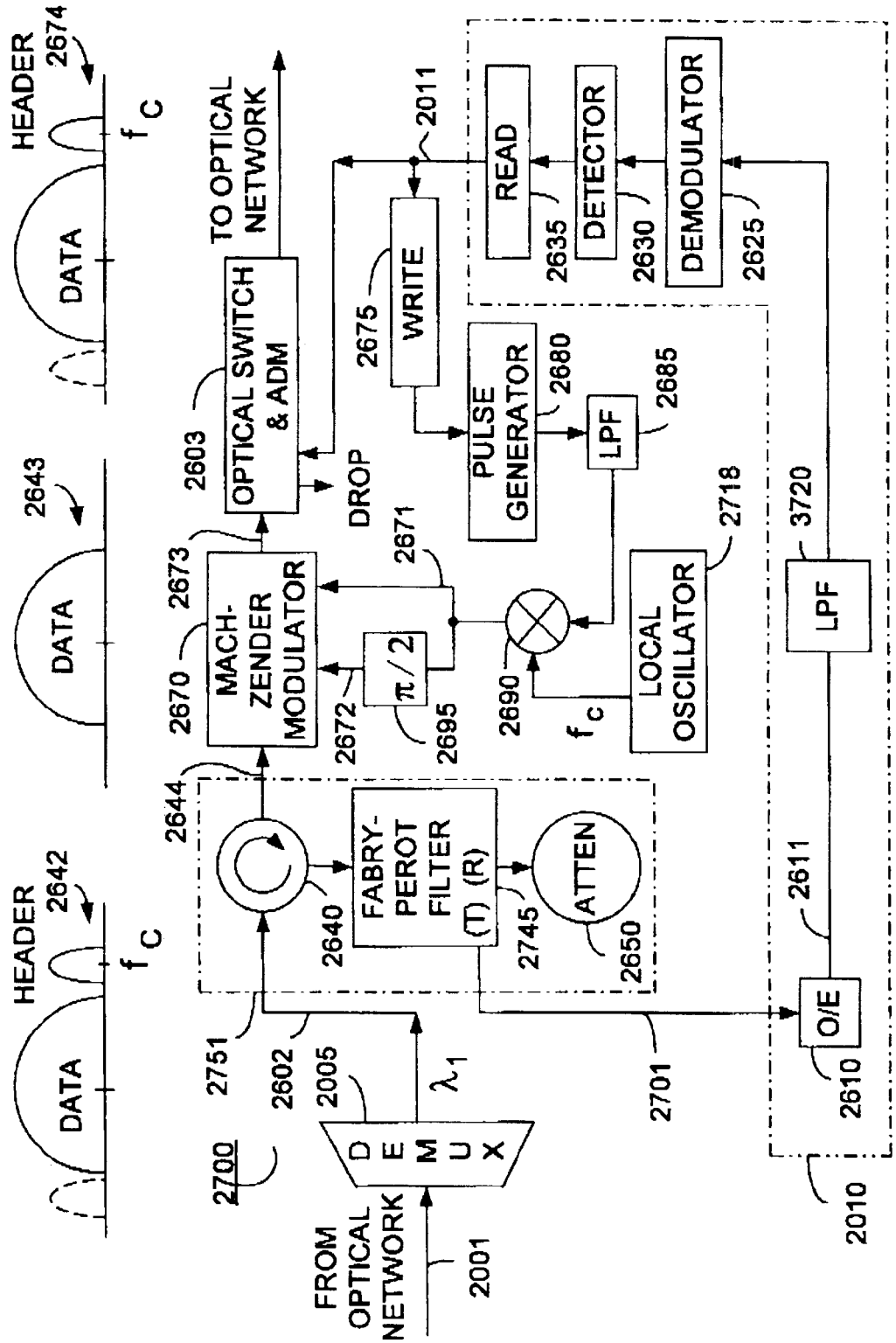
FIG. 27 is a block diagram of circuitry for the detecting the header with the transmission part of the notch filter, for removing the header with the reflective part of a notch filter, and for inserting a new single-sideband modulated header.

The circuit arrangement of FIG. 26 is realized using the so-called reflective port of FFP 2645. FFP 2645 also has a transmission port which may be utilized wherein the characteristics of the optical signal emanating from the transmission port are the converse of the optical signal from the reflective port. So whereas the reflective port provides an attenuation notch at $f_c$, the transmission port attenuates frequencies relative to $f_c$ so that only frequencies in the vicinity of f are passed by the transmission port. An alternative to circuitry 2600 of FIG. 26 is shown by circuitry 2700 of FIG. 27. The main difference between FIG. 26 and FIG. 27 is the manner in which the lower processing path now derives its input signal via path 2301 (as compared to input signal on path 2601 of FIG. 26).

In particular, FFP 2725 now has a transmission (T) port in addition to the reflective (R) port. The output from transmission port, on path 2701, now serves as the input to opto-electrical converter 2610. Because the signal on path 2701 conveys only frequencies centered about $f_c$, that is, the baseband data information has been attenuated by FFP notch filter 2345, and can be processed directly by detector 2630 via LPF 2720. The remainder of circuitry 2300 is essentially the same as circuitry 2600 of FIG. 26.

1.8) Optical Layer Survivability And Security (OLSAS) System

Another aspect of the present invention relates to multicasting in a network that also embodies survivability and security features. The techniques in accordance with the illustrative embodiments set forth in detail below provide various levels of protection against all three of the optical "attack" schemes described in the Background Section, as well as against other attack scenarios. By taking advantage of the existence of (a) multicasting, (b) multiple optical wavelengths and (c) diverse network paths, it is possible to multicast information in a manner that both increases network survivability and bolsters information integrity while mitigating the effects of eavesdropping, misdirection, and denial of service attacks. For instance, distributing information from a particular session across a (randomly selected) set of wavelengths (i.e., a subset of all possible wavelengths available on a link or in the network) can defend against non-destructive fiber tapping by an adversary or signal misdirection due to enemy takeover of a network node or a control channel. Furthermore, multiple paths allow for greater tolerance against denial of service attacks, such as jamming.

Also, it is important to note that the OLSAS techniques are complementary to existing or future security and survivability mechanisms within the electronic domain. These OLSAS techniques are not intended as a substitute for the vast array of security and encryption mechanisms currently available. Rather, they seek to enhance the electronic security mechanisms by offering an extra level of security within the optical (physical) layer using the strength of optical switching and multiplexing techniques.

Figure 28:
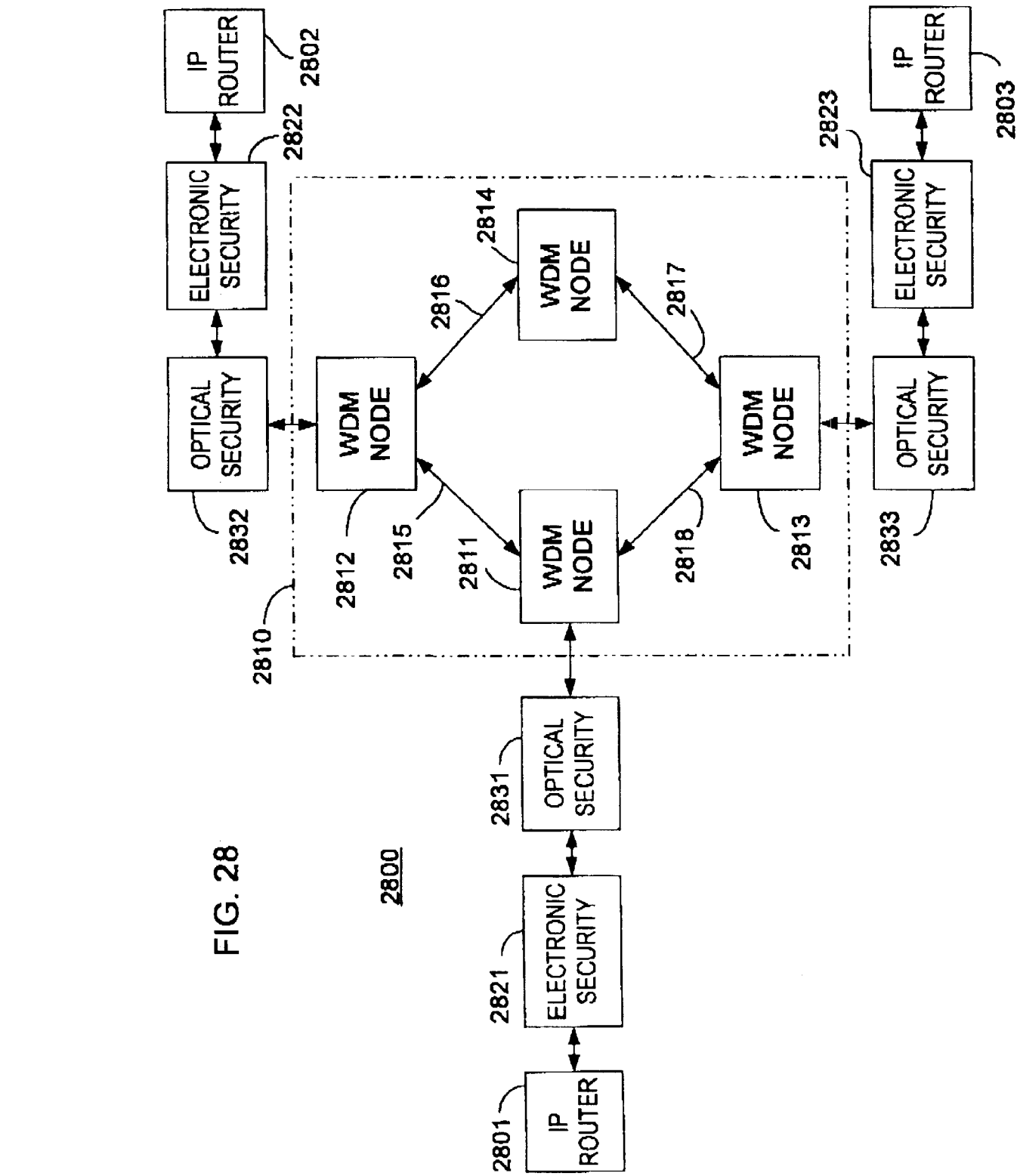
FIG. 28 depicts a high-level block diagram of the location of optical link security devices in the backbone network in accordance with the present invention.

In particular, optical-label swapping is utilized in the IP routers attached to a transmit module of the OLSAS system so as to perform packet forwarding in this multiple-path approach with multicasting. A pictorial view of this two-tier security is shown in FIG. 28 wherein system 2800 in high-level block diagram form includes: (a) optical network backbone "cloud" 2810 having WDM nodes 2811, . . . , 2814 coupled by optical paths 2815, . . . , 2818, as depicted; (b) IP routers 2801, 2802, and 2803 served by network backbone 2810; (c) end-to-end electronic security devices 2821, 2822, and 2823, each coupled to a respective IP router at its output; and (d) optical link security devices 2831, 2832 and 2833, each respectively interposed between a corresponding electronic security device and network backbone 2810. The view of FIG. 28 clearly illustrates the complementary nature of the electronic and optical security devices.

The OLSAS system has been devised to carry out information flow protection based on network and security features in the multicast optical header, which is carried in-band within an individual wavelength and modulated out-of-band in the frequency domain. IP packets contained in each information flow are transported over at least two copies of several randomly selected wavelength channels via choices of multiple disjoint paths. Thus, "flows" or "streams" of data can be survivable based on these OLSAS techniques.

Figure 29:
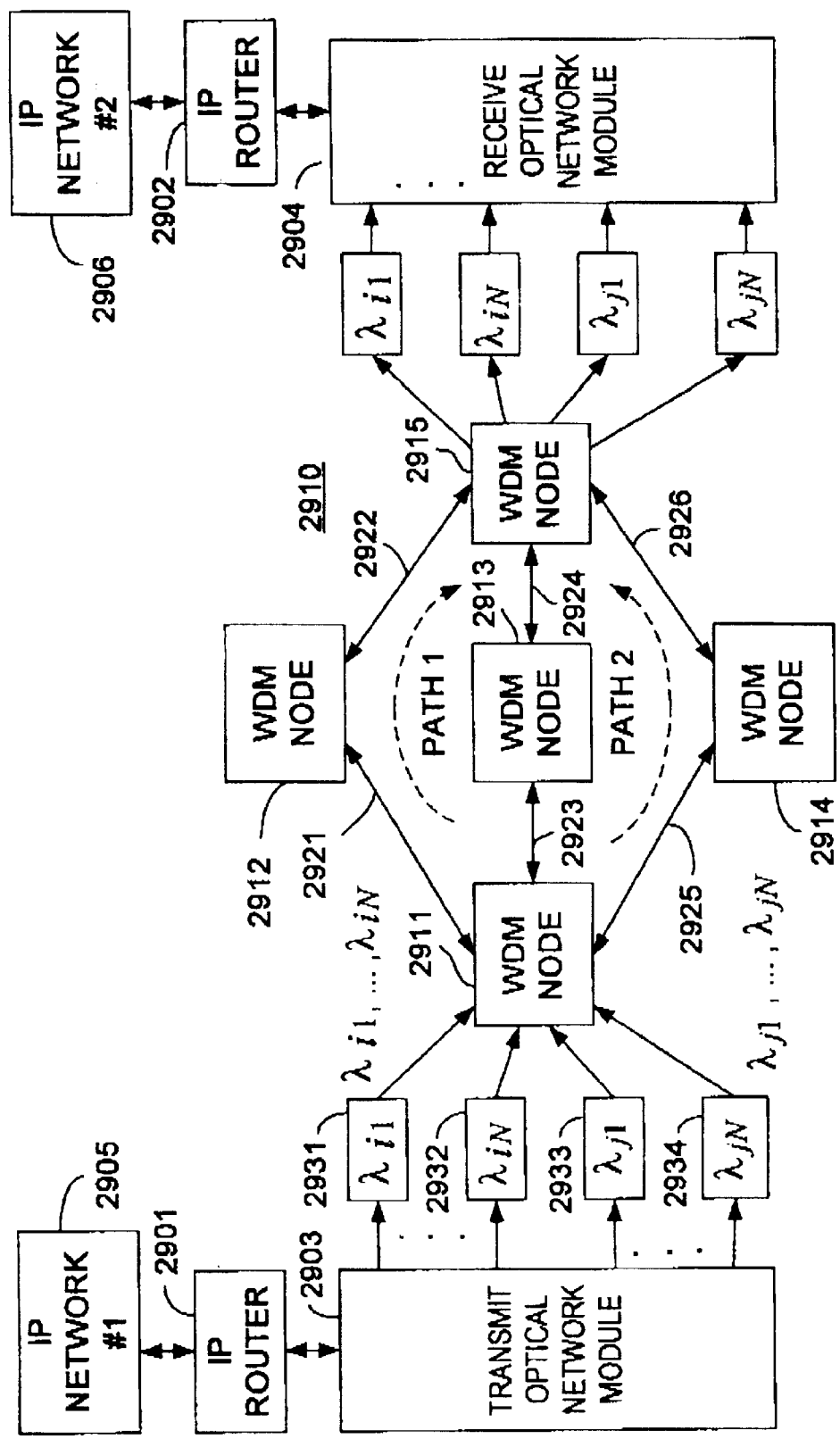
FIG. 29 shows an illustrative embodiment for transmitting packets over disjoint paths and over a subset of wavelengths.

FIG. 29 below illustrates one embodiment of the OLSAS technique, which is first described without multicasting so as to establish and understand the point of departure according to this aspect of the present invention; the modifications to effect multicasting are then overlaid on the description without multicasting. With reference to FIG. 29, IP packets from source IP Network #1 2905 enter WDM backbone network 2910 via IP router 2901 and are destined for IP Network #2 2906 via IP router 2902. WDM network 2910 is composed of WDM nodes 2911, . . . , 2915 coupled by the links/edges as shown, namely, nodes 2911 and 2912 are coupled by link 2921, node 2912 and node 2915 are coupled by link 2922, and so forth. The packets emitted by router 2901 are processed in the Transmit Optical Network Module (ONM) 2903 interposed between router 2901 and network 2910; in ONM 2903 the electronic packets are converted to equivalent optical IP packets with an associated optical header. In addition, the ONM 2903 applies the OLSAS technique (using, for example, a secure pseudo-random number generator (SPRNG) as discussed in more detail later) to choose multiple paths through the WDM network, each of which carries a cryptographic share of the packets in a particular IP session. In the example of FIG. 29, there are two disjoint paths, Path 1 (composed of, in series, node 2911, link 2921, node 2912, link 2922, and node 2915), and Path 2 (composed of, in series, node 2911, link 2925, node 2914, link 2926, and node 2915). For each of Path 1 and Path 2, ONM 2903 assigns a (same or different) pseudo-random subset of available wavelengths on which to transmit the "shares", that is, a collection of packets, from a particular session. In FIG. 29, wavelengths $\lambda_{i1}$, . . . , $\lambda_{iN}$ having reference numerals 2931, . . . , 2932 define a first subset of wavelengths for propagation over Path 1, whereas wavelengths $\lambda_{j1}$, . . . , $\lambda_{jN}$ having reference numerals 2933, . . . , 2934 define a second subset of wavelengths for propagation over Path 2. One possible arrangement is to propagate packet 1 using $\lambda_{i1}$ and packet N using $\lambda_{iN}$ of Path 1; concurrently, packet 1 is transmitted using $\lambda_{j1}$ and packet N using $\lambda_{jN}$ of Path 2. The selection of multiple paths and wavelengths is varied at regular time intervals at a rate depending on the desired levels of survivability and security. The IP packet shares conveying the data payload are never examined or modified, thus preserving transparency and independence of the higher levels of the protocol stack.

At the far end, the IP packet shares are received by Receive ONM 2904, converted back to electronic packets, and handed over to IP router 2902 associated with IP Network #2.

ONMs 2903 and 2904 are synchronized and, as alluded to, use any robust Secure Pseudo-Random Number Generator (SPRNG) to coordinate the pseudo-random assignment of paths and wavelengths for a particular IP session. Cryptographically SPRNGs are necessary to construct the shares of the secrets and check the vectors described above. These generators produce output bits indistinguishable from truly random sources to any resource-bounded adversary. This implies that if one is presented with an output bit string from which any single bit is deleted, one cannot guess the missing bit with measurably better probability than 0.5. Since integrity or secrecy is based upon splitting a message among the wavelengths on a fiber, it may be necessary for maximum security to disguise the contents of the remaining unused wavelengths to make them indistinguishable from the live data. This will require a rather large supply of cryptographically strong pseudo-random bits. All of the coordination between source ONM 2903 and destination ONM 2904 is through the optical headers of the packets and does not rely on the underlying IP session, packets, applications, or particular data items.

The approach of FIG. 29 is representative of one exemplary approach to effect secure transmission which deploys two or more disjoint paths to carry information between different end systems. Another variation on the general approach is to not duplicate the information on the number of disjointed paths, but rather only a portion of the information is sent on each path. Even if the information on one path is tapped, and even if it is possible to calculate the subset of wavelengths used to carry that information, it is impossible to capture all the information being sent. The advantage of this variation is that an adversary needs to tap multiple paths and calculate the different subset of wavelengths in each such path in order to obtain the information being sent. Clearly, this variation becomes more effective when the number of disjoint optical paths increase. At the receiver side in this arrangement a number of paths are combined to obtain the original information being sent.

The method of securing a message by splitting it into shares or components is called "secret sharing", that is, sharing splits information into multiple parts or shares. Some subsets of the shares are sufficient to reconstruct the secret information, but smaller subsets are insufficient. The so-called threshold schemes have the desirable property that insufficient subsets reveal no partial information about what is being protected, so they are called perfect. Perfect secret sharing of messages can provide secrecy with respect to passive adversaries and survivability with respect to network failures.

Typically with secret sharing, if one of the shares is corrupted, the wrong value will be reconstructed. Therefore, verifiable secret sharing has become an important extension of secret sharing providing integrity with respect to active adversaries capable of tampering. Verifiable secret sharing allows corrupted shares to be identified and removed. To accomplish this, simple checksums of all the shares can be distributed with each of the shares so any "honest majority" can always pinpoint the corrupted shares.

Figure 30A:
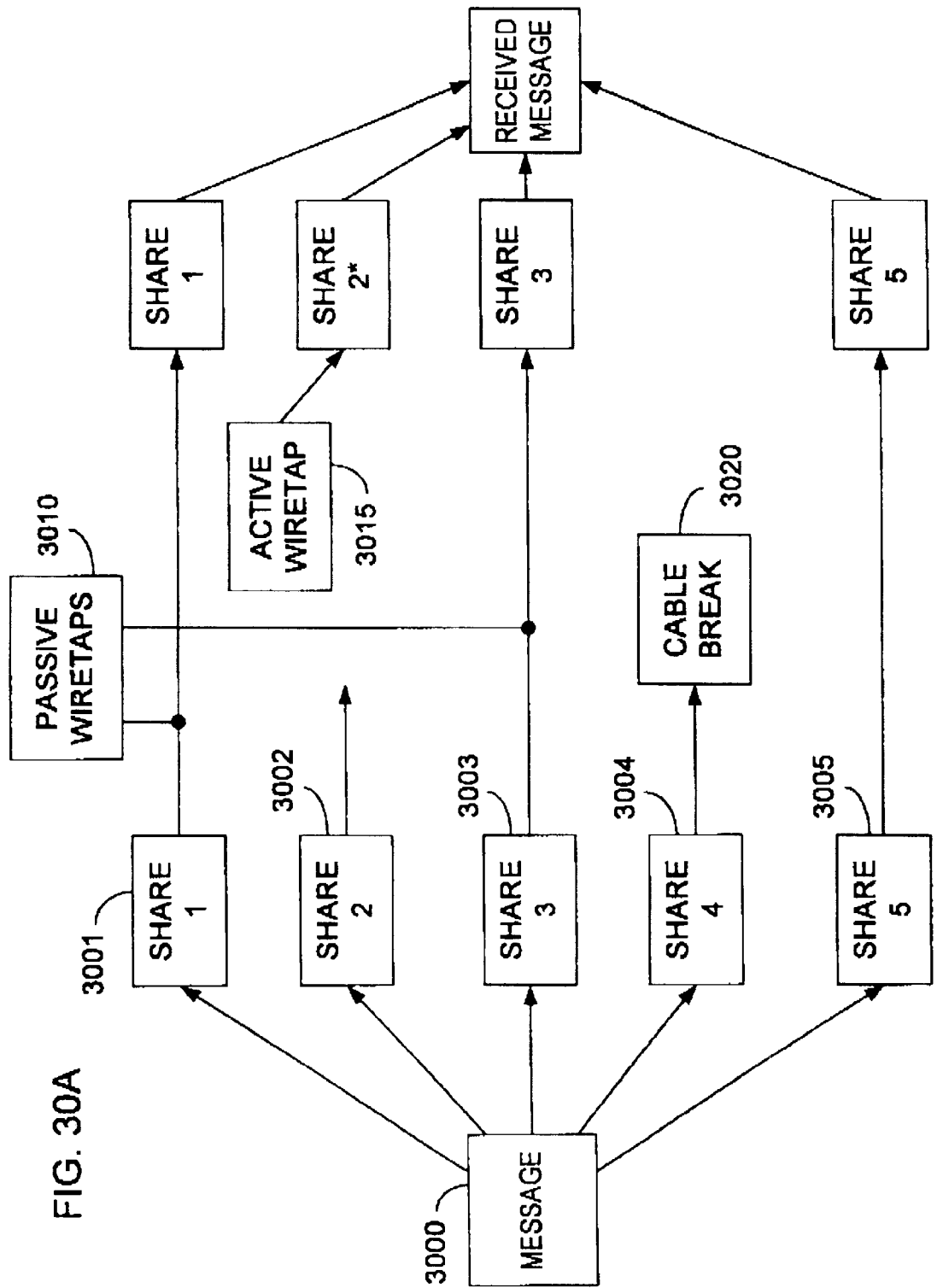
FIGS. 30A and 30B show illustrative embodiments for transmitting a subset of packets over disjoint paths without submitting all the packets of a session over a single path.

The block diagram of FIG. 30A illustrates this mechanism. In this example, message 3000 is split into Share 1, Share 2, . . . , Share 5 (reference numerals 3001–3005, respectively) whereby any three of which may be used to reconstruct message 3000. Shares 1, 3, and 5 are received intact, which is sufficient to reconstruct message 3000. An eavesdropper (reference numeral 3010) may get shares 1 and 3, but two shares alone reveal nothing about message 3000. Share 2, impacted by active wiretap 3015, produces Share 2* which is identified as an imposter and rejected by the majority (Shares 1, 3, and 5), whereas Share 4 never arrives at all due to a cable break shown by reference numeral 3020.

Figure 30B:
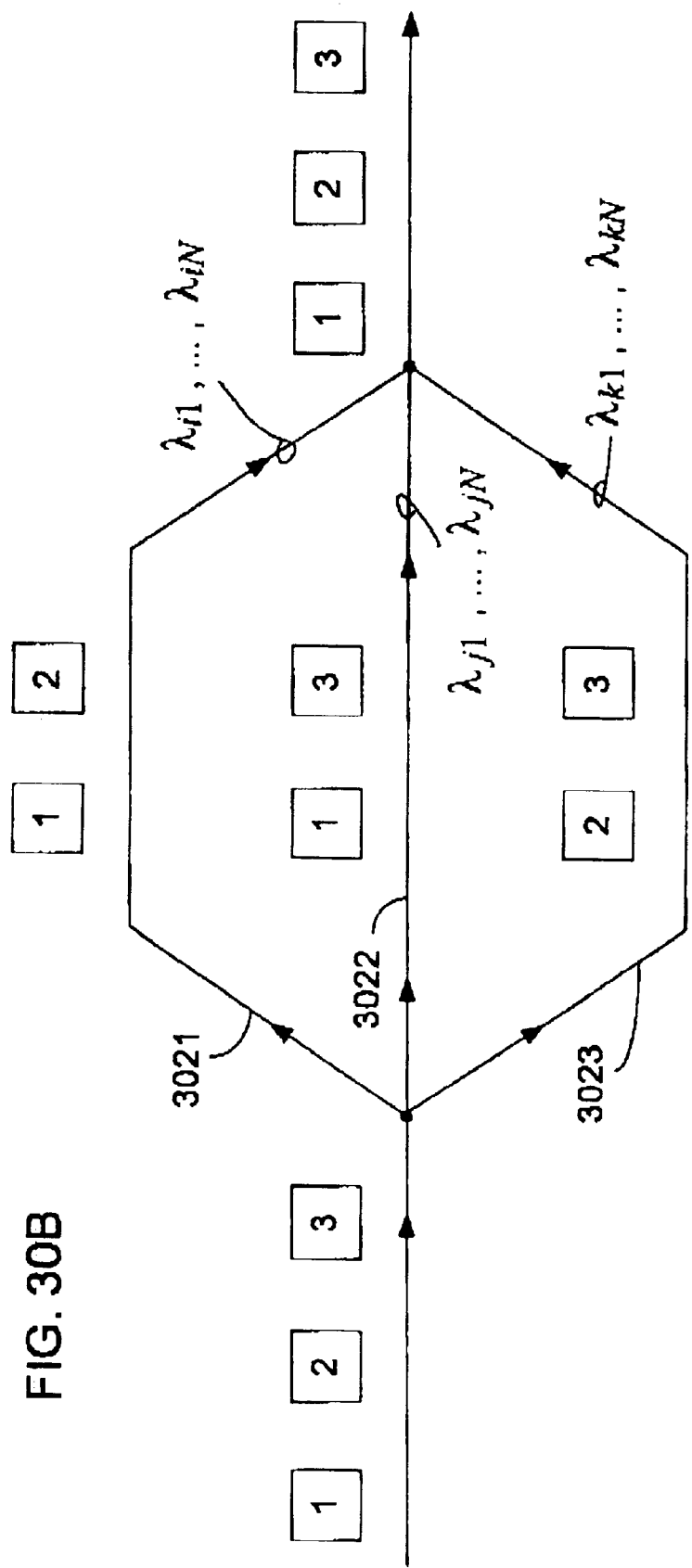

FIG. 30B shows in pictorial fashion another example using three disjoint paths, namely, paths 3021, 3022, and 3023. On each path, two-thirds of the information is being sent (two out of three packets), a first packet on a first wavelength and a second packet on a second wavelength. If an adversary taps one path, and is able to calculate the appropriate subset of wavelengths being used, the adversary can only obtain two-thirds of the information being sent. At the receiver side, two paths are sufficient to obtain all the information.

1.8.1) Illustrative Arrangements for Implementing OLSAS Techniques

The OLSAS methodology with multicasting is also engendered by optical label-switching. The general WDM network upon which the OLSAS technique is overlaid has already been discussed with reference to FIGS. 1–6. Moreover, the network aspects suitable for deploying the OLSAS methods in a multicast WDM network have been discussed with reference to FIGS. 7–27.

1.8.2) Optical Networking Modules (ONMs) In Accordance With the OLSAS Method

Three optical networking modules are used to implement the Optical Layer Survivability And Security system. The first of the OLSAS modules is deployed at each of the multi-wavelength transport interfaces (e.g. at the multi-transport interfaces of node 121 of FIG. 1), the second OLSAS module (e.g., ONM 2903 of FIG. 29) is deployed at the transmitter end of each single wavelength client interface (e.g. at the transmitter end of each single-client interface of node 123 of FIG. 1), and the third module (e.g., ONM 2904 of FIG. 29) is deployed at the receiver side of each single wavelength client interface (e.g., a the receiver side of each single-client interface of node 122 of FIG. 1).

1.8.3) Transport Interface Optical Network Module

The first of the optical networking modules as located at the transport interfaces is, structurally, basically the same as the second type Plug-and-Play module discussed earlier—especially with respect to FIGS. 6 and 7. It is recalled from the discussion of FIG. 7 that the second type of Plug-and-Play module is responsible for the optical-label switching function with multicasting. When the header and the data payload (e.g., 710 and 711 of FIG. 7) reach a transport node (e.g., node 501 of FIG. 7), a small percentage (e.g., 10 percent) of the optical signal is tapped off (via optical line 6021) while the remaining portion of the signal is delayed in an optical delay line (e.g., line 603). For the part of the signal that is tapped off, the optical header is stripped from the optical signal in header detector (e.g. 730 of FIG. 7) and detected via conventional electrical circuitry composing the header detector. The optical header carries the optical label (e.g., 715), which in turn enables the packet to be routed appropriately through the switch (e.g., 720).

In an optical network with survivability and security, the header/payload combination arriving over each wavelength in a subset of wavelengths at the second type of Plug-and-Play module may not necessarily be independent and distinct. As discussed with respect to FIG. 29, for example, wavelengths $\lambda_{i1}$ and $\lambda_{iN}$ arriving on link 2921 to node 2912 carry packets from a given IP session. However, the second type of Plug-and-Play module does not concern itself with this relation and therefore processes each incoming packet independently of any other packet, that is, the operation of the Plug-and-Play module is unaffected by the relation among packets.

1.8.4) Transmit Optical Network Module 2903

The transmitter side of the single wavelength client interface deploys the second type of module—Transmit Optical Network Module 2903. Module 2903, in effect, either replaces or is arranged to augment the first type of Pug-and-Play module 132 to effect, broadly, the following procedure: (a) generate and store multiple electronic copies of the input packets in an input transport node; and (b) optically transmit each of the multiply stored copies over a corresponding one of the links attached to the input transport node. In an illustrative embodiment, such steps may be further characterized by the steps of (i) generating multiple copies (at least 2) of the data packets so as to send the information destined for downstream transmission via at least two link-and-node disjoint paths—multiple copies can be achieved by using an IP packet multiplier known in the art; (ii) buffering the IP packets and using a SPRNG subsystem to "scramble" the packets and emit the scrambled packets from the buffer using M multiple output ports; and (iii) randomly assigned each of the output ports a wavelength again using a SPRGN subsystem. With this procedure, each path is assigned a different subset of M wavelengths out of the total number of existing wavelengths in the network.

Figure 31:
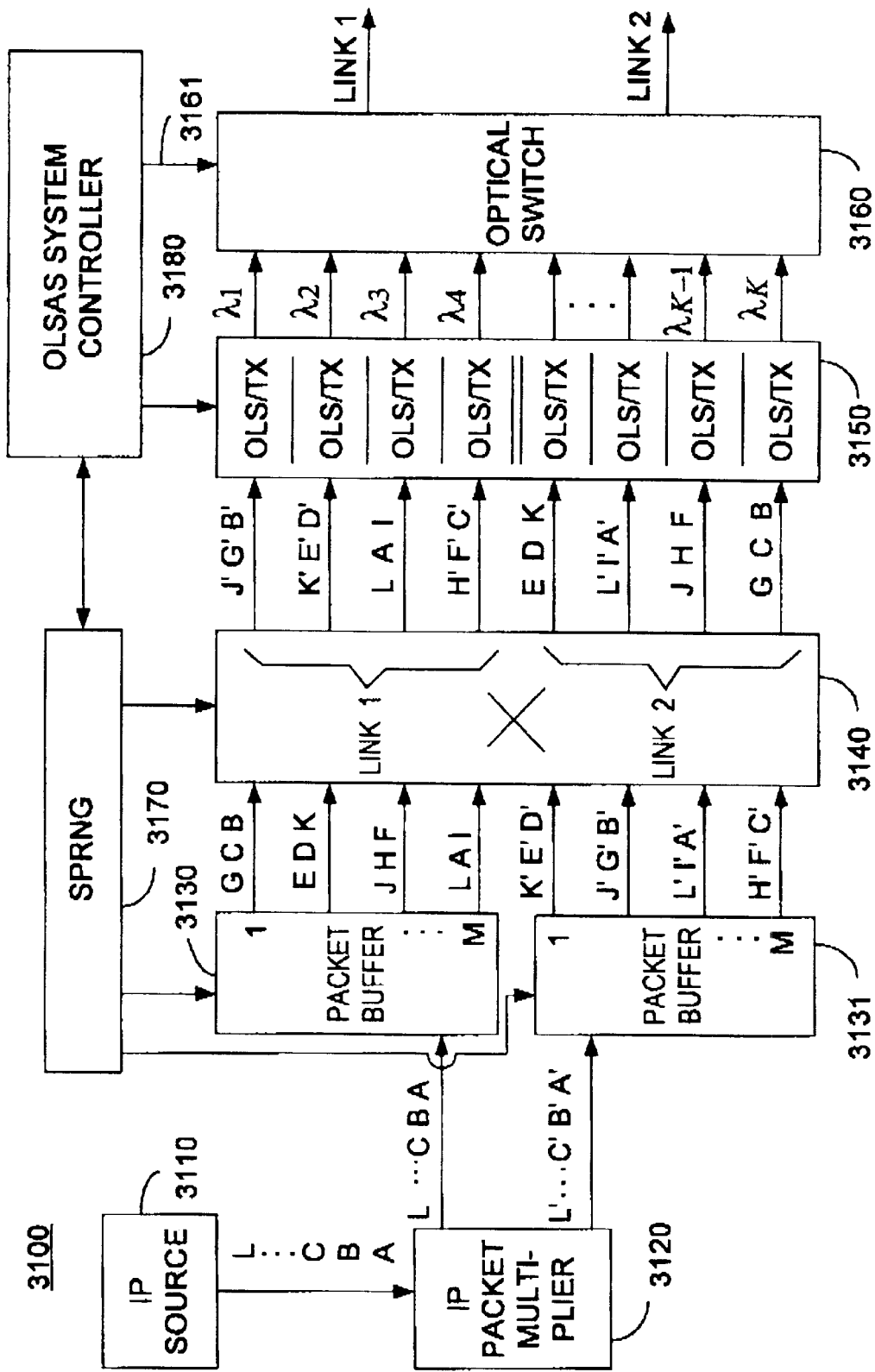
FIG. 31 is a high-level block diagram of the transmit optical network module in accordance with the present invention.

With reference to FIG. 31, there is shown illustrative arrangement 3100 which is one embodiment of ONM 2903. Packet source 3110 (such as IP element 111 of FIG. 1) provides a packet stream depicted by A,B,C, . . . ,L to IP packet multiplier 3120. The outputs of packet multiplier 3120 are two identical streams denoted A,B,C, . . . ,L and A', B', C', . . . L'. The first stream serves as an input to packet buffer 3130, whereas the second stream is an input to buffer 3131. Secure pseudo-random number generator 3170 provides "scrambling" information to each packet buffer to produce, in this example, four output streams per packet buffer. In particular, packet buffer 3130 outputs (ordered in time) a first stream B,C,G, a second stream K,D,E, a third stream F,H,J, and a fourth stream I,A,L. Similarly, packet buffer 3131 outputs four scrambled streams distinct from the output streams from buffer 3130. This aspect of scrambling ensures that all the packet information will not be duplicated on an individual optical wavelength at the output of arrangement 3100.

Next, SPRNG 3170 operates to re-arrange the packet streams so that the streams from packet buffers 3130 and 3131 may be spread, in this case, across two optical links. In particular, SPRNG 3170 controls electronic cross-connect 3140 to produce four output streams, namely: B', G', J'; D', E', K'; I,A,L; and C', F', H' at the Link 1 output of cross-connect 3140. Similarly, four re-arranged streams are assembled for transmission over Link 2 emanating from cross-connect 3140. Each set of four streams serves as input to Optical Label Switching Transmitter (OLS/TX) 3150 which optically modulates packet stream B', G', J', along with the appropriate header, onto wavelength $\lambda_1$ on Link 1; similarly, stream D', E', K' along with its header is optically modulated for propagation by wavelength $\lambda_2$ on Link 1; and so forth for Link 1. Concurrently, stream B,C,G with its header is optically modulated onto wavelength $\lambda_K$ of Link 2 by optical transmitter 3150, and similarly for the remaining header/packet streams of Link 2. Finally, optical switch 3160 serves to connect the optical streams to the corresponding links, as next described with respect to FIG. 32. OLSAS system controller 3180 controls the operation of transmitter 3150 and switch 3160 as coordinated with SPRNG device 3170.

When the optical packets reach the optical switch 3160 of FIG. 31, the switching fabric is set in such a way that all packets used in one disjoint path (e.g., Link 1) leave the switch using the same output fiber, as now described with reference to FIG. 32.

Figure 32:
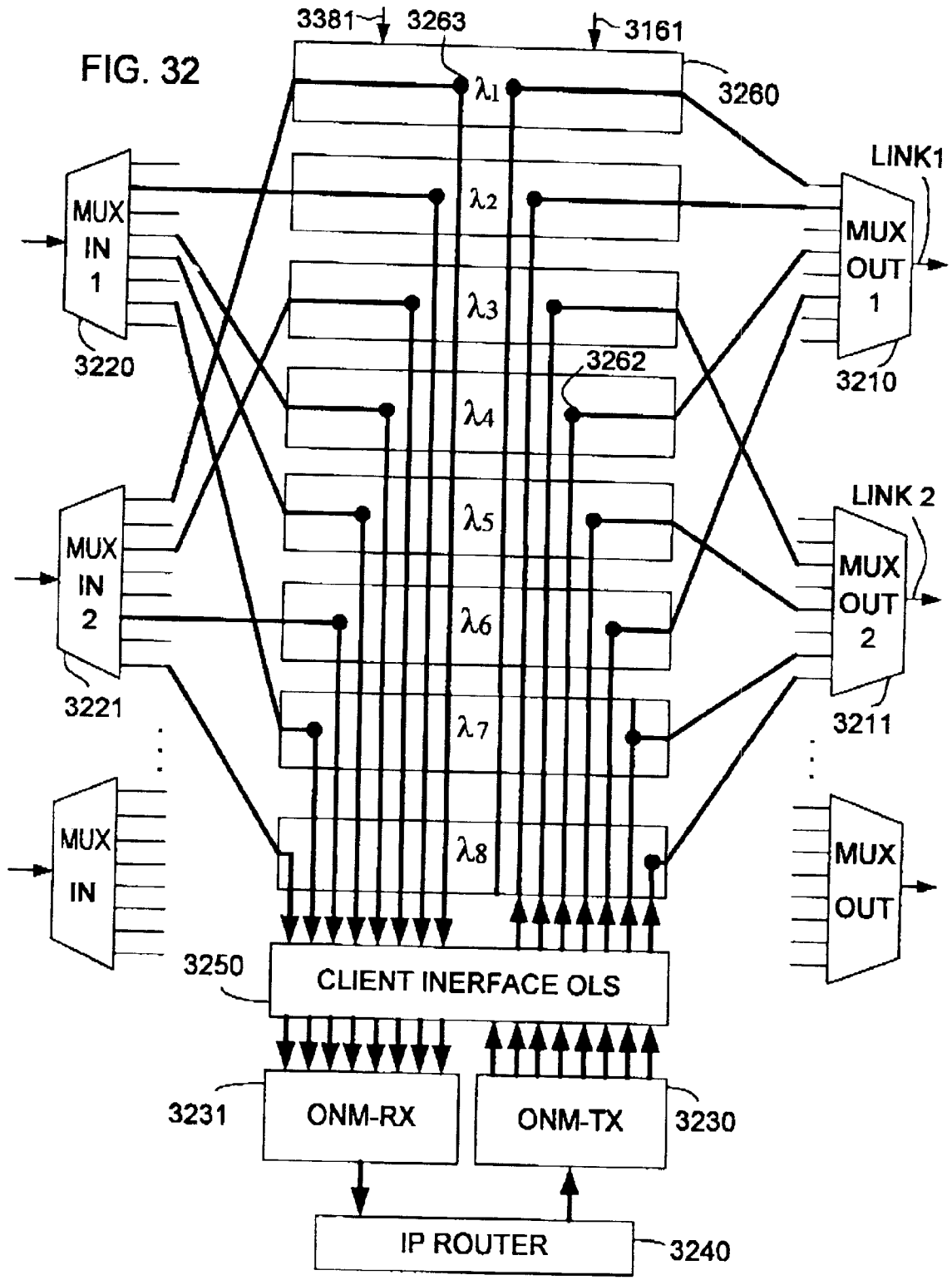
FIG. 32 illustrates the manner of transmitting and receiving packet streams from multiple optical links using the optical switch fabric.

FIG. 32 depicts the manner by which optical packets for two disjoint paths use two different output fibers to enter the WDM network from client interface 3250 via IP router 3240 and Optical Network Module transmitter (ONM-Tx) 3230 which, with reference to FIG. 31, encompasses IP packet multiplier 3120, packet buffers 3130 and 3131, cross-connect 3140, and SPRNG 3170. Optical switch 3260 is composed of a right-hand part for emitting optical signals, and a left-hand part for receiving optical signals. The right-hand part has been depicted by optical switch 3160 shown in FIG. 31 (the left-hand part is optical switch 3360 discussed shortly with respect to FIG. 33). Focusing on the right-hand part used for transmitting optical signals, switch 3260 is composed of switching points to switch the incoming optical signals propagated by client interface 3250 under control of signals arriving over path 3161 (from controller 3180 of FIG. 31); one such switching point is shown by reference numeral 3262. Using the optical signal conveyed by wavelength 24 as exemplary, switch 3260 closes switching point 3262 to couple the incoming optical signal to multiplexer 3210 which provides the multiplexed signals to optical Link 1. Similar comments applying with respect to each incoming optical signal which may be directed to either multiplexer 3210 or 3211. Thus, for the case of K=8 in FIG. 31 ($\lambda_1, \lambda_2, \ldots \lambda_8$), the optical signals with wavelengths $\lambda_1$, $\lambda_2$, $\lambda_4$, and $\lambda_6$ are switched by switch 3260 to multiplexer 3210 for propagation over Link 1. Similarly, the optical signals with wavelengths $\lambda_3$, $\lambda_5$, $\lambda_7$, and $\lambda_8$ are switched by switch 3260 to multiplexer 3211 for propagation over Link 2.

Module 2903 is essentially responsible for distributing the data packets for one session through a number of different wavelengths and disjoint paths. This set of wavelengths is a subset of the total number of wavelengths available in the network. The optical header carries encoded information that is then used at the receiver-side ONM to choose the subset of wavelengths used for the communication between a given source and destination, as now discussed.

1.8.4) Receive Optical Network Module 2904

Figure 33:
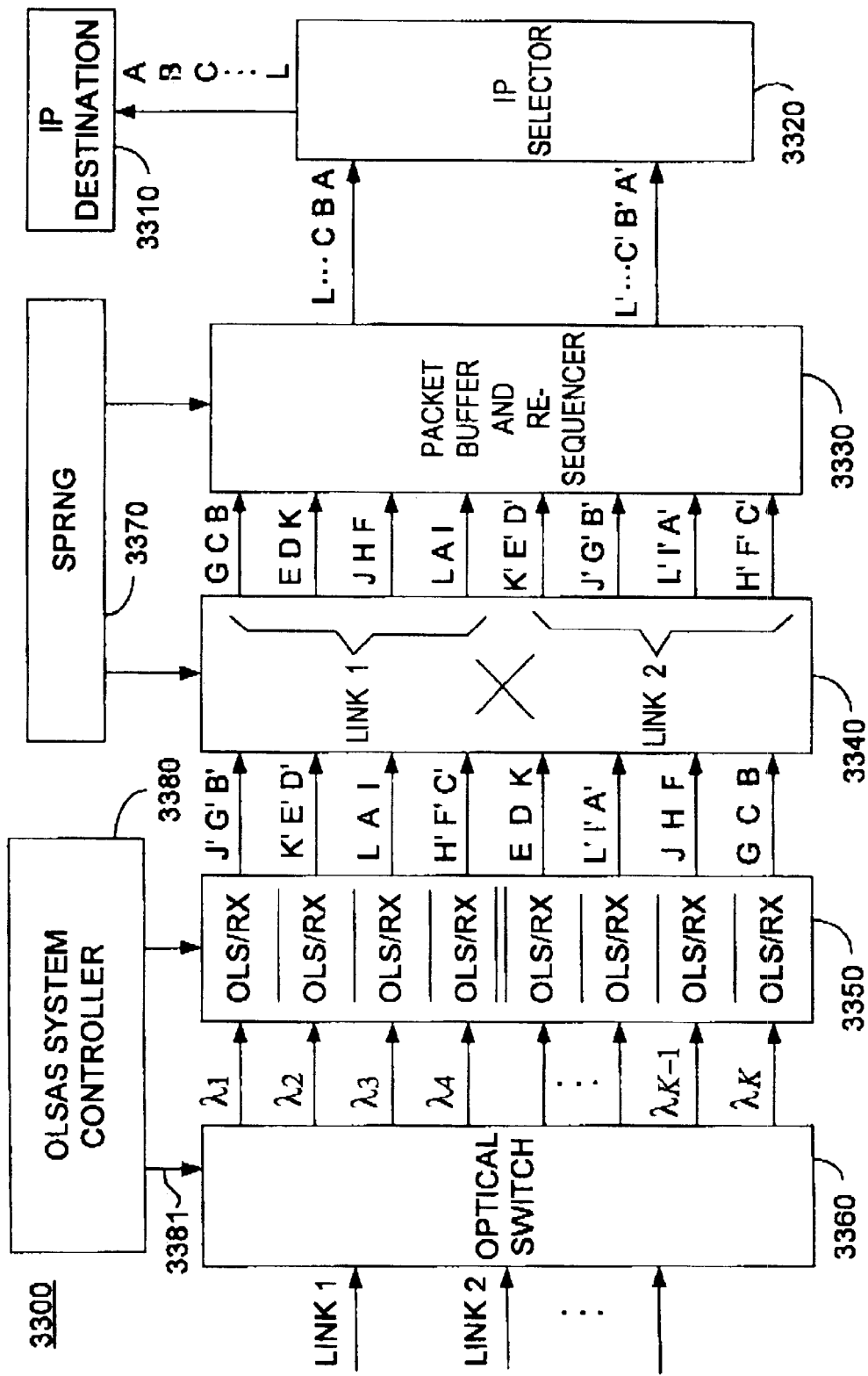
FIG. 33 is a high-level block diagram of the receive optical network module in accordance with the present invention.

At the receiver node of the optical transport network, the third type of module is deployed which is responsible for essentially the reverse functionality of the module located at the transmitter side, as shown in arrangement 3300 of FIG. 33. All the packets in a packet share are received over optical Links 1 and 2 at optical switch 3360, and the optical header of each packet is read. The security information included in each header, such as an encoding/decrypting key, is then forwarded to the OLSAS system controller 3380, which in turn passes this information to SPRNG device 3370. This information is subsequently used to retrieve the packets correctly at the appropriate wavelengths. Moreover, each wavelength is processed by Optical Label Switching Receiver 3350 to detect the packets. For example, receiver 3350 effects optical-to-electrical conversion of the packets arriving on wavelength $\lambda_1$ and produces electronic packets J', G', B'. The packets are then processed by cross-connect device 3340 in preparation for re-sequencing of the packets in buffer/resequencer 3330. As depicted, device 3340 receives its input from SPRNG element 3370 to re-associate the packets from the first stream (all of the "unprimed" packets A,B,C . . . , L) and the second stream (all the "primed" packets). Resequencer 3330 converts the buffered packet shares to the single stream A,B,C, . . . H, and similarly converts "primed" packet shares to the corresponding single stream. Finally, IP selector 3320 is used to choose one of the multiple disjoint paths that carry the information of a single communication session, and delivers this selected stream to the IP destination depicted by element 3310.

Again with reference to FIG. 32, the manner by which optical packets for two disjoint paths use two different output fibers to exit the WDM network through client interface 3250 via IP router 3240 and Optical Network Module receiver (ONM-Rx) 3231 (which, with reference to FIG. 33, encompasses cross-connect 3340, buffer and resequencer 3330, IP selector 3320, and SPRNG 3370) is now described. The left-hand part of optical switch 3260 has been depicted by optical switch 3360 shown in FIG. 33. Focusing on the left-hand part used for receiving optical signals, switch 3260 is composed of switching points to switch the incoming optical signals propagated by the WDM network under control of signals arriving over path 3381 (from controller 3380 of FIG. 33); one such switching point is shown by reference numeral 3263. Using the optical signal conveyed by wavelength $\lambda_1$ as exemplary, switch 3260 closes switching point 3263 to couple the incoming optical signal from multiplexer 3220 to client interface 3250 and, in turn, to ONM-Rx 3231 and IP router 3240. Similar comments applying with respect to each incoming optical signal which may be directed from either multiplexer 3220 or 3221. Thus, for the case of K=8 in FIG. 33 ($\lambda_1, \lambda_2, \ldots \lambda_8$), the optical signals with wavelengths $\lambda_2$, $\lambda_4$, $\lambda_5$, and $\lambda_7$ are switched by switch 3260 as received from multiplexer 3220. Similarly, the optical signals with wavelengths $\lambda_1$, $\lambda_3$, $\lambda_6$, and $\lambda_8$ are switched by switch 3260 as received from multiplexer 3221.

FIG. 34 summarizes the electronic and optical level security method with the help of high-level flowchart 3400. Initially, processing block 3405 operates to produce electronic packets. Next, the electronic packets are processed, to encapsulate the electronic packets with electronic security via block 3410. Processing block 3415 is invoked to generate a subset of wavelengths and links to carry the combined header/payload information. Then, via block 3420, the security information is appended to the label in the header—the label effects label switching at intermediate nodes. The header/payload information is propagated over the optical network (shown, for example, by "cloud" 2810 of FIG. 28), as carried out by processing block 3425. As the header/payload packets propagate through the network, optical label switching is deployed to route the optical packets, as denoted by processing block 3430. In turn, as evidenced by processing block 3435, the packets are received via the original subset of wavelengths and corresponding links, and the optical security information in the header is used to convert the packets to electronic form, and then re-assemble and re-sequence to produce the received electronic packets which correspond to the input source packets. Block 3440 depicts processing wherein one stream from the plurality of detected streams is selected from delivery to the destination. Next, processing by block 3445 is invoked to decrypt the electronic message. Finally, as depicted by block 3450, a reproduced version of the original message is received at the destination.

(It is apparent that the level of security provided by this OLSAS technique depends on the number of wavelengths chosen over which to send the information, the total number of wavelengths available, and the frequency with which these (pseudo-random) subsets are changed, and also the number of paths over which the packets are spread (assuming that not all of the packets are sent via each disjoint path as per FIGS. 30A and 30B). Obviously, using just 16 out of 128 wavelengths (commercial systems provide 128 or more wavelengths) to carry the information yields an effective key size of more than 100 bits.)

1.8.5) Layout of Header(s)

The optical header that carries additional security features and information ('security features' for short) may be implemented in the sub-carrier domain in much the same manner as the optical-label technique described earlier with respect to FIGS. 15A–15E. FIGS. 35A and 35B depict optical packet transmission with security features, and contrast the traditional propagation approach (FIG. 35A) with a WDM sub-carrier optical-label approach for conveying security features as well as an optical label (FIG. 35B). (Later, both security features and multiple optical labels are discussed together in FIG. 37). In the traditional approach, network features (NF) 3501 and security features (SF) 3502 are contiguous in time with the IP header (3503) and IP data payload (3504) forming, typically, a single packet. From the frequency domain viewpoint, the upper half of FIG. 35A shows spectrum 3505 of the packet—as is discerned, the network features and security features are embedded within the overall spectrum. With the optical labeling switching approach, as depicted in FIG. 35B, network features 3501 along with, for example, label L (reference numeral 3507) and security features SF (reference numeral 3512) are propagated contiguously in time. In terms of the frequency domain, IP header 3503 and IP data 3504 of FIG. 35A occupy one band of the spectrum (3505), whereas network features 3501, label 3507, and security features 3512, which form the header (H) of FIG. 35B, are displaced in frequency, as shown by band 3506 in the upper half of FIG. 35B. The IP information and the header information are conveyed by the same optical wavelength, shown as X in FIGS. 35A and B.

1.8.6) Secure Optical Layer Control Module (SOLCM)

Figure 36A:
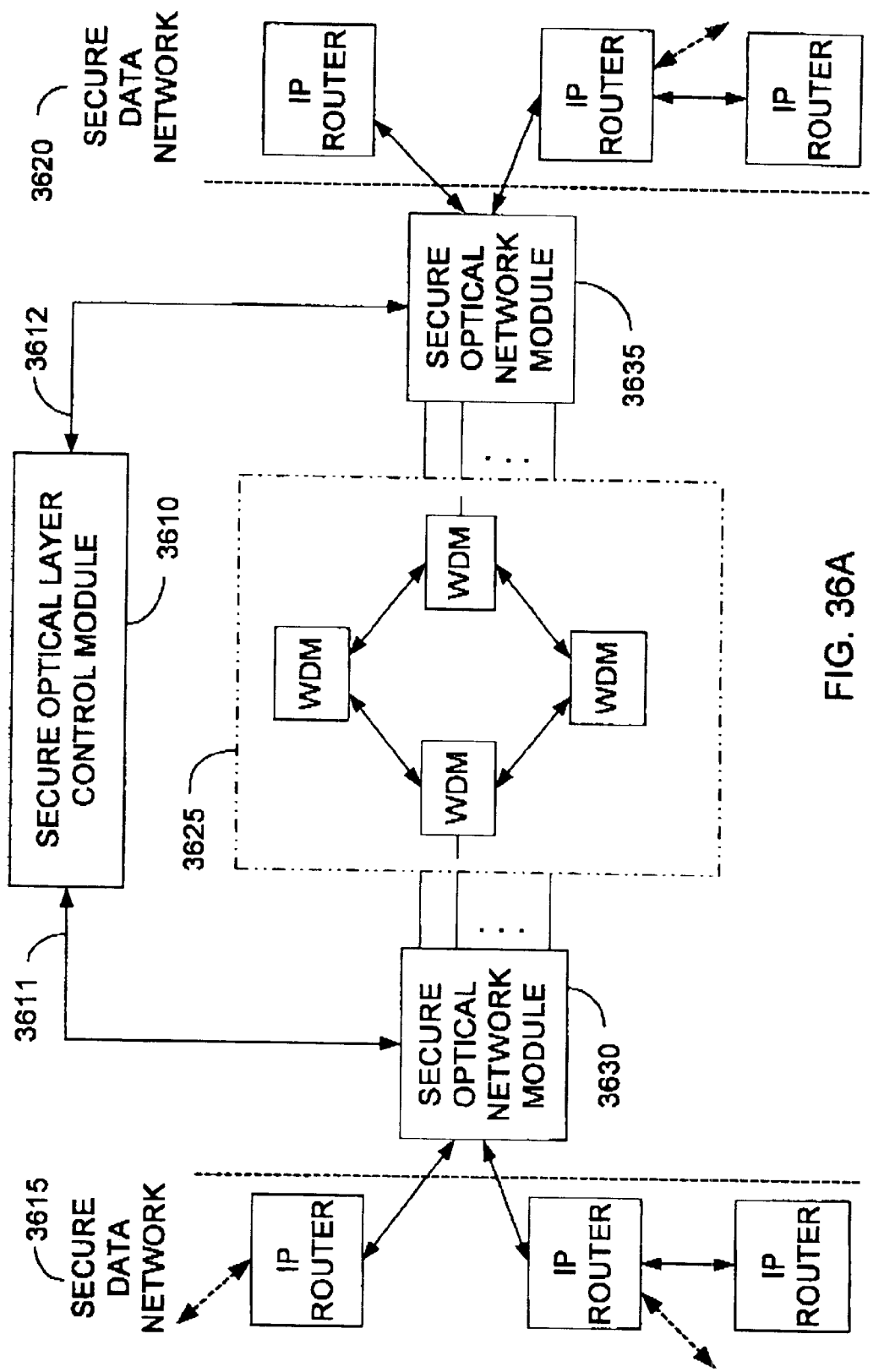
FIG. 36A depicts a high-level block diagram of an optical non-multicast network, the SOLC module, and the way the SOLC module sends synchronizing information to the secure optical network modules.

With reference to FIG. 36A, secure optical layer control module 3610 creates and distributes messages to ONMs 3630 and 3635 using the Secure Optical Layer Control Protocol (SOLCP) on links 3611 and 3612; ONM 3630 couples secure data network 3615 to public optical network 3625, and ONM 3635 couples secure data network 3620 to public network 3625. Module 3610 has the important function of maintaining information on the status of the network as a whole, that is, public optical network 3625, and module 3610 communicates with ONMs 3630 and 3635 via a set of SOLCP messages. Such messages may require ONM 3630 or 3635 to perform a specific task, or the messages may be queries for alarms, alerts, link status, available wavelengths, and so forth. This control operation can process data on link status within network 3625. For example, module 3610 can use statistical information about packet loss, throughput, and delay to develop a database of links that are the "best" links to use for any given transmission application. Module 3610 can also periodically send explicitly routed, time-stamped packets into the network to generate network status data. Module 3610 can be merged or integrated with NC&M 220 to create a "secure NC&M" module, that is, the functionality required of the SOLCM can be effected by the NC&M as well. In FIG. 36A, optical network 3625 is, for sake of clarity in the foregoing discussion, presumed to be a non-multicast optical network.

Figure 36B:
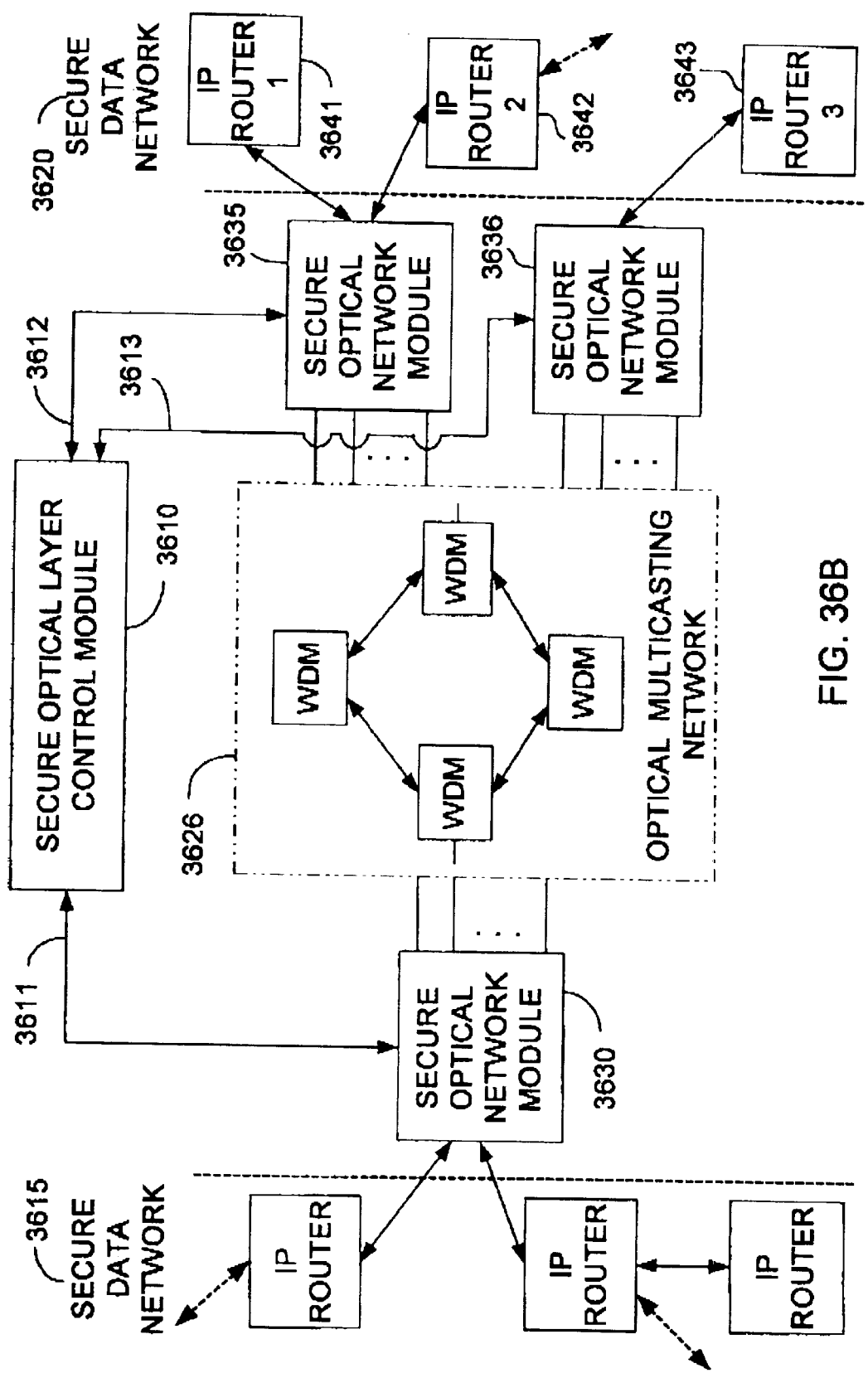
FIG. 36B is analogous the arrangement of FIG. 36A with the elements now being served by an interposed optical multicast network.

FIG. 36B now depicts an arrangement commensurate with FIG. 36A wherein optical network 3626 is now arranged for multicasting in addition to survivability and security. This capability is exemplified by the presence of two similar secure optical network modules 3635 and 3636 coupled to the right-hand side of optical multicast network 3626. The optical communications scenario depicted in FIG. 36B is one wherein security and survivability is desired for more than one destination device—in this case IP routers 3641, 3642, and 3643, and wherein router 3643 is not served by alternative links to routers 3641 and 3642. Optical network 3610, because of its multicast capability, can deliver the shares arriving at any WDM network encompassed by network 3610 to both ONM 3635 and 3636. To achieve multicasting, optical network 3626 is arranged with multicasting optical switches of the type discussed with reference to FIGS. 7–14, that is, each WDM node composing optical network 3626 has an embedded switch of the requisite type exemplified by the multicast optical switches of FIGS. 7–14.

1.8.7) Layout of Headers for Multicasting in an OLSAS Network

In FIG. 36B, WDM security and survivability information can be conveyed downstream using either the single sub-carrier approach or a multiplicity of sub-carriers. These alternative approaches are shown pictorially in FIG. 37B and FIG. 37C, respectively, whereas FIG. 37A repeats FIG. 35A for comparison purposes. With this single sub-carrier approach of FIG. 37B, a label is associated with each of the security features; for example, label L1 (3701) with SF1 (3704), and so forth. The total header has the spectrum as shown by 3707 in the upper-half of FIG. 37B. With the multiple sub-carrier approach, the unique label is attached to each of the security features, and the combination occupies a distinct frequency band. For example, label L3 and SF3 (reference numerals 3711 and 3712, respectively) occupy the highest frequency band (H3) in the upper-half of FIG. 37C. As thus shown in FIG. 37C, SF1, SF2, or SF3 with their corresponding label L1, L2, or L3, respectively, is each carried by an associated unique sub-carrier in the frequency domain, namely, in frequency bands shown by H1, H2, and H3, respectively. Also shown are network features, e.g., 3710, associated with each label SF1, SF2, and SF3, respectively. Each of the network features may be a subset of the original network features 3501, or may convey additional data as required. For instance, network features 3501 may convey, additionally, a field indicating the number of label/security features fields that appear (in this example, three label/security features fields), to be processed in each network element to effect security and survivability.

With reference to FIG. 38, there is shown a flow diagram 3800 with depicts the steps to carry out multicasting to effect survivability and security. Initially, processing block 3805 operates to produce electronic packets. Next, the electronic packets are processed to encapsulate the electronic packets with electronic security via block 3810. Processing block 3815 is invoked to generate a subset of wavelengths and links to carry the combined header/payload information. Then, via block 3820, security information (e.g. SF1 and SF2) is appended to the header. Next, the multicast information is added to the header (e.g., L1 and L2), as shown by processing block 3825, that is, the information to effect multicast label switching at intermediate nodes. The label switching information may be conveyed by either a single sub-carrier or multiples sub-carriers, depending upon the implementation selected. The header/payload information in the form of an optical signal is propagated over the optical network (shown, for example, by network 3626 of FIG. 36B); as carried out by processing block 3830, as each optical signal arrives at an optical node within network 3636, the labels are parsed to determine multicast routing for the optical signals. Thus, as the header/payload optical packets propagate through the network, optical label switching is deployed to multicast the optical packets. In turn, as evidenced by processing block 3835, the packets are received via the original subset of wavelengths and corresponding links, and the optical security information in the header is used to convert the packets to electronic form, and then re-assemble and re-sequence to produce the received electronic packets which correspond to the input source packets. Block 3840 depicts processing wherein one stream from the plurality of detected streams is selected for delivery to each of the destinations. Next, processing by block 3845 is invoked to decrypt the electronic message at each destination. Finally, as depicted by block 3850, a reproduced version of the original message is received at each destination.

1.9) Optical Header Processing for Security and Survivability and Multicasting

The foregoing description of OLSAS focused on optical header processing at a level commensurate with the description of the overall NGI system configured with the overlaid security/survivability network multicast modules. Discussion of header processing for multicasting in a secure/survivable network at a more detailed level is already encompassed by the detailed description of (a) label parsing, (b) adding a new active header to an existing header, or (c) deleting and replacing an incoming header (swapping for short) covered by the discussion of FIGS. 24–27.

For example, as is readily apparent to one with ordinary skill in the art, the teachings of, for example FIG. 25, are representative of the teachings of FIGS. 22–27. For instance, it is clear than an incoming header utilizing a single sub-carrier centered about $f_N$, which header is presumed to have the form shown in FIG. 37B, is deleted and then a new header is inserted by the processing of circuitry 2500. The sub-carrier header signal at centered at $f_N$ is allocated at high-frequency carrier so that the header signal conveyed $f_N$ will not affect the data payload in the low frequency region. With reference to FIG. 25, by way of reiteration, the output of compensator 2205 feeds optical circulator 2510, which is coupled to fiber Fabry-Perot (FFP) notch filter 2515 and attenuator 2520 in series. The combined effect of these components is to notch out the header signal centered at $f_N$; the spectrum of the input to optical circulator 2510 is shown in the top left corner, whereas the spectrum of the output of circulator 2510 is shown in the top center. The newly inserted header signal is provided by the series combination: write circuit 2294; modulator 2296; up-converter 2281 being driven by sub-carrier $f_N$. Read circuit 2293 parses the header to obtain the multicast and security features information; in turn, this information is delivered to optical switch 2207, which is a multicast switch of the type exemplified by FIGS. 7–14.

1.10) Virtual Private Network

The teachings of the descriptions relating to: (i) multicasting as manifested by the plurality of labels (e.g., L1, L2, L3 in FIG. 37B); (ii) and security and survivability as manifested by security features (e.g., SF1, SF2, SF3 in FIG. 37B), engender yet another aspect of the present invention, namely, the realization of a virtual private network (VPN) with a concomitant method of carrying out communications over the VPN. It is possible to use multicasting labels and security features-like information to route optical signals through an optical network.

Figure 39:
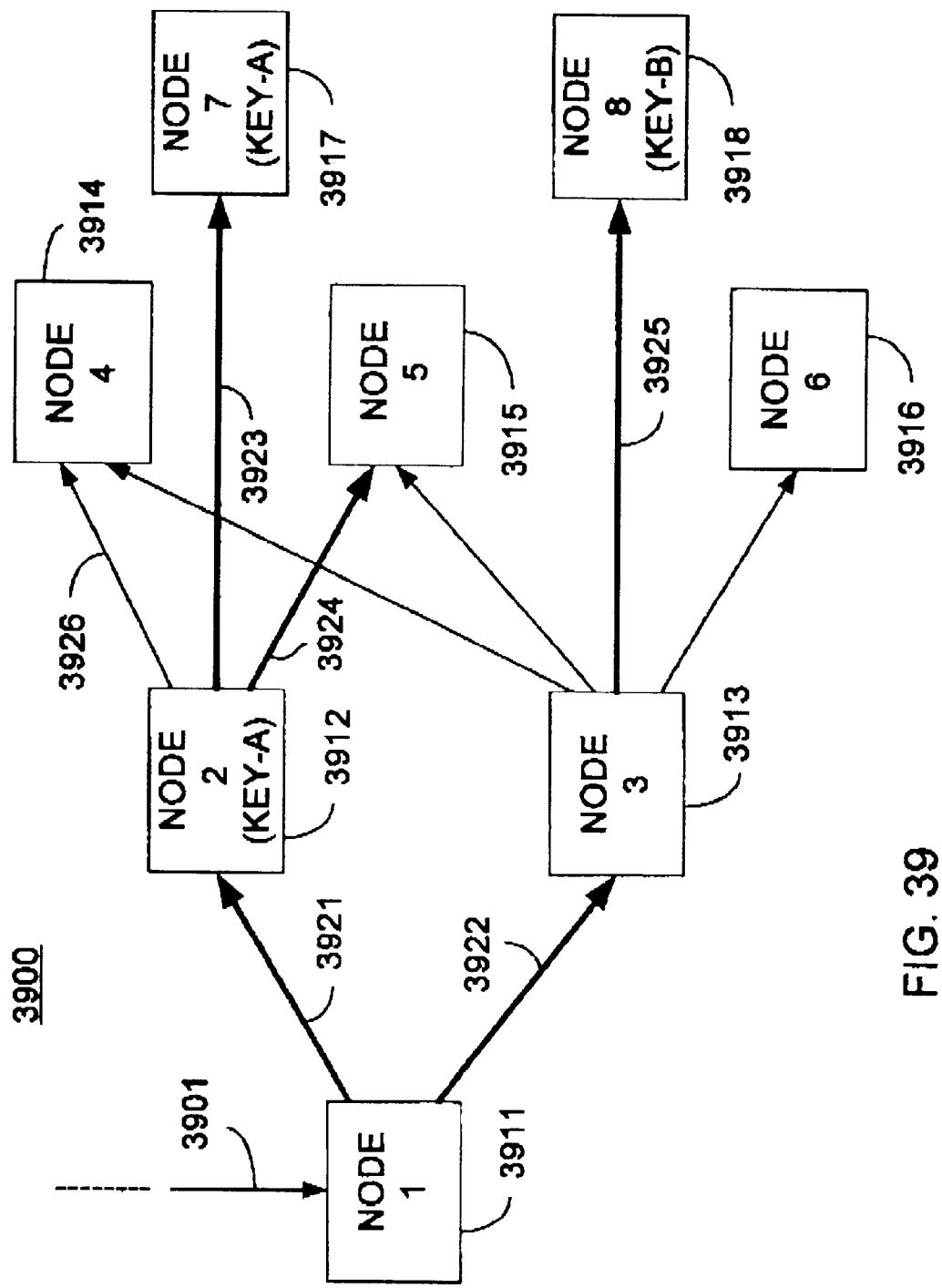
FIG. 39 is a high-level block diagram of a virtual private network using the principles of multicasting.

To illustrate an embodiment of a VPN, reference is made to FIG. 39. VPN 3900 is composed of nodes 3911, 3912, ..., 3918 (node 1, node 2, ..., node 8, respectively) interconnected by optical links 3921, 3922, ..., 3926 propagating a plurality of optical signals on numerous wavelengths. Presume that the optical signal arriving at node 3911 over one of the wavelengths comprising link 3901 is to be multicast to nodes 3912, 3917, and 3918 (nodes 2, 7, and 8), respectively. However, in order for nodes 3912, 3917, and 3918 to be able to receive and read the data payload embedded in the optical signal, it is necessary that these nodes have a "decoding key" to "unlock" or decode the contents of the data payload. As shown, nodes 3912 and 3917 can decode the data payload with decoding key KEY-A; node 3918 can unlock the data payload with decoding key KEY-B. These keys are provided to the nodes 3912, 3917, and 3918 via an off-line, typically secure communications prior to the propagation of the data payload.

All nodes are structured with a multicast optical switch of the type illustrated in FIGS. 7–14. Accordingly, node 3911, under control of the optical label, can forward the optical signals onto nodes 3912 and 3913 via links 3921 and 3922, respectively (shown as a dark black line to emphasize a link carrying a multicast optical signal). Node 3912 can decode the data payload if KEY-A matches the decoding key in the header, as explained shortly. Moreover, node 3912 multicasts the optical signal to nodes 3915 and 3918 over links 3924 and 3923, respectively. Node 3917 can decode the data payload if the decoding key in the header matches KEY-A. However, as depicted, node 3915 has no decoding key (perhaps because it was never received or was intentionally not provided to node 3915) so node 3915 cannot decode the optical signal. Additionally, node 3913 cannot decode the data payload since it does not have a decoding key, but it does forward the optical signal onto node 3918 via optical link 3925. Node 3918 can decode the data payload if the decoding key in the header is KEY-B.

As can readily be deduced, if the sender of the data payload desires only to communicate with nodes 3912 and 3917, then the header is filled in with decoding key KEY-A. On the other hand, if the sender desires to communicate only with node 3918, then the decoding key is filled in with KEY-B. In effect, underlying network 3900 has been overlaid with two VPNs with respect to the incoming optical signal on link 3901, namely, a first VPN composed of only nodes 3912 and 3917, and a second VPN composed of a single node 3918. Other nodes in the path of the optical signal merely act as "pass-through" nodes.

Figures 40A, 40B:
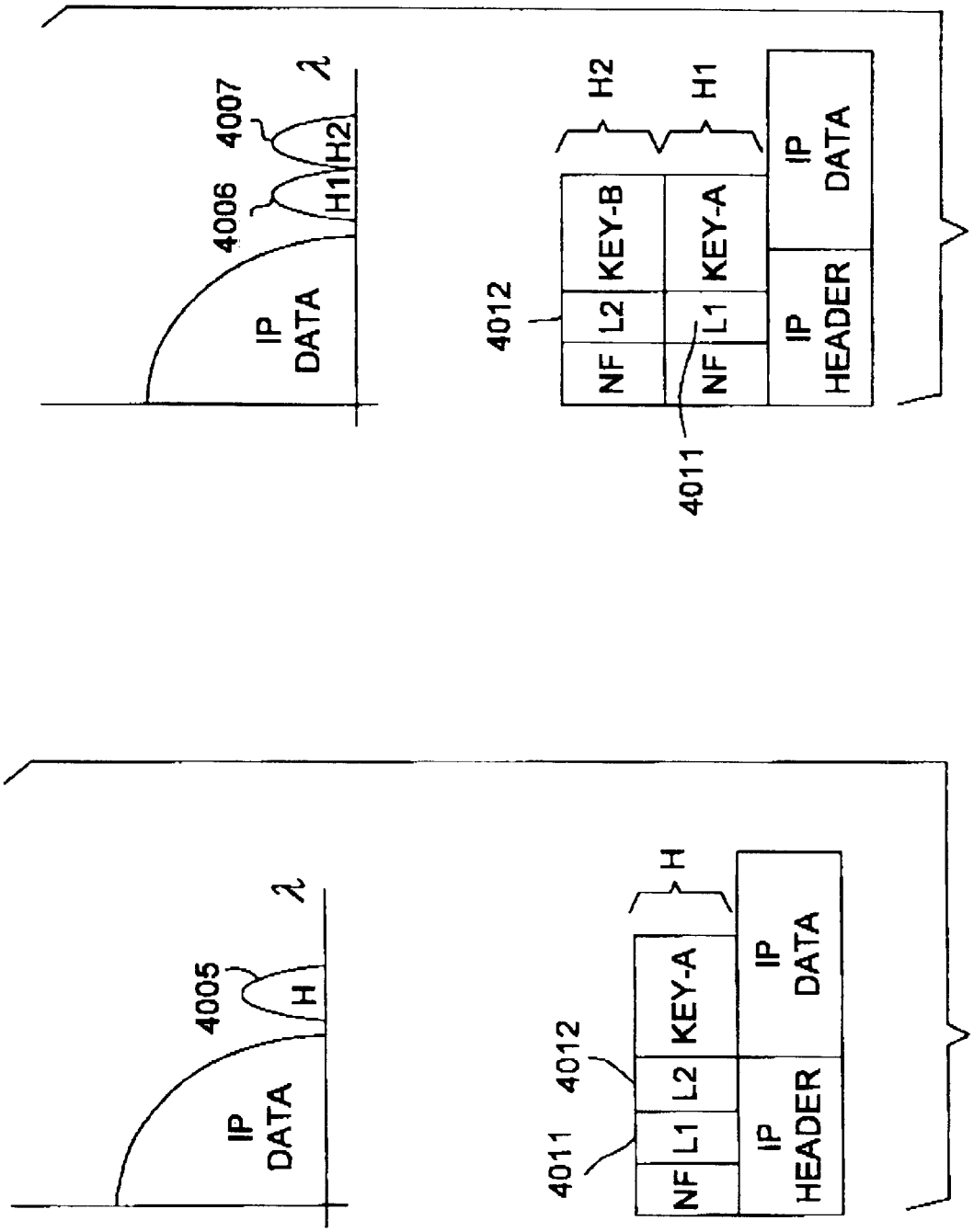
FIGS. 40A and 40B depict header layouts for a virtual private network.

The layout of the header of FIG. 40A depicts the information conveyed by header 4005 using a single sub-carrier, whereas FIG. 40B depicts headers 4006 and 4007 when multiple sub-carriers are utilized. To illustrate the case above, FIG. 40A shows the decoding key KEY-A which will unlock the data payload for nodes 3912 and 3917, whereas FIG. 40B shows the decoding keys KEY-A and KEY-B for unlocking data at nodes 3912 and 3917 as well as 3918, respectively. Moreover, for exemplary purposes, label L1 (4011) is presumed to be the label that multicasts the optical signal from node 3911 to node 3912, whereas label L2 (4012) is the label that multicasts the optical signal from node 3911 to node 3913. Similarly, label L1 multicasts from node 3912 to node 3917, and L2 multicasts from node 3912 to node 3915. Label L2 multicasts (only needs to route in this example) from node 3913 to node 3918.

1.11) Optical Technology

Optical technologies span a number of important aspects realizing the present invention. These include optical header technology, optical multiplexing technology, optical switching technology, and wavelength conversion technology.

(a) Optical Header Technology

Optical header technology includes optical header encoding and optical header removal as discussed with respect to FIGS. 3 and 4. In effect, optical header 210 serves as a signaling messenger to the network elements informing the network elements of the destination, the source, and the length of the packet. Header 210 is displaced in time compared to the actual data payload. This allows the data payload to have any data rates/protocols or formats.

(b) Optical Multiplexing Technology

Optical multiplexing may illustratively be implemented using the known silica arrayed waveguide grating structure. This waveguide grating structure has a number of unique advantages including: low cost, scalability, low loss, uniformity, and compactness.

(c) Optical Switching Technology

Fast optical switches are essential to achieving packet routing without requiring excessively long fiber delay as a buffer.

Micromachined Electro Mechanical Switches offer the best combination of the desirable characteristics: scalability, low loss, polarization insensitivity, fast switching, and robust operation. Recently reported result on the MEM based Optical Add-Drop Switch achieved 9 microsecond switching time (d) Wavelength Conversion Technology Wavelength conversion is resolves packet contention without requiring path deflection or packet buffering. Both path deflection and packet buffering cast the danger of skewing the sequences of a series of packets. In addition, the packet buffering is limited in duration as well as in capacity, and often requires non-transparent methods. Wavelength conversion, on the other hand, resolves the blocking by transmitting at an alternate wavelength through the same path, resulting in the identical delay. Illustratively, a WSXC with a limited wavelength conversion capability is deployed.

1.12) Closing

Although the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently know equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention. Similarly, it will be appreciated that any flow charts, flow diagrams, state transition diagrams, pseudo-code, and the like represent various processes which may be substantially represented in computer readable medium and so executed by a computer or processor, whether or not such computer or processor is explicitly shown.

The functions of the various elements shown in the FIGs., including functional blocks labeled as "processors", may be provided through the use of dedicated hardware as well as hardware capable of executing software in association with appropriate hardware. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, with limitation, digital signal processor (DSP) hardware, read-only memory (ROM) for storing software, random access memory (RAM), and non-volatile storage. Other hardware, conventional and/or custom, may also be included.

In the claims herein any element expressed as a means for performing a specified function in intended to encompass any way of performing that function including, for example, (a) a combination of circuit elements which performs that function or (b) software in any form, including, therefore, firmware, microcode, or the like, combined with appropriate circuitry for executing that software to perform the function. The invention as defined by such claims resides in the fact that the functionalities provided by the various recited means are combined and brought together in the manner called for in the claims. Applicant thus regards and means which can provide those functionalities as equivalent to those shown herein.

Thus, although various embodiments which incorporate the teachings of the present invention have been shown and described in detail herein, those skilled in the art can readily devise many other varied embodiments that still incorporate these teachings.

What is claimed is:

1. A system for multicasting a data payload through an optical network composed of a plurality of nodes interconnected by links wherein a given one of the nodes multicasts over two outgoing links, the data payload having a given format and protocol, the system comprising:

a label-switch controller on said optical network;

a mute generator coupled to said label-switch controller and configured for generating and storing a local routing look-up table in each of the nodes, each local look-up table listing local addresses for determining alternative local mutes through each of the nodes;

an adder coupled to said label-switch controller and configured for adding two headers to the data payload with each of the headers being embedded in the same wavelength as the data payload prior to inputting the data payload at an input one of the nodes to produce en optical signal, each of the headers having a format and protocol and conveying multicast information indicative a local route through the given node for the data payload and the headers, the format and protocol of the data payload being independent of the format and protocol of the headers;

a switching device on said optical network which is configured for being controlled by the label-switching controller;

a detector coupled to said switching device and configured for detecting the multicast information at the given one of the nodes to determine two switch control signals with reference to the multicast information as the data payload and the headers propagate through the optical network;

an optical splitter configured for splitting the optical signal received by said switching device into two split optical signals;

a selector coupled to said switching device and configured for selecting two local routes through the given one of the nodes in correspondence to the two switch control signals;

an optical switch coupled to said switching device having input ports and output ports wherein one of the split optical signals couples to a first input port and the second of the split optical signals couples to a second input port, and wherein one of the outgoing links couples to a first output port and the second of the outgoing links couples to a second output port; and a switch controller, coupled to the optical switch and responsive to the two switch control signals, configured for switching the optical switch in response to the multicast information to optically couple the first input port with the first output port and the second input port with the second output port.

2. A system as recited in claim 1, wherein the adder includes a generator configured for generating a plurality of baseband headers, each of the baseband headers conveying a subset of the multicast information and determining one of the switch control signals.

3. A system as recited in claim 2, further comprising:

a plurality of local oscillators; and a mixer configured for mixing the baseband headers with the corresponding plurality of local oscillators to produce frequency-shifted baseband signal.

4. A system as recited in claim 3, further comprising a combiner configured for combining the data payload at baseband with the frequency-shifted baseband signal to produce a composite baseband signal.

5. A system as recited in claim 4, further comprising:

a laser source; and an optical modulator configured for optically modulating the composite baseband signal with the laser source to produce the optical signal.

6. The A system as recited in claim 5:

wherein each of the headers is conveyed by a distinct sub-carrier frequency occupying a frequency band above the data payload;

wherein the detector includes means for detecting the headers to obtain the multicast information, and a processor for processing the multicast information to obtain the switch control signals for routing the optical signal.

7. A system as recited in claim 1 wherein the detector includes a header detector, coupled to the switch controller, configured for detecting the multicast information in the headers to produce the two switch control signals, in correspondence to the two split optical signals, for the switch controller to operate the optical switch.

8. A system as recited in claim 1:

wherein the optical signal arriving at the given one of the nodes is included in a composite optical signal;

wherein the system further comprises an optical demultiplexer for demultiplexing the composite optical signal to recover the optical signal.

9. A system for multicasting a data payload through an optical network composed of a plurality of nodes interconnected by links wherein a given one of the nodes multicasts over a plurality of outgoing links, the data payload having a given format and protocol, the system comprising:

a label-switch controller on said optical network;

a route generator coupled to said label-switch controller and configured for generating and storing a local routing look-up table in each of the nodes, each local look-up table listing local addresses for determining alternative local routes through each of the nodes;

an adder coupled to said label-switch controller and configured for adding a plurality of headers to the data payload with the headers being embedded in the same wavelength as the data payload prior to inputting the data payload at an input one of the nodes to produce an optical signal, the headers having a format and protocol and conveying multicast information indicative of local mutes through the given node for the data payload and the headers, the format and protocol of the data payload being independent of the format and protocol of the headers, a switching device on said optical network which is configured for being controlled by said label-switching controller;

a detector coupled to said switching device and configured for detecting the multicast information at the given one of the nodes to determine switch control signals with reference to the multicast information as the data payload and the headers propagate through the optical network;

an optical splitter configured for splitting the optical signal received by said switching device into a plurality of split optical signals;

a selector coupled to said switching device and configured for selecting a plurality of local mutes through the given one of the nodes in correspondence to the switch control signals;

an optical switch coupled to said selector having input ports and output ports wherein each of the split optical signals couples to separate input ports, and wherein each of the outgoing links couples to corresponding output ports; and a switch controller, coupled to the optical switch and responsive to the switch control signals, configured for switching the optical switch in response to the multicast information to optically couple the separate input ports with the corresponding output ports.

10. A system as recited in claim 9, wherein the adder includes a generator configured for generating a plurality of baseband headers, each of the baseband headers conveying a subset of the multicast information and determining one of the switch control signals.

11. A system as recited in claim 10 further comprising:

a plurality of local oscillators; and a mixer configured for mixing the baseband headers with the corresponding plurality of local oscillators to produce frequency-shifted baseband signal.

12. A system as recited in claim 11, further comprising a combiner configured for combining the data payload at baseband with the frequency-shifted baseband signal to produce a composite baseband signal.

13. A system as recited in claim 12, further comprising:

a laser source; and an optical modulator configured for optically modulating the composite baseband signal with the laser source to produce the optical signal.

14. The A system as recited in claim 13:

wherein each of the headers is conveyed by a distinct sub-carrier frequency occupying a frequency band above the data payload;

wherein the detector further comprises means for detecting the headers to obtain the multicast information, and a processor configured for processing the multicast information to obtain the switch control signals for routing the optical signal.

15. A system as recited in claim 9, wherein the detector further comprises a header detector, coupled to the switch controller, configured for detecting the multicast information in the headers to produce the two switch control signals, in correspondence to the two split optical signals, for the switch controller to operate the optical switch.

16. A system as recited in claim 9:

wherein the optical signal arriving at the given one of the nodes is included in a composite optical signal;

wherein the system further comprises an optical demultiplexer configured for demultiplexing the composite optical signal to recover the optical signal.

17. A system for multicasting a data payload through an optical network composed of a plurality of nodes interconnected by links wherein a given one of the nodes multicasts over a plurality of outgoing links, the data payload having a given format and protocol, the system comprising:

a label-switch controller on said optical network;

a route generator coupled to said label-switch controller and configured for generating and storing a local routing look-up table in each of the nodes, each local look-up table listing local addresses for determining alternative local mutes through each of the nodes;

an adder coupled to said label-switch controller and configured for adding a plurality of headers to the data payload with the headers being embedded in the same wavelength as the data payload prior to inputting the data payload at an input one of the nodes to produce an optical signal, the headers having a format and protocol and conveying multicast information indicative of local routes through the given node for the data payload and the headers, the format and protocol of the data payload being independent of the format and protocol of the headers;

a switching device on said optical network which is configured for being controlled by said label-switching controller;

a detector coupled to said switching device and configured for detecting the multicast information at the nodes to determine switch control signals with reference to the multicast information as the data payload and the headers propagate through the optical network;

an optical splitter configured for splitting the optical signal received by said switching device into a number of split optical signals corresponding to number of outgoing links;

an optical switch having input ports and output ports wherein each of the split optical signals couples to a corresponding one of the input ports;

an optical combiner coupled to predetermined ones of the output ports;

a plurality of multiplexers configured for coupling the optical combiner with the outgoing links; and a switch controller, coupled to the optical switch and responsive to the switch control signals, configured for switching the optical switch in response to the multicast information to optically couple the input ports with corresponding output ports.

18. A system for multicasting a data payload through an optical network composed of a plurality of nodes interconnected by links wherein a given one of the nodes multicasts over two outgoing links, the data payload having a given format and protocol, the system comprising:

a label-switch controller on said optical network;

a route generator coupled to said label-switch controller and configured for generating and storing a local muting look-up table in each of the nodes, each local look-up table listing local addresses for determining alternative local routes through each of the nodes;

an adder coupled to said label-switch controller and configured for adding two headers to the data payload with the headers being embedded in the same wavelength as the data payload prior to inputting the data payload at an input one of the nodes to produce an optical signal, the headers having a format and protocol and conveying multicast information indicative of local routes through the given node for the data payload and the headers, the format and protocol of the data payload being independent of the format and protocol of the headers;

a switching device on said optical network which is configured for being controlled by said label-switching controller;

a detector coupled to said switching device and configured for detecting the multicast information at the nodes to determine two switch control signals with reference to the multicast information as the data payload and the headers propagate through the optical network;

a one-by-two optical splitter configured for splitting the incoming optical signal received by said switching device into two split optical signals;

a four-by-four optical switch having four input ports and four output ports wherein the two split optical signals couple to the first and second input ports;

a first two-by-one optical combiner coupled to the first and second output ports;

a second two-by-one optical combiner coupled to the third and fourth output ports;

a first multiplexer coupled to the first optical combiner and the second optical combiner wherein the output of the first multiplexer is coupled to one of the two outgoing links;

a second multiplexer coupled to the first optical combiner and the second optical combiner wherein the output of the second multiplexer is coupled to the other of the two outgoing links; and a switch controller, coupled to the optical switch and responsive to the switch control signals, configured for switching the optical switch in response to the multicast information to couple the first input port with the first output port and the second input port with the third output port.

19. A system as recited in claim 18, wherein the detector further comprises a header detector, coupled to the switch controller, configured for detecting the multicast information in the headers to produce the two switch control signals, in correspondence to the two split optical signals, for the switch controller to operate the optical switch.

20. A system as recited in claim 19:

wherein the optical signal to the given one of the nodes is included in a composite optical signal;

wherein the system further comprises an optical demultiplexer configured for demultiplexing the composite optical signal to recover the optical signal.

21. A system as recited in claim 18:

wherein said system is configured for multicasting a second incoming optical signal to the two outgoing links, the second incoming optical signal including a second set of two headers for conveying second multicasting information;

wherein the system further a second one-by-two optical splitter configured for splitting the second incoming optical signal into two split second optical signals;

wherein the second two-by-one optical combiner is coupled to the third and fourth output ports of the optical switch;

wherein said switch controller, being responsive to the second header, switches the optical switch in response to the second multicast information to couple the third input port with the second output port and the fourth input port with the fourth output port.

22. A system for multicasting two data payloads through an optical network composed of a plurality of nodes interconnected by links wherein a given one of the nodes multicasts over two outgoing links, each data payload having a given format and protocol, the system comprising:

a label-switch controller on said optical network;

a route generator coupled to said label-switch controller and configured for generating and storing a local routing look-up table in each of the nodes, each local look-up table listing local addresses for determining alternative local routes through each of the nodes;

an adder coupled to said label-switch controller and configured for adding two headers to each data payload with each set of two headers being embedded in the same wavelength as each corresponding data payload prior to inputting each data payload at an input one of the nodes to produce two optical signals, the headers having a format and protocol and conveying multicast information indicative of local routes through the given node for each data payload and each corresponding header, the format and protocol of each data payload being independent of the format and protocol of each corresponding header;

a switching device on said optical network which is configured for being controlled by the label-switching controller;

a first demultiplexer coupled to said switching device and configured for detecting the first optical signal;

a second demultiplexer coupled to said switching device and configured for detecting the second optical signal;

a first one-by-two optical splitter, coupled to the first demultiplexer, configured for splitting the first optical signal into two split first optical signals;

a second one-by-two optical splitter, coupled to the second demultiplexer, for splitting the second optical signal into two split second optical signals;

a detector coupled to said switching device and configured for detecting the multicast information at the given one of the nodes to determine four switch control signals with reference to the multicast information each of the data payloads and the corresponding headers propagate through the optical network;

a first four-by-four optical switch coupled to said switching device having four input ports and four output ports wherein the first split optical signals couple to the first and second input ports;

a second four-by-four optical switch coupled to said switching device having four input parts and four output ports wherein the second split optical signals couple to the first and second input ports;

a first two-by-one optical combiner coupled to the first and second output ports of the first optical switch;

a second two-by-one optical combiner coupled to the third and fourth output ports of the first optical switch;

a third two-by-one optical combiner coupled to the first and second output ports of the second optical switch;

a fourth two-by-one optical combiner coupled to the third and fourth output ports of the second optical switch;

a first multiplexer coupled to the first optical combiner and the second optical combiner wherein the output of the first multiplexer is coupled to one of the two outgoing links;

a second multiplexer coupled to the first optical combiner and the second optical combiner wherein the output of the second multiplexer is coupled to the other of the two outgoing links; and a switch controller, coupled to the first optical switch and the second optical switch and responsive to the switch control signals, configured for switching the first optical switch and second optical switch in response to the multicast information to couple the first input port with the first output port of the first optical switch, the second input port with the third output port of the first optical switch, the first input port with the first output port of the second optical switch, and the second input port with the third output port of the second optical switch.

* * * * *